(12) United States Patent
Wang et al.

(10) Patent No.: US 12,437,228 B2
(45) Date of Patent: Oct. 7, 2025

(54) METHODS, SYSTEMS, AND APPARATUS FOR ENABLING AND MANAGING QUANTUM NETWORKS

(71) Applicant: InterDigital Patent Holdings, Inc., Wilmington, DE (US)

(72) Inventors: Chonggang Wang, Princeton, NJ (US); Shamim Rahman, Cote St. Luc (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 911 days.

(21) Appl. No.: 17/627,528

(22) PCT Filed: Jul. 17, 2020

(86) PCT No.: PCT/US2020/042575
§ 371 (c)(1),
(2) Date: Jan. 14, 2022

(87) PCT Pub. No.: WO2021/016095
PCT Pub. Date: Jan. 28, 2021

(65) Prior Publication Data
US 2022/0269976 A1      Aug. 25, 2022

Related U.S. Application Data

(60) Provisional application No. 62/876,403, filed on Jul. 19, 2019.

(51) Int. Cl.
*G06N 10/80* (2022.01)
*H04B 10/70* (2013.01)

(52) U.S. Cl.
CPC ............. *G06N 10/80* (2022.01); *H04B 10/70* (2013.01)

(58) Field of Classification Search
CPC ...... G06N 10/80; H04B 10/70; H04L 9/0855; H04L 9/0858; H04W 12/0431
See application file for complete search history.

(56) References Cited

U.S. PATENT DOCUMENTS

| 8,457,316 B2 | 6/2013 | Brodsky et al. |
| 2005/0105470 A1 * | 5/2005 | Lazzeri ................... H04L 45/10 370/237 |

(Continued)

FOREIGN PATENT DOCUMENTS

| CN | 208986950 U | 6/2019 |
| EP | 1865657 A1 | 12/2007 |
| WO | 2018/082345 A1 | 5/2018 |

OTHER PUBLICATIONS

Cai et al., "Multicore Fiber-Based Quantum Access Network", arXiv:1905.05932v1, May 15, 2019, pp. 1-6.

(Continued)

*Primary Examiner* — Pei Yong Weng
(74) *Attorney, Agent, or Firm* — Mark D. Pratt

(57) ABSTRACT

Centralized quantum capability management may be provided. A quantum network architecture may include a centralized quantum network manager. A quantum policy management may be controlled by quantum network manager. Quantum capability registration, solicitation, subscription, and discovery may be provided. Centralized quantum connection creation and management may be provided. Efficient quantum link layer services may be provided.

19 Claims, 37 Drawing Sheets

(56) References Cited

U.S. PATENT DOCUMENTS

2019/0260581 A1 8/2019 Su et al.
2020/0374211 A1* 11/2020 Griffin .................. H04L 45/745

OTHER PUBLICATIONS

Dahlberg et al., "A Link Layer Protocol for Quantum Networks", arXiv:1903.09778v1, Mar. 23, 2019, pp. 1-56.
Dahlberg et al., "The Link Layer Service in a Quantum Internet", Quantum Internet Research Group, Internet-Draft, Intended status: Experimental, Available at <https://datatracker.ietf.org/doc/draft-dahlberg-ll-quantum/>, Oct. 10, 2019, 14 pages.
Huberman et al., "A Quantum Router for the Entangled Web", Information Systems Frontiers, Mar. 11, 2019, pp. 1-10.
Kompella et al., "Advertising Entanglement Capabilities in Quantum Networks", QIRG, Internet-Draft, Intended Status: Standards Track, Dec. 20, 2018, pp. 1-11.
Kozlowski et al., "Architectural Principles of a Quantum Internet", QIRG @ IETF 109 Online, Draft draft-irtfqirg-principles-03, Nov. 16, 2020, 7 pages.
Meter et al., "Connection Setup in a Quantum Network", Quantum Internet Research Group, Internet-Draft, Intended status: Informational, Available at <https://datatracker.ietf.org/doc/draft-van-meter-qirg-quantum-connection-setup/>, Sep. 10, 2019, pp. 1-12.
Mink et al., "A Quantum Network Manager that Supports a One-Time Pad Stream", Second International Conference on Quantum, Nano and Micro Technologies (ICQNM 2008), Feb. 10, 2008, 6 pages.
Pirker, "Modular Architectures for Quantum Networks", New Journal of Physics, vol. 20, May 24, 2018, 33 pages.
Wallnofer et al., "Machine Learning for Long-Distance Quantum Communication", arXiv:1904.10797v1, Apr. 24, 2019, 13 pages.
Yu et al., "Protocols for Packet Quantum Network Intercommunication", arViv: 1903.10685v1, Mar. 26, 2019, pp. 1-14.

* cited by examiner

| Quantum Application Layer |
| Quantum Transport Layer (Qubit transmission) |
| Quantum Network Layer (Long distance entanglement) |
| Quantum Link Layer (Robust entanglement generation) |
| Quantum Physical Layer (Attempt entanglement generation) |

FIG. 3

METHODS, SYSTEMS, AND APPARATUS FOR ENABLING AND MANAGING QUANTUM NETWORKS

CROSS-REFERENCE TO RELATED APPLICATIONS

This application is the National Stage Entry under 35 U.S.C. § 371 of Patent Cooperation Treaty Application No. PCT/US2020/042575, filed Jul. 17, 2020, which claims the benefit of provisional U.S. patent application No. 62/876,403, filed Jul. 19, 2019, the disclosure of which is incorporated herein by reference in its entirety.

BACKGROUND

With quantum computing features such as superposition and entanglement, quantum communications and computing could enable more secure web applications and other types of Internet communications. For example, quantum key distribution (QKD) may allow security keys to be securely distributed between a hypertext transfer protocol (HTTP) client and a HTTP server. With such QKD-enabled security keys, the HTTP client and the HTTP server may establish more secure HTTP connections.

SUMMARY

Described herein are methods, apparatus, and systems that address quantum capability management, quantum connection management, and quantum link layer services. Although these issues may not be related to each other, they may be building blocks for enabling QKD and other quantum applications. As described herein, these methods, apparatus, and systems may provide for QKD and other quantum applications.

A device may be provided for managing one or more quantum nodes within a quantum network. The device may comprise a memory and a processor. The processor may be configured to perform a number of actions. The device may be a Quantum Network Manager (QNM). A request may be received to create a quantum connection between a source quantum network terminal (QNT) and a destination QNT. A quantum path may be determined between the source QNT and the destination QNT, wherein the quantum path may comprise a quantum network router (QNR). A first message may be sent to the QNR on the quantum path to create a first entangled qubit pair for a first hop of the quantum path and a second entanglement qubit pair for a second hop of the quantum path. The first message may further comprise a time that indicates when the quantum connection may be created. A second message may be sent to the QNR that instructs the QNR to perform entanglement swapping using the first entangled qubit pair and the second entangled qubit pair to provide the quantum path for the quantum connection. A confirmation message indicating that quantum connection has been created may be received.

A device for managing one or more quantum nodes within a quantum network may be provided. The device may be a Quantum Network Manager (QNM). The device may comprise a memory and a processor. A request to create a quantum connection between a source quantum network terminal (QNT) and a destination QNT may be received. A quantum path between the source QNT and the destination QNT may be determined. The quantum path may comprise a quantum network router (QNR). An entanglement sequence for creating the quantum connection may be determined. The entanglement sequence may comprise a first entanglement operation and a second entanglement operation. A first message may be sent to the source QNT to perform the first entanglement operation after a time. A second message may be sent to the QNR to perform the second entanglement operation after the time. A confirmation message indicating that quantum connection has been created may be received.

A device for creating a quantum connection may be provided. The device is a quantum network client (QNC). The device may comprise a memory and a processor. A first message to a quantum network manager (QNM) may be sent. The first message may comprise a request for a quantum connection and a parameter for the quantum connection. The parameter may comprises one or more a source QNT address, a destination QNT address, path information for the quantum path, a time when the quantum connection may be created, a quantum connection creation mode, a minimum fidelity for an engagement pair, an indication of how an entanglement swapping may be performed, an indication of a protocol that may be used for entanglement swapping, a maximum number of hops that can be used for the quantum path, an indication of an application that will use the quantum connection, and an indication of a lifetime for the quantum connection.

BRIEF DESCRIPTION OF THE DRAWINGS

Furthermore, like reference numerals in the figures indicate like elements, and wherein:

FIG. 3 shows an example quantum network protocol stack.

FIG. 9 shows an example flow chart for quantum capability registration and operations, such as update, retrieve, deletion, solicitation, subscription, discovery, and/or the like.

EXAMPLE NETWORKS FOR IMPLEMENTATION OF THE EMBODIMENTS

Figure 1A:
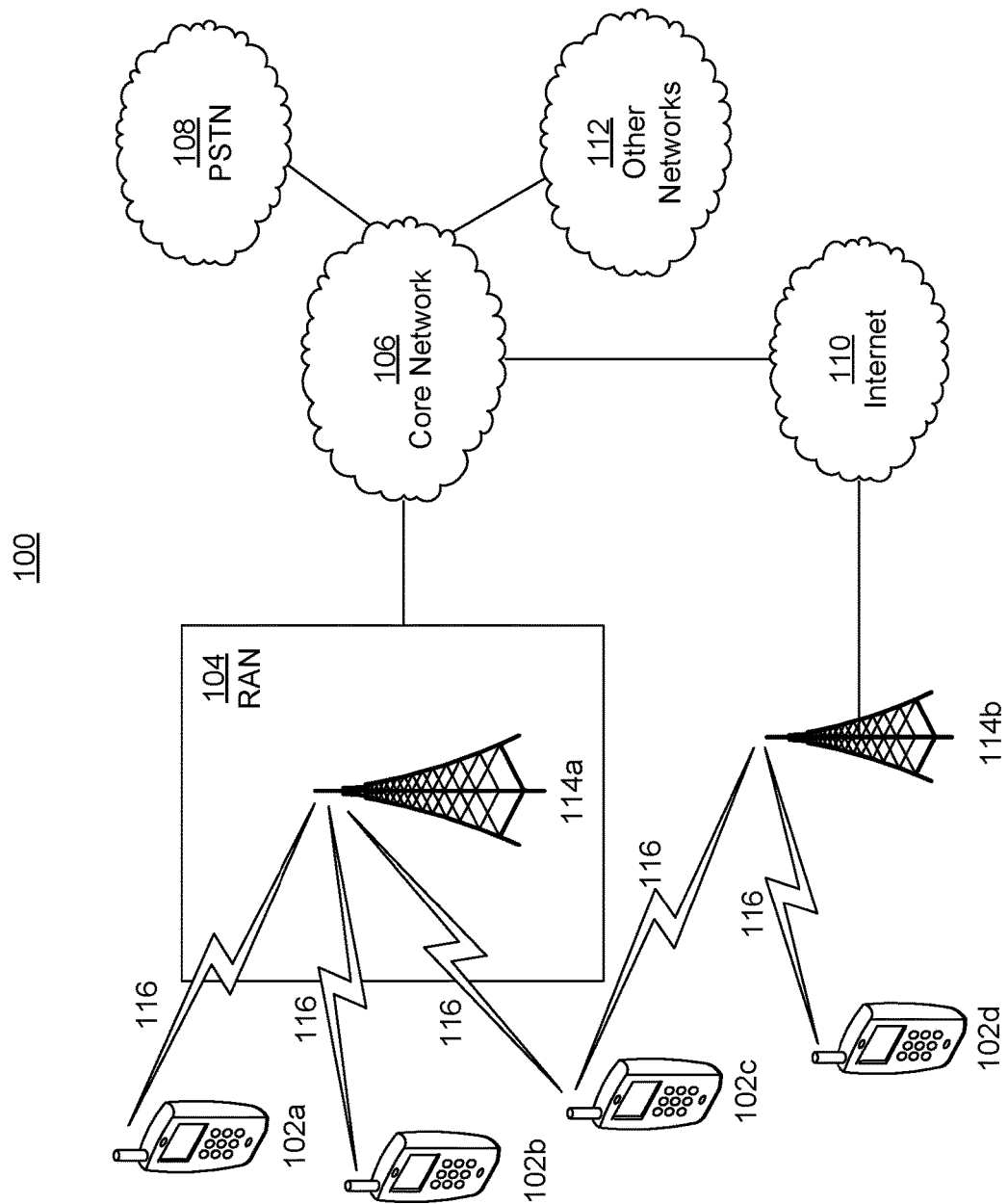
FIG. 1A is a system diagram illustrating an example communications system in which one or more disclosed embodiments may be implemented.

A device may be provided for managing one or more quantum nodes within a quantum network. The device may comprise a memory and a processor. The processor may be configured to perform a number of actions. The device may be a Quantum Network Manager (QNM). A request may be received to create a quantum connection between a source quantum network terminal (QNT) and a destination QNT. A quantum path may be determined between the source QNT and the destination QNT, wherein the quantum path may comprise a quantum network router (QNR). A first message may be sent to the QNR on the quantum path to create a first entangled qubit pair for a first hop of the quantum path and a second entanglement qubit pair for a second hop of the quantum path. The first message may further comprise a time that indicates when the quantum connection may be created. A second message may be sent to the QNR that instructs the QNR to perform entanglement swapping using the first entangled qubit pair and the second entangled qubit pair to provide the quantum path for the quantum connection. A confirmation message indicating that quantum connection has been created may be received.

A response message may be received from the QNR. The response message may indicate that the QNR performed the entanglement swapping.

A quantum connection identification associated with the quantum path and the quantum connection may be generated. A third message may be sent. The third message that may comprise the quantum connection identification to one or more of the source QNT, the destination QNT, and a quantum network client (QNC). The third message may be sent to one or more one of the source QNT, the destination QNT, and a quantum network client (QNC). The third message may indicate that the quantum path for the quantum connection may have been established.

The request to create the quantum connection between the source QNT and the destination QNT may comprises a policy that specifies when the quantum connection may be created. The request to create the quantum connection may be first request. A second request to create the quantum connection between the source QNT and the destination QNT may be received. An aggregated quantum connection request may be generated by combining the first request and the second request.

A device for managing one or more quantum nodes within a quantum network may be provided. The device may be a Quantum Network Manager (QNM). The device may comprise a memory and a processor. A request to create a quantum connection between a source quantum network terminal (QNT) and a destination QNT may be received. A quantum path between the source QNT and the destination QNT may be determined. The quantum path may comprise a quantum network router (QNR). An entanglement sequence for creating the quantum connection may be determined. The entanglement sequence may comprise a first entanglement operation and a second entanglement operation. A first message may be sent to the source QNT to perform the first entanglement operation after a time. A second message may be sent to the QNR to perform the second entanglement operation after the time. A confirmation message indicating that quantum connection has been created may be received.

The entanglement sequence may comprise a third entanglement operation. The entanglement sequence may be for creating the quantum connection and the entanglement sequence may indicate that an entanglement swapping operation may be performed after an entanglement creation operation.

A third message may be sent to the destination QNT to perform the third entanglement operation after the time. At least one of the first entanglement operation, the second entanglement operation, and the third entanglement operation may comprise an operation for creating an entanglement qubit pair or an operation for entanglement swapping.

The quantum path comprises a first hop and a second hop, and wherein the first entanglement operation is associated with the first hop and the second entanglement operation is associated with the second hop.

A device for creating a quantum connection may be provided. The device is a quantum network client (QNC). The device may comprise a memory and a processor. A first message to a quantum network manager (QNM) may be sent. The first message may comprise a request for a quantum connection and a parameter for the quantum connection. The parameter may comprises one or more a source QNT address, a destination QNT address, path information for the quantum path, a time when the quantum connection may be created, a quantum connection creation mode, a minimum fidelity for an engagement pair, an indication of how an entanglement swapping may be performed, an indication of a protocol that may be used for entanglement swapping, a maximum number of hops that can be used for the quantum path, an indication of an application that will use the quantum connection, and an indication of a lifetime for the quantum connection.

A second message from the QNM may be received. The second message may comprise an indication that the QNM has calculated a quantum path between a source quantum network terminal (QNT) and a destination QNT for the for the quantum connection. The second message may comprise an indication that the QNM has buffered the request for the quantum connection. A third message from the QNM may be received. The third message may comprise a connection identification for the quantum connection and indicating that the quantum connection has been created.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and/or the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and/or the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and/or the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and/or the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like. In other embodiments, the base station 114a and the WTRUs 102a, 102b, 102c may implement technologies that use electromagnetic spectrum technologies, such as infrared (e.g. near infrared, mid infrared, far infrared, etc.), visible light, near ultraviolet, ultraviolet, and/or the like. For example, the base station 114a and the WTRUs 102a, 102b, 102c may use TeraHz. Bands (e.g. infrared). As another example, the base station 114a and the WTRUs 102a, 102b, 102c may use light technologies, such as optical fiber and/or lasers, to transmit one or more qubits.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and/or the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

In another embodiment, the base station 114b and the WTRUs 102c, 102d may implement technologies that use electromagnetic spectrum technologies, such as infrared (e.g. near infrared, mid infrared, far infrared, etc.), visible light, near ultraviolet, ultraviolet, and/or the like. For example, the base station 114b and the WTRUs 102c, 102d may use TeraHz. Bands (e.g. infrared). As another example, the base station 114b and the WTRUs 102c, 102d may use light technologies, such as optical fiber and/or lasers, to transmit one or more qubits.

The RAN 104/113 may be in communication with the CN 106/115, which may be any type of network configured to provide voice, data, applications, and/or voice over Internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and/or the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
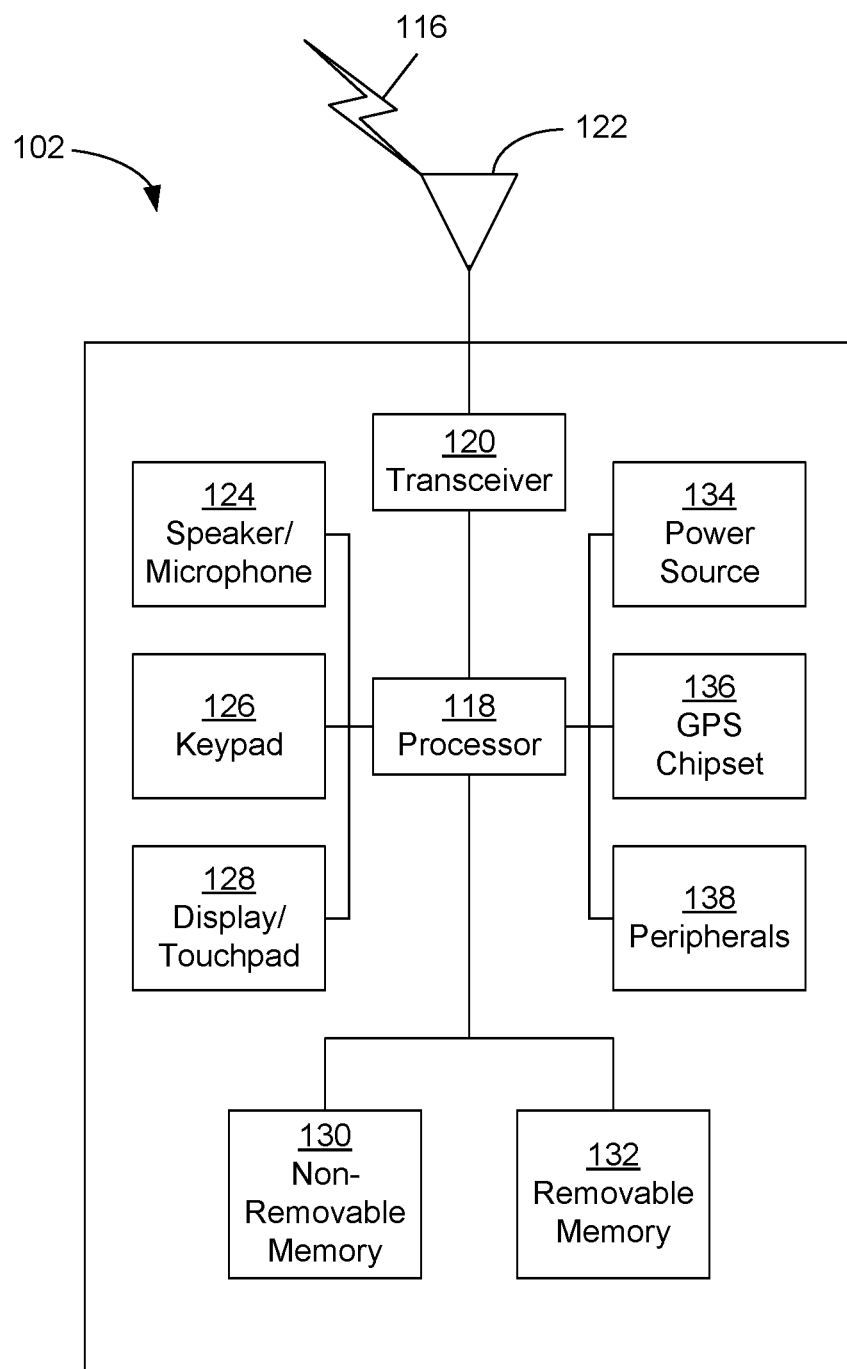
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and/or the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and/or the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and/or the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
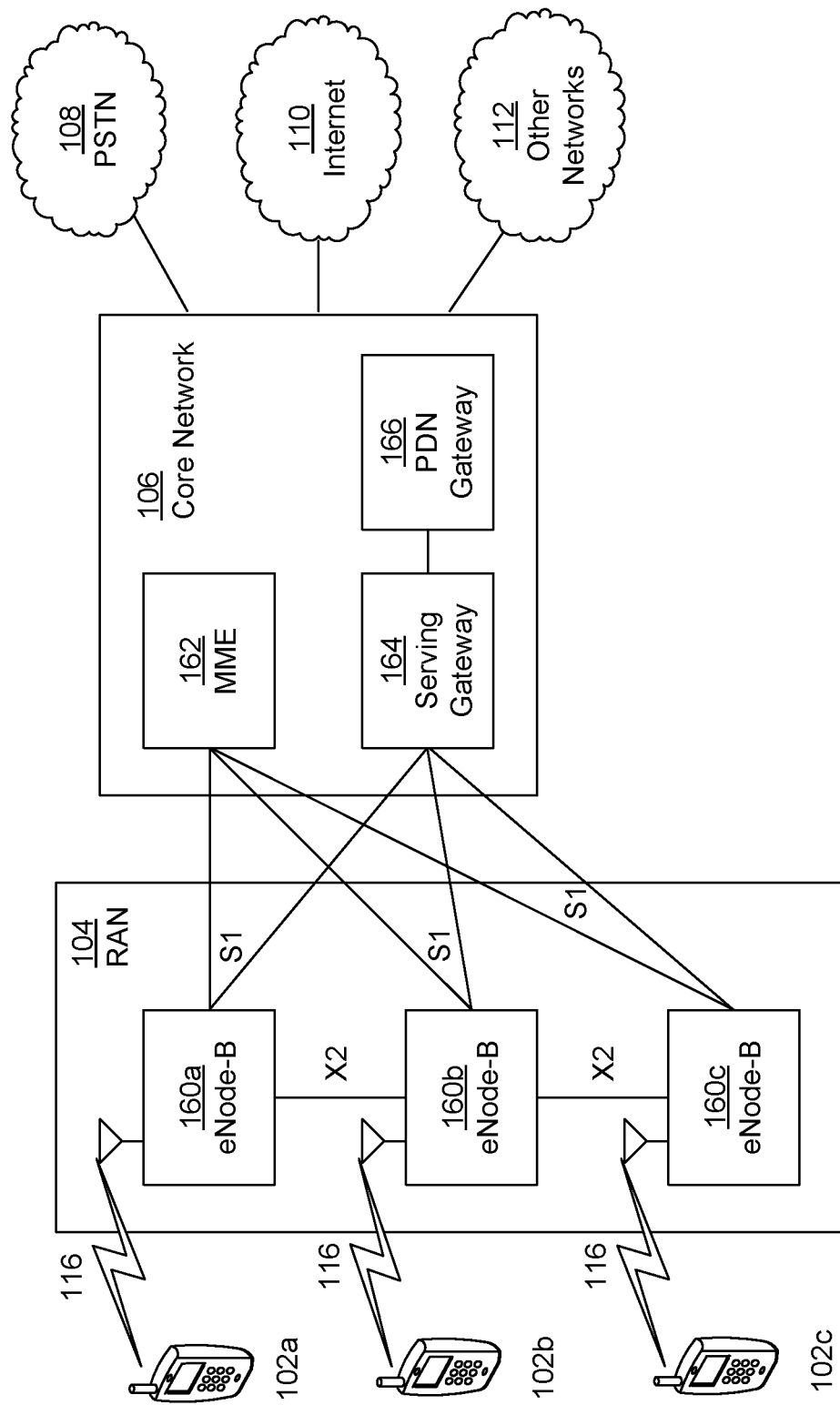
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Figure 10:
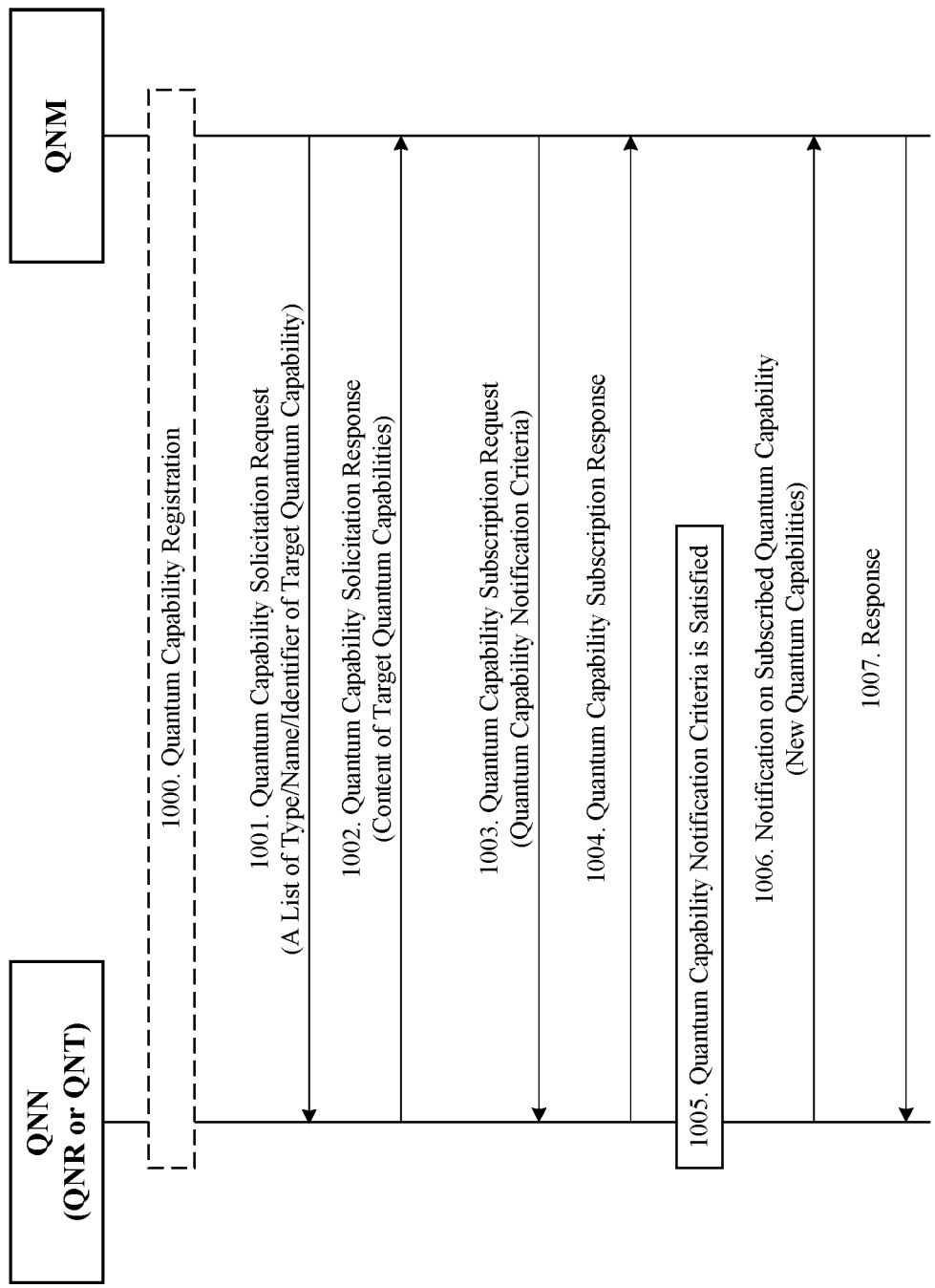
FIG. 10 shows an example quantum capability solicitation and subscription.

Each of the eNode-Bs 160a, 160b, 160c may be associated with a particular cell (not shown) and may be configured to handle radio resource management decisions, handover decisions, scheduling of users in the UL and/or DL, and/or the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and/or the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and/or the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by one or more (e.g. all) STAs in the BSS. The bandwidth of the primary channel may be set and/or limited by a STA, from among one or more (e.g. all)

STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available, In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
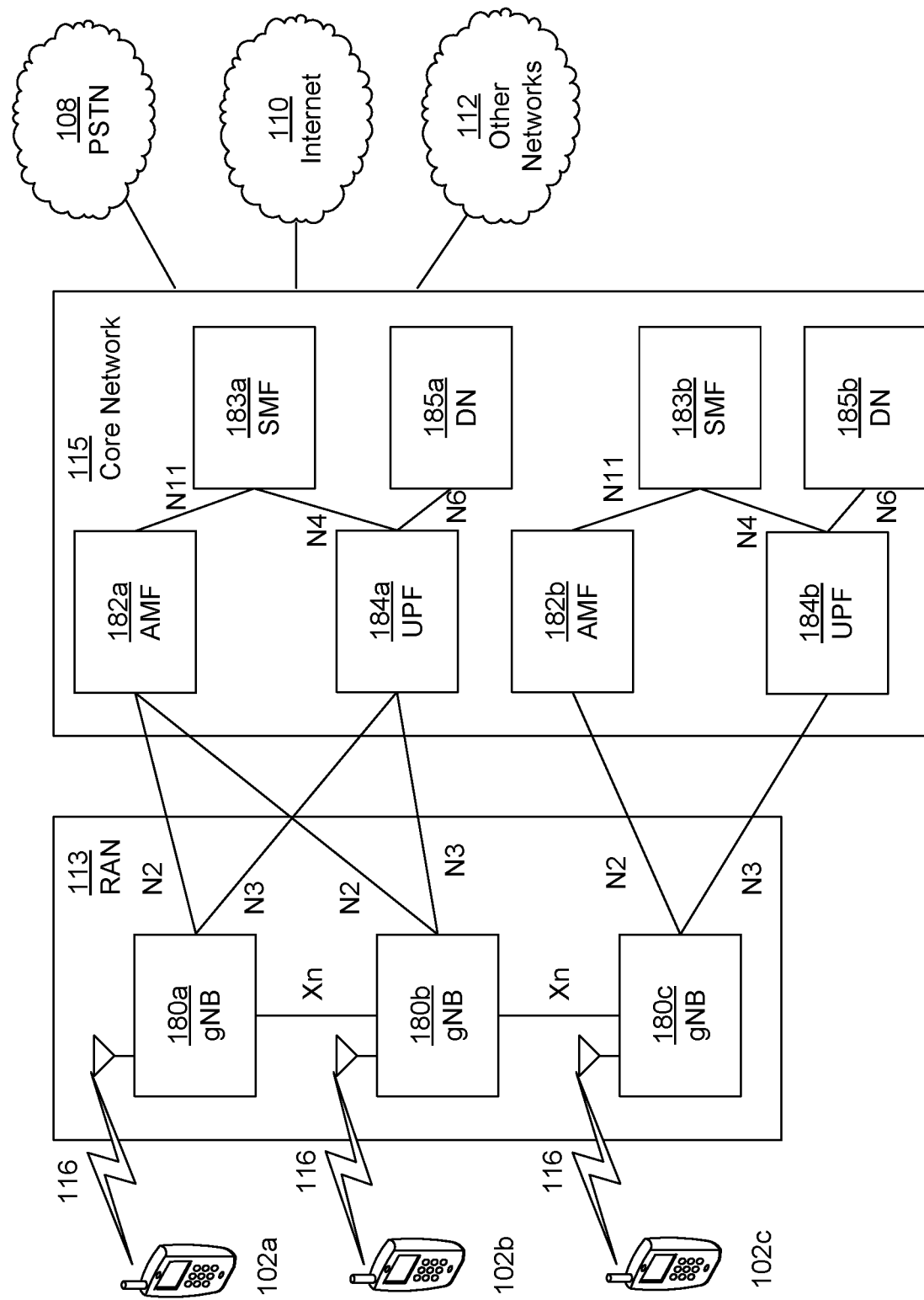
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and/or the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and/or the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182a may provide a control plane function for switching between the RAN 113 and other RANs (not shown) that employ other radio technologies, such as LTE, LTE-A, LTE-A Pro, and/or non-3GPP access technologies such as Wifi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and/or the like. A PDU session type may be IP-based, non-IP based, Ethernet-based, and/or the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and/or the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Centralized quantum capability management may be provided. A quantum network architecture may include a centralized quantum network manager. A quantum policy management may be controlled by quantum network manager. Quantum capability registration, update, retrieval, deletion, solicitation, subscription, and discovery may be provided.

Centralized quantum connection management may be provided. Centralized entangled qubits generation may be provided. Centralized quantum connection creation may be provided. Joint quantum and classic connection creation may be provided. Quantum connection as a service may be provided.

Advanced quantum link layer service may be provided. Advanced quantum link layer service for entanglement creation may be provided. Periodical entanglement creation may be provided. Updating pending entanglement creation requests may be provided. Cancelling pending entanglement creation requests may be provided. Querying existing entanglement creation requests may be provided. Triggering qubit measurements may be provided. Configuring/querying quantum statistics may be provided. Entanglement distribution may be provided. Triggering entanglement swapping may be provided. Triggering entanglement distillation may be provided. Automatic entanglement swapping and distillation may be provided.

The following abbreviations are used herein:
5G Fifth Generation
BAR Broadband Access Router
BR Backhaul Router
CPE Customer Premises Equipment
FTTH Fiber-To-The-Home
gNB Next-Generation NodeB
DTLS Datagram Transport Layer Security
HTTP Hypertext Transfer Protocol
QKD Quantum Key Distribution
QN Quantum Network
QNC Quantum Network Client
QNN Quantum Network Node
QNM Quantum Network Manager
QNR Quantum Network Router
QNT Quantum Network Terminal
RSVP Resource Reservation Protocol
TLS Transport Layer Security
UAV Unmanned Aerial Vehicles
UE User Equipment A qubit may be similar to a bit (e.g. classic bit). A state of a quantum bit (e.g. a qubit) could be "1" or "0" after it may be measured, and may be denoted as quantum state $|1\rangle$ and $|0\rangle$ respectively in quantum computing. Different than a bit (e.g. classic bit), the state of a qubit may be in any state between "1" or "0" before it is measured. For example, a qubit may stand for any state between "1" and "0" before it is measured. A photon or an electron may be used to realize a qubit.

A quantum logic gate may be similar to logic gates (e.g. classic logic gates), which may operate on bits (e.g. classic bit). Quantum logic gates may operate on qubits. A quantum logic gate may be a quantum computing circuit that may take one or more qubits as input, may execute certain operations on them, and may output qubits (e.g. new qubits).

Quantum superposition may be a principle (e.g. a fundamental principle) of quantum mechanics. With quantum superposition, any two or more quantum states may be added together (e.g. superposed) and the result may be another valid quantum state. Conversely, a quantum state (e.g. every quantum state) may be represented as a sum of two or more other distinct states. For example, the quantum state of a qubit may be written as:

$$|\phi\rangle = \alpha|0\rangle + \beta|1\rangle,$$

where $|\phi\rangle$ may be the quantum state of the qubit, $|0\rangle$ (e.g. similar to "0" state of a classic bit) and $|1\rangle$ (e.g. similar to "1" state of a classic bit) may two basis quantum states of the qubit, and $\alpha$ and $\beta$ may be arbitrary complex numbers with a constraint $|\alpha|^2+|\beta|^2=1$. Even though a qubit may have any state $|\phi\rangle$, it may be collapsed to $|0\rangle$ or $|1\rangle$ after it has been measured.

A quantum entanglement may be a property (e.g. a fundamental property) of quantum mechanics. With quantum entanglement, the quantum state of two entangled qubits A and B may be completely dependent on each other even when both qubits may be separated by a long distance. For example, if the quantum state of qubit A is measured, the state of qubit B may be automatically known.

Entangled qubits may be a pair of two qubits A and B which may be entangled and correlated with each other. For example, if the state of qubit A is measured, the state of qubit B may be automatically known. The joint state of two entangled qubits may be referred to entangled states.

For example, $|\Phi^+\rangle = (|0\rangle_A|0\rangle_B + |1\rangle_A|1\rangle_B)/\sqrt{2}$ may be an entangled state, which may imply that whenever qubit A is measured as $|0\rangle$ (or $|1\rangle$), the state of qubit B may become $|0\rangle$ (or $|1\rangle$). $|\Phi^+\rangle$ may be one of four Bell states (e.g. all may be entangled states); the other three Bell states may include:

$$|\Phi^-\rangle = (|0\rangle_A|0\rangle_B - |1\rangle_A|1\rangle_B)/\sqrt{2},$$
$$|\Psi^+\rangle = (|0\rangle_A|1\rangle_B + |1\rangle_A|0\rangle_B)/\sqrt{2}, \text{ and}$$
$$|\Psi^-\rangle = (|0\rangle_A|1\rangle_B - |1\rangle_A|0\rangle_B)/\sqrt{2}.$$

Entanglement fidelity may be a metric with the value between 0 and 1 that may measure how close a generated entangled state may be to Bell state (e.g. perfect Bell states). Because a generated entangled state in an implementation (e.g., a real implementation) of a quantum network may differ from those four Bell states (e.g. perfect Bell states). The higher the fidelity may be, the closer the entangled state may be to a Bell state (e.g. a perfect Bell state). When the fidelity may be equal to 1, the entangled state may be identical to a Bell state.

Entanglement swapping may be a process which measures one qubit of each of two pairs of entangled qubits to generate a new pair (e.g. new pair) of entangled qubits. Entanglement swapping may be used to extend entanglement distance. For example, two qubits A and B may be entangled and may be held respectively at two physically separated nodes N1 and N2. Another pair of entangled qubits C and D may be held respectively at two physically separated nodes N2 and N3, N2 may be physically located between N1 and N2. N1 may have qubit A, N2 may have qubits B and C, and N3 may have qubit D. N2 may perform entanglement swapping (e.g. certain measurement on qubits B and C and may send feedback via a classic channel to N1 and N3) and may eventually make qubits A and D entangled with each other, which may essentially extend entanglement between N1 and N2 to between N1 and N3.

Entanglement distillation may be a process to perform on multiple pairs of entangled qubits to generate a pair (e.g. new pair) of entangled qubits with higher fidelity. For example, entanglement distillation may be used to improve the fidelity of existing entangled qubits.

Quantum Teleportation may be a quantum application or process, which may be based on quantum entanglement and may essentially realize transmitting a qubit from one location to another location, without physically transmitting any qubit, by sending two bits (e.g. two classic bits) from the sender to the receiver and leveraging a shared entanglement between the sender and the receiver.

Quantum superdense coding may be a quantum application or process, which may be based on quantum entanglement and may essentially transmit two bits (e.g. two classic bits) from one location to another location, without physically transmitting any bits (e.g. classic bit), by sending one qubit from the sender to the receiver and leveraging a shared entanglement between the sender and the receiver. Superdense coding may be an opposite operation of teleportation.

Quantum network may be a communication network that may consist of a number of quantum nodes, which may prepare qubits, transmit qubits, receive qubits, operate qubits, measure qubits, and/or the like. Two neighboring quantum nodes may be connected via a quantum channel (e.g. fiber optic, free space optic, etc.) and may be optionally connected via a classic channel. A Quantum Internet may be a large scale of quantum networks.

A quantum repeater may be a quantum node that may enable long-distance transmission of qubits using long-distance entanglement via entanglement swapping. A quantum repeater may usually be located between a source quantum node and a destination quantum node.

A quantum channel may be a communication channel connecting two quantum nodes in a quantum network for transmitting/receiving qubits between them. Optical fiber may be used as an implementation of quantum channels to transmit qubits (e.g. via photons). A time slot on a wavelength over an optical fiber may also be a quantum channel.

A classic channel may be a communication channel for transmitting/receiving classic bits. A quantum Connection may refer to the existence of a pair of entangled qubits between two quantum nodes. If two quantum nodes hold an entangled pair (e.g. each node holds one qubit of the entangled pair), it may be said that a quantum connection has been established between these two quantum nodes. Since the use of the entangled pair may leads to the exchange of bits (e.g. classic bits) between both quantum nodes, a classic channel may exist between these two quantum nodes too when they have a quantum connection.

Figure 2:
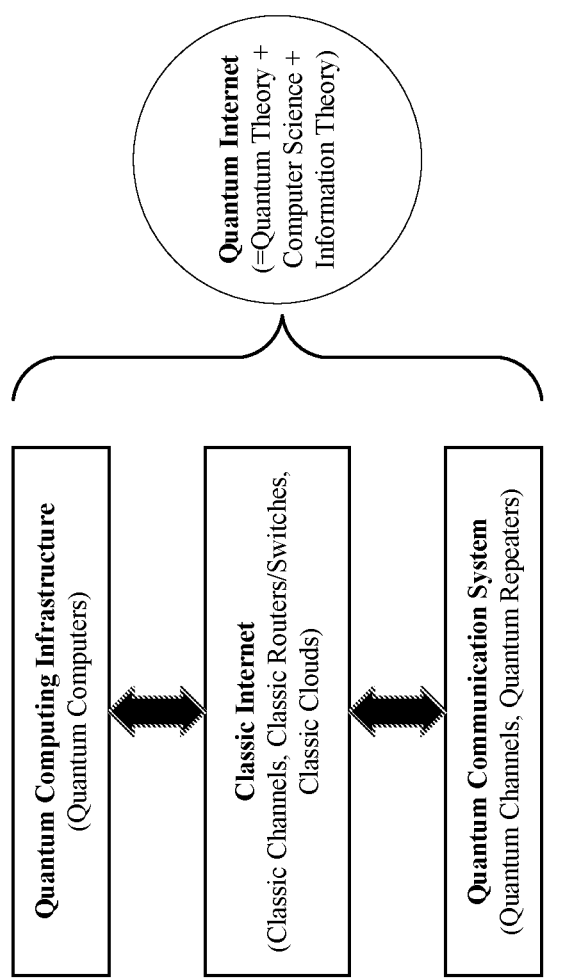
FIG. 2 shows an example quantum internet.

FIG. 2 shows an example quantum internet. The Internet Research Task Force (IRTF) has formulated a Quantum Internet Research Group (QIRG), where Quantum Internet is envisioned to bring new communication and remote computation capabilities, as well as improving the accuracy of physical sensor systems (e.g., for interferometry for long-baseline telescopes). Quantum Internet may be enabled by quantum theory, computer science, and information theory. A future Quantum Internet may be built based on the Internet (e.g. the current classic Internet) with quantum computing infrastructure (e.g. quantum computers) and quantum communication systems (e.g. quantum channels, quantum repeaters, etc.) as show in FIG. 2. FIG. 2 shows an example quantum internet.

FIG. 3 shows an example quantum network protocol stack. A quantum network protocol stack may enable a Quantum Internet. The quantum network protocol stack may comprise, a quantum physical layer, a quantum link layer, a quantum network layer, a quantum transport layer, a quantum application layer, and/or the like. The quantum physical layer may be for generating entanglement. The quantum link layer may be for achieving robust entanglement generation. The quantum network layer may be for realizing multi-hop long distance entanglement. The quantum transport layer may be for end-to-end qubit transmission. The quantum application layer may be for supporting quantum applications such as Quantum Key Distribution (QKD), quantum teleportation, quantum superdense coding, and/or the like. The quantum application layer may support improved applications (e.g. classical applications) based on quantum applications such as QKD.

A few different aspects of Quantum Internet may be addressed such as design principles, entanglement capability advertisement, quantum connection setup, quantum link layer services, and/or the like. Architecture principles for a Quantum Internet may emphasize good management solutions with sufficient monitoring capabilities. An approach may be to leverage Internet link-state routing protocols (e.g. conventional Internet link-state routing protocols) to transport/piggyback entanglement capabilities of quantum nodes in a quantum network. This approach may be like a distributed or peer-to-peer solution.

A quantum connection setup architecture may be proposed based on a RSVP-like reservation mechanism, where quantum capabilities of a quantum node (e.g. each quantum node) on a path may be connected during forward direction from a connection Initiator to a connection Responder, while rules (e.g. Condition-Action tuples) may be configured on the backward direction from the Responder to the Initiator. A quantum Link Layer Service may allow a quantum network layer to ask the link layer to create entangled qubits.

With quantum features such as superposition and entanglement, quantum communications and computing could enable more secure web applications. For example, QKD may allow security keys to be securely distributed between a HTTP client and a HTTP server. With such QKD-enabled security keys, the HTTP client and the HTTP server may establish more secure HTTP connections. In the meantime, many recent QKD protocols rely on entanglement, which may be used in quantum teleportation and quantum superdense coding.

Quantum network management may be desirable. For example, quantum network management may involve effectively creating qubits, creating entanglement qubits, distributing and maintaining entanglement in a longer distance, and/or the like. And existing standardization work in related to quantum network management have some shortcomings. For example, existing methods of distributed entanglement capabilities advertisement could cause high overhead to classic Internet and long latency in obtaining a consistent knowledge of entanglement capabilities of a quantum node (e.g. all quantum nodes). As another example, existing methods that use RSVP-like quantum connection setup may not be robust and may be time-consuming. Further, RSVP-like quantum connection setup may cause big overhead, such as when quantum nodes in the middle may change their quantum capabilities often. Existing method for link layer services are rudimentary and may be limited to the creation of entangled qubits. Further, functions for managing entangled qubits are missing from existing standardization work.

Described herein are methods, apparatus, and systems that address quantum capability management, quantum connection management, and quantum link layer services. Although these issues may not be related to each other, they may be building blocks for enabling QKD and other quantum applications. As described herein, these methods, apparatus, and systems may provide for QKD and other quantum applications.

Quantum capability management may be provided. Quantum capability may refer to quantum resources (e.g. quantum memory, quantum channel, etc.) and quantum operation abilities (e.g. entanglement creation, entanglement swapping, entanglement distillation, etc.) at a quantum node such as a quantum repeater. To enable a quantum network, it may be helpful to efficiently manage quantum capabilities of one or more quantum nodes (e.g. all quantum nodes) within the quantum network. A quantum network may consist of one or more quantum nodes (e.g. many quantum nodes), which may be connected by channels, such as quantum channels and classic channels. In addition, quantum capability may be relatively static and/or dynamically changing. This may pose a challenge for efficiently managing quantum capabilities of a quantum network.

Quantum connection management may be provided. A use of a quantum network may be to establish two (or more) entangled qubits between two (or more) quantum nodes so that such entangled qubits may be consumed to enable quantum applications such as Quantum Key Distribution (QKD), quantum teleportation, quantum superdense coding, distributed quantum applications, and/or the like. The existence of entangled qubits which may be distributed and maintained among multiple quantum nodes may be referred to as a quantum connection. As such, a quantum connection may be established by distributing entangled qubits to two or more quantum nodes. However, current quantum physics and devices set limitations on entanglement generate rate (e.g. not high) and entanglement coherence time (e.g. short). This may make it challenging to efficiently establish quantum connections. As a result, quantum connection management may be difficult even though it may be used enable distributed quantum applications (e.g. new distributed quantum applications).

Quantum link layer services may be provided. Quantum link layer may provide flexible and complete services to higher layer. Quantum Link Layer Services may be designed so that the higher layer quantum applications may easily access and manage quantum link layer in an efficient way considering the characteristics and constraints of qubits, quantum channel, entanglement, and/or the like. For example, the higher layer may need to cancel a pending request for the creation of entangled qubits.

As described herein, methods, apparatus, and systems may be used to provide a central quantum capability management with quantum capability repository. Quantum network architecture (e.g. new quantum network architecture) may be provided, which may comprise a Quantum Network Manager (QNM), Quantum Network Routers (QNRs), Quantum Network Terminals (QNTs), Quantum Network Clients (QNCs), and/or the like. The QNM may be a centralized entity to manage one or more (e.g. all) QNRs/QNTs/QNCs, and to manage a quantum capability of one or more (e.g. all) QNRs and QNTs. A quantum policy management may be where the QNM hosts quantum policies and configures/installs selected quantum policies to one or more (e.g. each) QNR/QNT. Quantum capability registration, update, retrieval, deletion, solicitation, subscription and discovery may be provided, where quantum capability of one or more (e.g. each) QNR/QNT may be registered to the QNM, may be solicited by the QNM, may be subscribed by other QNRs/QNTs/QNCs from the QNM, and/or may be discovered by other QNRs/QNTs/QNCs from the QNM.

As described herein, methods, apparatus, and systems may be used to provide a centralized quantum connection management which buffers quantum connection reservation requests at a Quantum Connection Manager (QCM) or at quantum network nodes (QNN). Based on some policies, a QCM may send a request to a QNN to create entangled qubits at the QNN. The QNN may also optionally distributed the entangled qubits to its neighboring QNNs.

A QCM may receive quantum connection reservation requests from a QNC for establishing a quantum connection between a source QNT and a destination QNT. It may buffer requests locally or at a QNN. A buffered reservation request may be triggered at a later time, and either QCM or the QNN may start to trigger entanglement swapping at one or more (e.g. each) QNR(s) on the way from the source QNT to the destination QNT.

A QNC may send a request to QCM to create a connection, such as a quantum connection and a classic connection, jointly between a source QNT and a destination QNT. The QCM may send an instruction to create a quantum connection and then may command the source QNT to establish a connection (e.g. classic connection) with the destination QNT.

A QCM may proactively establish quantum connections among different QNTs and provide them as a service to QNCs. For example, a QNC may request existing quantum connections from QCM, the QCM may allocate a quantum connection to the QNC, the allocated quantum connection may be used and consumed to support quantum applications such as QKD, and the QNC or the source (or destination) QNT of the allocated quantum connection may send a notification to QCM.

As described herein, methods, apparatus, and systems may be used to provide a set of quantum Link Layer Services. A set of quantum Link Layer Services (e.g. new quantum Link Layer Services) such as periodical entanglement creation may be used for a quantum network node. Advanced entanglement creation may be provided. A higher layer may request the quantum link layer to create entangled qubits with one or more requirements such as the lifetime of entangled qubits, the need for distributing one entangled qubit to another quantum network node, and/or the like.

Periodical entanglement creation may be provided. A higher layer may request the quantum link layer to create entangled qubits periodically. Such periodical entanglement creation may enable periodical QKD and may enable periodical change of security keys.

Updating pending entanglement creation requests may be provided. A higher layer may request the quantum link layer to update some parameters related to a pending entanglement creation request. As a result, the quantum link layer may use values (e.g. new values) of these parameters to process the pending request to create entangled qubits (e.g. new entangled qubits).

Cancelling pending entanglement creation requests may be provided. A higher layer may request the quantum link layer to remove a pending entanglement creation request.

Querying existing entanglement creation requests may be provided. A higher layer may query the status and related parameters of an existing entanglement creation request which may have been received at the quantum link layer.

Triggering qubit measurements may be provided. A higher layer may request the quantum link layer to measure some qubits. The quantum link layer may store the measured results or return it to the higher layer.

Configuring/querying quantum statistics may be provided. A higher layer may configure the quantum link layer to calculate and collect some quantum statistics, which may in turn be retrieved/queried by the higher layer.

Entanglement distribution may be provided. A higher layer may trigger the quantum link layer to distribute one or more entangled qubits to other quantum network node(s).

Triggering entanglement swapping may be provided. A higher layer may trigger the quantum link layer to perform entanglement swapping over two or more sets of entangled qubits to generate a set (e.g. new set) of entangled qubits.

Triggering entanglement distillation may be provided. A higher layer may trigger the quantum link layer to perform entanglement distillation over two or more sets of entangled qubits to improve the fidelity of one set of entangled qubits.

Automatic entanglement swapping and distillation may be provided. A higher layer may configure some entanglement swapping/distillation policies to the quantum link layer so that the quantum link layer may trigger (e.g. automatically trigger) and perform entanglement swapping and distillation based on the configured policies.

As described herein, methods, apparatus, and systems may be used to provide a quantum network entity that may be a quantum network manager. A quantum capability registration request may be received from a first quantum network node which contains quantum capability information about the first quantum network node. The registration request may be verified to determine if it is authorized. A first quantum capability record may be created which may comprise quantum capability information about the first quantum network node. A first response message indicating if the registration request is successful may be generated. The first response message may be sent to the first quantum network node indicating the identifier of the first quantum capability record. A quantum capability operation request may be received from a second quantum network node that may indicate a first quantum operation, which may be to update, retrieve, and/or delete a second quantum capability record. It may be verified if the first quantum operation on the second quantum capability record is allowed. The first quantum operation may be executed and may generate a first result. A second response message including the first result may be generated. The second response message may be sent to the second quantum network node. A quantum capability solicitation request may be sent to a third quantum network node for soliciting one or more quantum capabilities of the third quantum network node. A third response message may be received from the third quantum network node indicating the solicited quantum capabilities. A third quantum capability record may be created that may comprise the solicited quantum capabilities. A quantum capability discovery request may be received from a fourth quantum network node which contains a discovery criterion. It may be verified if the quantum capability discovery request is allowed. A list of quantum capability records and/or a list of quantum network nodes which match the discovery criterion may be identified. A fourth response message including the list of quantum capability records and/or the list of quantum network nodes which match the discovery criterion may be generated. The fourth response message may be sent to the fourth quantum network node. A quantum capability subscription request may be sent to a fifth quantum network node for subscribing on the changes of one or more quantum capabilities of the fifth quantum network node. A quantum capability notification message may be received from the fifth quantum network node indicating the subscribed changes of one or multiple quantum capabilities. A fourth quantum capability record which contains the subscribed changes of one or multiple quantum capabilities may be created. A fifth response message containing an identifier of the fourth quantum capability record may be generated. The fifth response message may be sent to the fifth quantum network node.

A quantum network manager may be a network function (e.g. a new network function) in a 5G and beyond core network, a service (e.g. a new service) in broadband access systems, a service (e.g. new service) in satellite networks, a service (e.g. new service) in vehicular networks, and/or the like.

Centralized quantum capability management may be provided. A (e.g. each) quantum network node may have some quantum capability including quantum resources such as quantum memory, capability for performing entanglement swapping, capability for performing entanglement distillation, capability for supporting quantum applications such as Quantum Key Distribution (QKD), and/or the like. To manage quantum capability of quantum network nodes in a quantum network efficiently, a centralized approach for quantum capability management may be used. A quantum network architecture (e.g. a new quantum network architecture), may comprise a Quantum Network Manager (QNM), Quantum Network Routers (QNRs), Quantum Network Terminals (QNTs), Quantum Network Clients (QNCs), and/or the like. The QNM may be a centralized entity to manage one or more (e.g. all) QNRs/QNTs/QNCs, and quantum capability of one or more (e.g. all) QNRs and QNTs. Quantum policy management may be provided where the QNM hosts quantum policies and configures/installs selected quantum policies to one or more (e.g. each) QNR/QNT. Quantum capability registration, update, retrieval, deletion, solicitation, subscription and discovery may be provided, where quantum capability of one or more (e.g. each) QNR/QNT may be registered to the QNM, may be solicited by the QNM, may be subscribed by other QNRs/QNTs/QNCs from the QNM, and may be discovered by other QNRs/QNTs/QNCs from the QNM.

Figure 4:
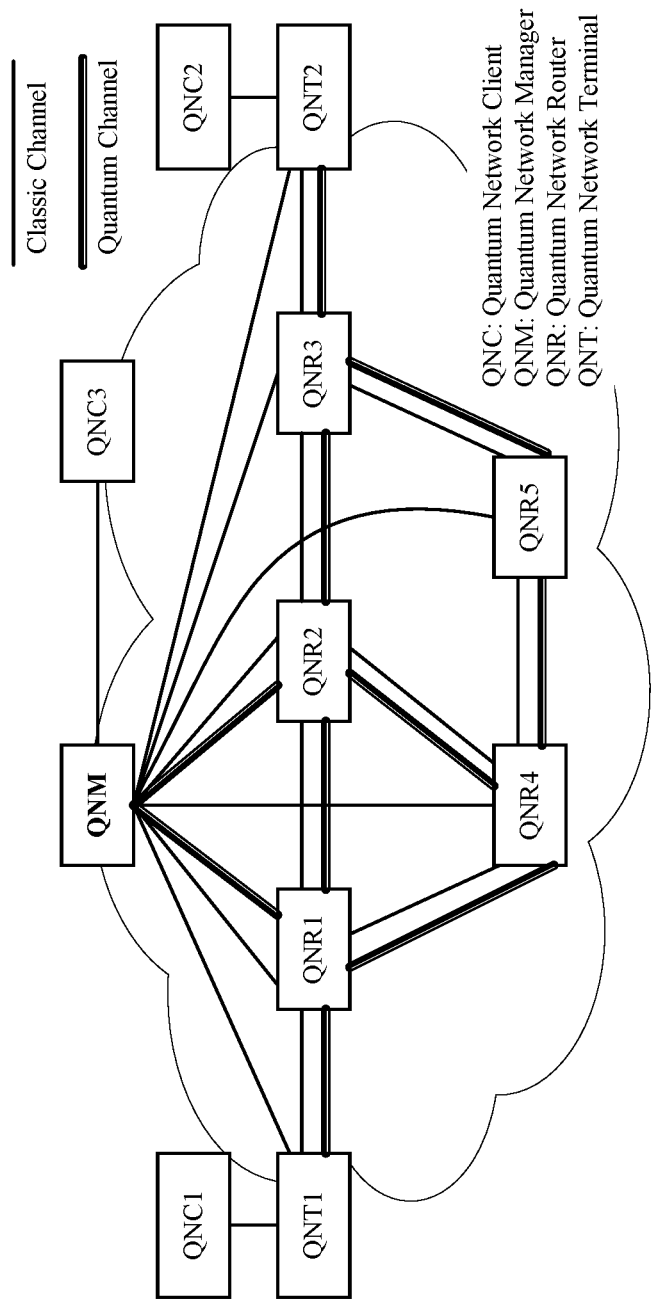
FIG. 4 shows an example quantum network architecture with a centralized manager.

FIG. 4 shows an example quantum network architecture with a centralized manager. For example, FIG. 4 illustrates a proposed quantum network architecture with a centralized Quantum Network Manager (QNM). Three types of entities that may be included in this architecture include Quantum Network Router (QNR), Quantum Network Terminal (QNT), and Quantum Network Client (QNC). For ease of explanation, QNTs and QNRs may be referred to as Quantum Network Nodes (QNNs).

A number of QNM functionalities may be provided. A QNM may be responsible to monitor, control, and manage the quantum network including one or more (e.g. all) QNRs, QNTs, and QNCs. A QNC may issue requests to QNM to instruct when/how/what to monitor/control/manage the quantum network. For example, QNM may request one or more (e.g. all) QNRs/QNTs to report their quantum capabilities and status (e.g., quantum memory, quantum entanglement, etc.) one or more times, at a periodicity, and/or the like. QNM may also instruct a QNR to generate entangled qubits at a time, instruct a QNR to distribute entangled qubits to two other quantum nodes (e.g. QNT or QNR), select an effective path (e.g. a pair of entangled qubits exists or may be created on each hop) between two QNTs, and/or instruct a QNR to perform entanglement operations such as entanglement swapping. QNM may install some instructions onto QNRs/QNTs beforehand so that they may be ready in advance for generating and managing qubits, since quantum coherence time may be relatively short, and it may also take time to generate entangled qubits. QNM may calculate quantum statistics (e.g. short-term and long-term quantum fidelity) such as for predictive analysis for QNRs/QNTs using Machine Learning (ML) and Artificial Intelligence (AI) on the reported data from QNRs/QNTs. Such quantum statistics may equip the QNM with the intelligence to be able to select best paths for one or more (e.g. two) QNTs.

Figure 5:
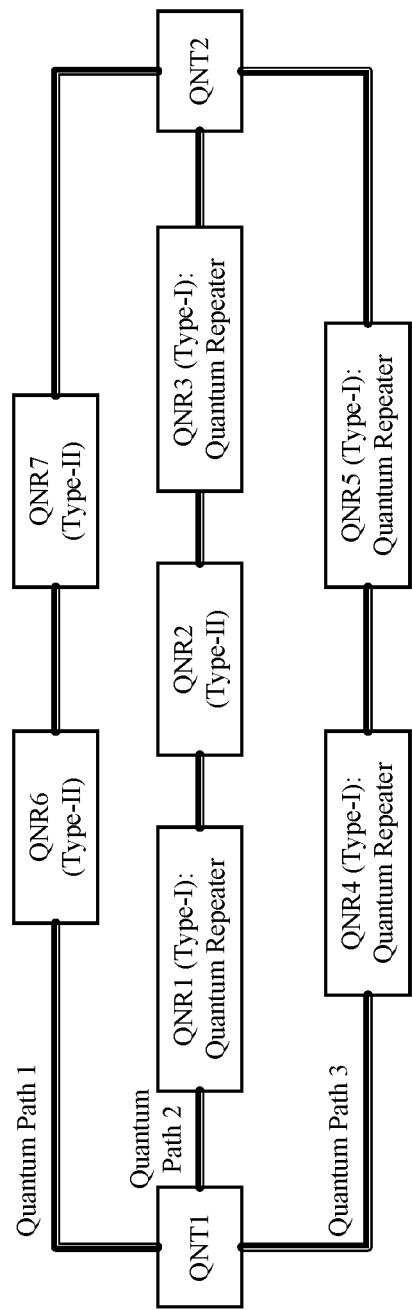
FIG. 5 shows an example of end-to-end quantum paths.

QNR functionalities may be provided. A QNR may be a quantum repeater (Type-I) or a router (e.g. a full-fledged router) with quantum repeater function and other routing-related functions (Type-II). A quantum connection may be established between two QNRs, or between one QNR and one QNT. For example, two QNRs on path1 on FIG. 5 are Type-II QNRs, while Type-I QNRs may be on path2 and path3. FIG. 5 shows an example of end-to-end quantum paths.

QNT functionalities may be provided. QNTs may be able to generate and store qubits. QNts may be able to prepare entangled qubits. QNTs may not have quantum repeater functions (e.g. entanglement swapping, entanglement distillation, etc.) or routing-related functions. QNTs may provide interfaces for QNCs to use the quantum network. A quantum connection (e.g. a pair of entangled pairs distributed at two QNNs) may be established between two QNTs, which may be located in a long distance but connected through multiple end-to-end quantum paths where some QNRs stay in the middle. For example, FIG. 5 shows an example, where three end-to-end quantum paths exist between QNT1 and QNT2.

QNC functionalities may be provided. QNCs may be quantum users and/or quantum applications that use the quantum network. A QNC may interact with a QNT via a channel (e.g. a classic channel) in order to leverage the quantum network, for example, leverage a quantum connection between two QNTs. A QNC may also act as a management client which may directly interface to QNM via one or more channels (e.g. classic channels), such as QNC3 on FIG. 4.

A classic channel and a quantum channel shown in FIG. 4 may be logical channels, which may be supported on two different physical channels or one physical channel. For example, a wavelength on an optic fiber could be time-slotted to allocate some slots as a classic channel and other slots for a quantum channel.

Figure 6:
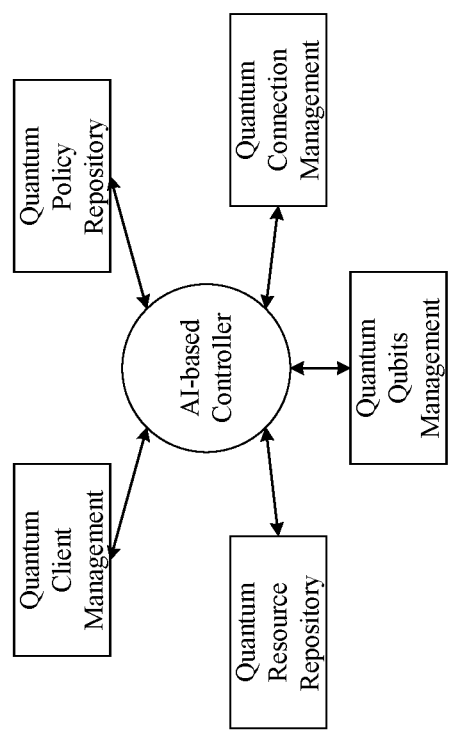
FIG. 6 shows an example quantum network manager (QNM) functions.

FIG. 6 shows an example QNM functions. For example, FIG. 6 illustrates modular functions of a QNM which may include an AI-based controller, a quantum user management, a quantum policy repository, a quantum resource repository, a quantum qubits management, and a quantum connection management, and/or the like. These modular functions may be logical ones and may be deployed at one physical node or in multiple physical nodes. These modular functions may be coordinated by AI-based Controller or they may directly interact with each other.

Quantum client management functionality may be provided. This function may manage one or more QNCs including client authentication and authorization, client access control, client history management, and/or the like. AI-based controller may be leveraged by this function to efficiently and automatically analyze QNC history to obtain QNC behaviors and other useful information.

Quantum policy repository functionality may be provided. This function may be responsible for policy management which may include storing quantum policies and distribute selected quantum policies to one or more QNRs and/or QNTs. Through this function, a QNC may also retrieve and update quantum policies based on its access right.

Quantum resource repository functionality may be provided. This function may store static information (e.g. relatively static information) about quantum capabilities (e.g. supported entanglement swapping protocol, size of quantum memory, quantum fidelity, quantum channel, and/or the like) at one or more (e.g. each) QNR/QNT. The topology information of the quantum network may also be stored at the quantum resource repository. For example, a QNT or a QNR may actively register itself including their quantum capabilities to the quantum resource repository and may even update them at a later time. The QNM may send a request to a QNT/QNR to solicit its quantum capabilities. An AI-based controller may leverage the stored quantum capabilities information to find one or more quantum paths (e.g. the best quantum paths) between two QNTs.

Quantum qubit management functionality may be provided. This function may monitor and manage qubits at one or more (e.g. each) QNT/QNR. For example, a QNT/QNR may periodically report its generated qubits information to this function. This function may also instruct a QNT/QNR to prepare a qubit, to generate a pair of entangled qubits, to measure a qubit, to send a qubit to another QNR/QNT, to operate existing qubit(s) with a quantum logic gate, and/or the like. An AI-based controller may be leveraged to analyze qubit generation and usage history to estimate and predict quantum fidelity at a QNT/QNR. This function may actively pull qubit-related information from a QNT/QNR or wait for the QNT/QNR to push qubit-related information.

Quantum connection management functionality may be provided. This function may manage entanglement related information and operations. A QNC (or a QNT) may ask this function to create a quantum connection between two QNTs. This function may find one or more (e.g. the best) quantum paths between the two QNTs with the aid of AI-based Controller or Quantum Resource Repository. This function may demand the two quantum nodes of one or more (e.g. each) hop(s) of the selected quantum path to create one or more entangled qubits. This function may instruct one or more (e.g. each) QNR on the path to perform entanglement swapping (e.g. which may be performed together with entanglement distillation) to create two entangled qubits: one at the source QNT and the other at the destination QNT. This function may check with Quantum Policy Repository to enforce appropriate policies. AI-based Controller may also be leveraged to analyze connection establishment history and predict future connect requests.

An AI-based controller functionality may be provided. This function may provide intelligence services to one or more of the functionalities disclosed herein.

Figure 7:
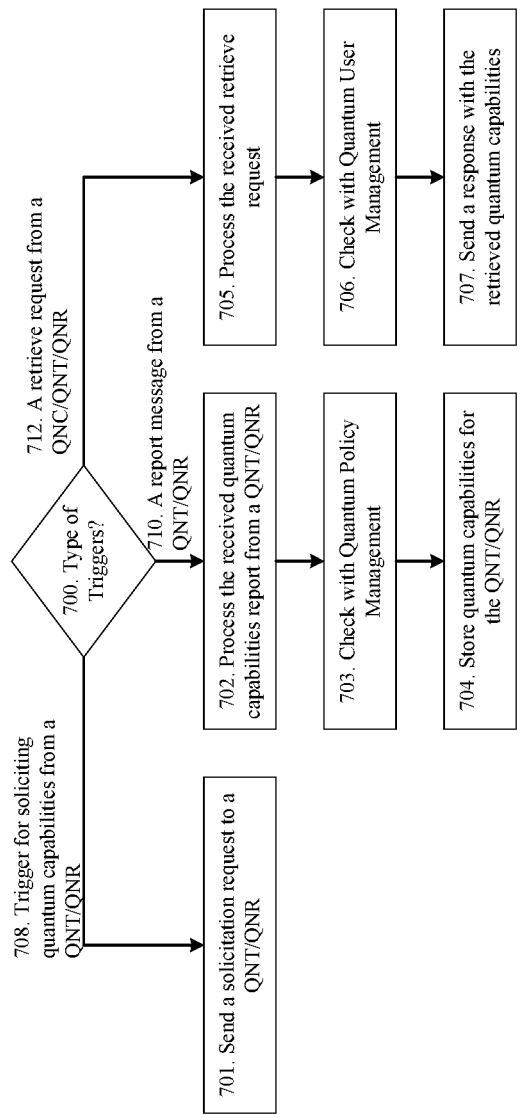
FIG. 7 shows an example flowchart of a quantum resource repository in a QNM.

FIG. 7 shows an example flowchart of a quantum resource repository in QNM. For example, FIG. 7 illustrates a flowchart for managing quantum capabilities as a part of quantum resource repository, where there may be a number of actions that may be dependent on the type of triggers QNM receives at 700. At 708 in FIG. 7, a QNM may be periodically triggered to solicit quantum capabilities of a QNT/QNR. For this purpose, it may send a solicitation request to the QNT/QNR at 701. This solicitation request 701 may indicate the type of quantum capabilities to be solicited.

At 710 in FIG. 7, a QNM may receive a report message from a QNT/QNR. The report message may be a registration message through which the QNT/QNR may register their quantum capabilities to QNM. The report message may be an update message through which the QNT/QNR may update their quantum capabilities as stored at QNM. The report message may be a response message to the solicitation request as sent by QNM to the QNT/QNR in at 701 in FIG. 7, which may contain the values of solicited quantum capabilities. The QNM may process the received quantum capabilities report from the QNT/QNR at 702. The QNM may check with Quantum Policy Management at 703 to apply any policies, which may be related to the received report message and the reported quantum capabilities of the QNT/QNR. The QNM may store quantum capabilities for the QNT/QNR at 704.

At 712 in FIG. 7, a QNM may receive a retrieval request from a QNC/QNT/QNR. The QNM may process the received retrieve request at 705. The QNM may check with quantum user management function at 706 to verify if the QNC/QNT/QNR has the right to retrieve quantum capabilities information from QNM. If it does have the retrieval right, QNM may send a response that may include the retrieved quantum capabilities information to the QNC/QNT/QNR at 707.

As described herein, a quantum network may co-exist with and be implemented as a part of 5G and beyond cellular network, a satellite-assisted cellular network, a fiber-to-the-home broadband access network, and/or the like. As such, the QNM, QNR, QNT, and QNC may map to different entities in these networking systems as described in Table 1:

TABLE 1

Embodiments of Quantum Networks

| Nodes | Scenario 1: 5G and Beyond Cellular Networks | Scenario 2: Satellite-Assisted Vehicular Networks | Scenario 3: Fiber-To-The-Home Broadband Access Networks |
|---|---|---|---|
| QNM | A new network function in core network or even at the edge | A new service in vehicular network service platform or in a roadside unit | A new service in broadband access networks |
| QNR | Satellites (if base stations connect to satellite networks), backhaul routers | Satellites, Roadside Units, Vehicles | Broadband access routers |
| QNT | Base stations, edge servers, user equipment (if having quantum link to base stations) | Vehicles | Customer premises equipment |
| QNC | User equipment, applications on user equipment, etc. | Applications, users, devices in or attached to a vehicle, etc. | Home devices, applications on customer premises equipment |

In an embodiment, the QNM may be a network function (e.g. a new network function) in 5G and beyond core network, a service (e.g. a new service) in broadband access systems, a service (e.g. a new service) in satellite networks, a service (e.g. a new service) in vehicular networks, and/or the like.

In an embodiment, a QNR may be a base station in cellular network, a satellite, a vehicle that has a quantum channel (e.g. satellite link or free space optic) to other network nodes, a backhaul router in cellular networks, a broadband access router, and/or the like.

In an embodiment, a QNT may be a vehicle that has a quantum channel (e.g. satellite link or free space optic) to other network nodes, a Customer Premises Equipment (CPE) that has a fiber optic as quantum channel, a satellite, a satellite ground station, a User Equipment (UE) in cellular networks that has quantum channel to other UEs or to its base station, a base station in cellular networks, and/or the like. In an embodiment, a QNC may be a User Equipment (UE) in cellular networks, home devices that connects to a CPE, and/or the like.

Figure 8:
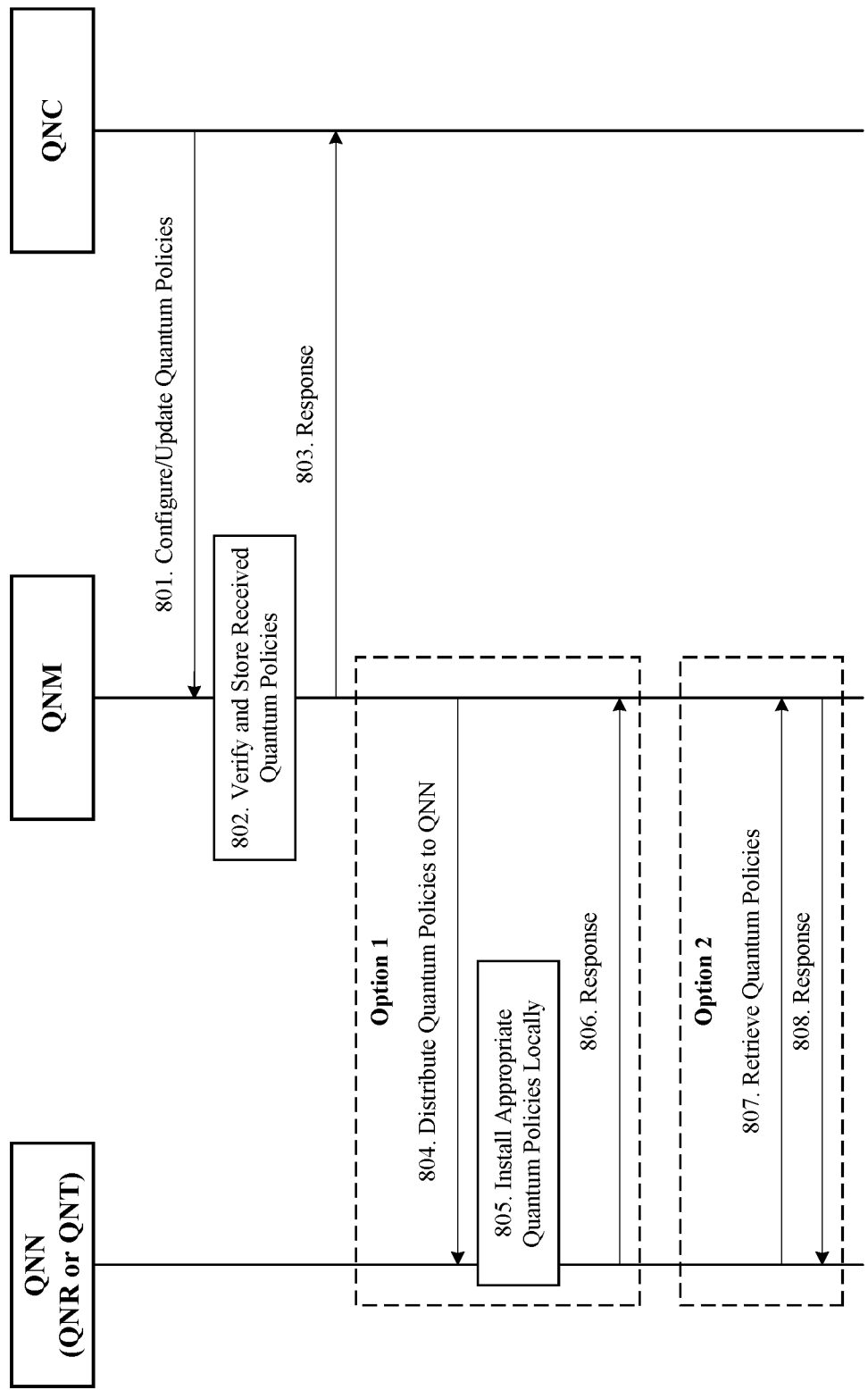
FIG. 8 shows an example flow chart for quantum policy management.

Quantum policy management may be provided. FIG. 8 shows an example flow chart for quantum policy management. A QNC may configure some quantum policies to a QNM. The QNM may maintain quantum policies. The QNM may also distribute and install selected quantum policies to a QNN. A QNN may check and access quantum policies from a QNM. The QNC may also directly configure quantum polices at the QNN if it is authorized to do so.

At 801 in FIG. 8, the QNC may sends a request to QNM to configure quantum polices (e.g. new. quantum policies) and/or update some existing quantum policies. The QNC may also indicate which quantum policies may be distributed to any particular QNNs. At 802, the QNM may verify and stores the received quantum policies. At 803, the QNM may send a response to the QNC to indicate whether the requested quantum policy configuration/update was or was not successful. At 804, the QNM may distribute one or more quantum policies to the QNN, which may be indicated at 1 by the QNC or may be selected by the QNM. At 805, the QNN may receive one or more quantum policies (e.g. new quantum policies) and may install them, for example, locally. The QNN may use the quantum policies (e.g. the new quantum policies), which may be associated with the request at 804, to replace existing quantum policies it may maintain locally. At 806, the QNN may send a response to QNM to indicate whether the request at 804 was or was not successfully performed. At 807, the QNN may send a request to the QNM to retrieve any quantum polices, which meet one or more criteria. At 808, the QNM may send a response to the QNN, which may contain the content of quantum policies being retrieved.

As shown in FIG. 8, there is no dependency between Option 1 and Option 2. For example, either option could be taken in any order.

A QNM may be responsible for managing quantum capabilities at one or more (e.g. each) Quantum Network Node (QNN) in a quantum network. A QNM may support a number of functions. A QNM may support that one or more (e.g. each) QNN (which may be a QNR or a QNT) may register or report its quantum capabilities to the QNM. The QNM may subscribe to a QNN for getting notifications on its selected quantum capabilities. The QNM may maintain quantum capabilities of one or more (e.g. all) QNN(s). The QNM may support that one or more (e.g. each) QNN may update their quantum capabilities as stored in the QNM. The QNM may support that one or more (e.g. each) QNN may delete their quantum capabilities as stored in the QNM. QNM may actively query quantum qualities from the target QNN. The QNM may support that a QNN may discover and retrieve quantum capabilities of other QNNs from the QNM. The QNM may support that a QNN may discover other QNNs from QNM. The QNM may support that a QNN may subscribe to changes of quantum capabilities of other QNNs. The QNM may send notifications to a QNN which, as a subscriber, may have subscribed to changes of quantum capabilities of other QNNs. The QNM may support that one or more (e.g. each) QNN may report their network neighbors (e.g. classic network neighbors) and topology information to QNM. If the network neighbors (e.g. classic network neighbors) and topology information of one or more (e.g. all) QNNs may be maintained at a third-party network entity such as a Path Computation Element (PCE), QNM may interface to and interact with the third-party network entity to get the network neighbors (e.g. classic network neighbors) and topology information of one or more (e.g. all) QNNs.

Figure 9:
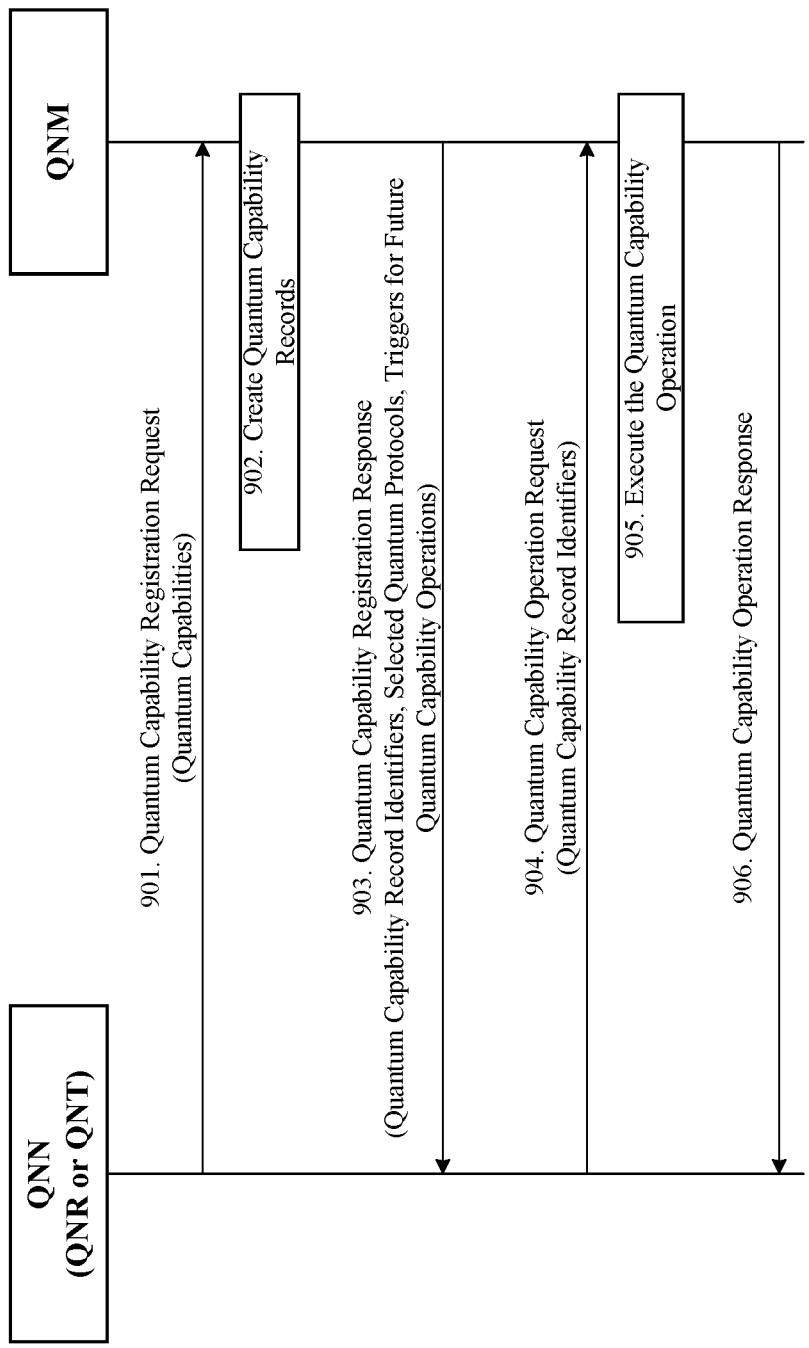

FIG. 9 shows an example flow chart for quantum capability registration and operations, such as solicitation, update, retrieval, deletion, subscription, discovery, and/or the like. For example, FIG. 9 may illustrate a procedure for quantum capability registration and operations. Quantum capability registration may allow a QNN to register itself and its quantum capability to QNM. Quantum capability operations may enable a QNN to update/delete/retrieve a quantum capability record, and/or to subscribe to changes on quantum capabilities of other QNNs.

At 901 in FIG. 9, A QNN may send a quantum capability registration request to the QNM. This message may include the identifier of the QNN and one or more (e.g. all) of its current quantum capabilities (e.g., the size of quantum memory, the capability for performing entanglement swapping and distillation, and/or the like).

At 902 in FIG. 9, the QNM may create a quantum capability record for one or more (e.g. each) registered quantum capability. The QNM may use different ways to store one or more (e.g. all) created records for a QNN. For example, the QNM may allocate a different directory for one or more (e.g. each) QNN(s) to store one or more (e.g. all) of its quantum capability records.

A (e.g. each) quantum capability record may be in the form of a quadruple with four attributes (e.g. recordID, qcName, qcValue, qcLifetime). The attribute recordID may be the identifier of this record, The attribute qcName may be the type or name of the quantum capability. The attribute qcValue may be the value of the quantum capability. The attribute qcLifetime may show the effective time of this record. For example, a record may be (recordID1, quantumMemory, 40, infinite), which may represent that the quantum memory may store 40 qubits for any time.

At 903 in FIG. 9, the QNM may send a response to the QNN. In the response message, the QNM may indicate the identifier of the created quantum capability record. The QNM may also select one or more quantum protocols (e.g. an entanglement swapping protocol) for the QNN and may include them in the response message. The QNM may include some triggers in this message to instruct the QNN to initiate one or more quantum operations at a future time. For example, a trigger be a request that the QNN reports its quantum capabilities after some time.

At 904 in FIG. 9, a QNN may send a quantum capability operation request to the QNM. The request may indicate the type of quantum capability operations, which may be one of the following:

A scenario may be to update an existing quantum capability record. In this case, the request may also include the identifier of an existing quantum capability record and one or more values (e.g. new values) of other attributes to be updated.

A scenario may be to delate an existing quantum capability record. In this case, the request may also include the identifier of an existing quantum capability record to be deleted.

A scenario may be to retrieve an existing quantum capability record. In this case, the request may also include the identifier of an existing quantum capability record to be retrieved. The QNM may return the content of this record (e.g. values of one or more attributes of this record) to the QNN at 906.

A scenario may be to subscribe to changes on existing quantum capability records, changes on quantum capabilities of another QNN, and/or the like. In this case, the request may also include the identifiers of existing quantum capability records being subscribed, and/or the identifier of another QNN.

At 905 in FIG. 9, the QNM may execute the quantum capability operations that may have been requested at 904. For a scenario mentioned at 904, the QNM may perform one or more of the following actions:

Look up the designated quantum capability record and update it using record attributes contained at 904.

Lookup the designated quantum capability record and simply delete it.

Lookup the designated quantum capability record and contain its content in a response message to be sent back to QNN at 906.

Store the subscription information and to be ready for generating notifications to QNN once an expected change (such as those indicated at 904) occur.

At 906 in FIG. 9, the QNM may send a response to the QNN. The content of this response message may depend on the one or more of the scenarios at 904. For example, one or more the following may be performed:

The response message may indicate if the update operation was or was not successful.

The response message may indicate if the delete operation was or was not successful.

The response message may contain the content of the quantum capability record being retrieved.

The response message may indicate if the subscription was or was not successful.

With reference to FIG. 9, actions performed at 902 and 904 may be issued from different QNNs. A QNN may use 902 to register its quantum capabilities, while another QNN may use 904 to operate its own quantum capability records that may be stored at the QNM or to manipulate quantum capability records which may be registered by other QNNs.

FIG. 10 shows an example quantum capability solicitation and subscription. For example, FIG. 10 illustrates a procedure for the QNM to actively solicit quantum capabilities from a QNN, or subscribe to a QNN for any desired changes to its quantum capabilities. At 1000, a QNN may or may not have registered its quantum capabilities to the QNM. At 1001, the QNM may send a quantum capability solicitation request to the QNN. This request may contain the type/name/identifier of the quantum capability to be solicited. At 1002, the QNN may check its current quantum capabilities and may send them in a response to the QNM. At 1003, the QNM may send a quantum capability subscription request to the QNN, so that the QNN may send (e.g. may automatically send) notifications to the QNM in future whenever quantum capability of the QNN may be changed and may meet certain designated criteria. At 1004, the QNN may send a response to the QNM to indicate if the subscription has been successful or not. At 1005, the QNN's quantum capability changes and the changes that may meet notification criteria at 1003 may be determined. At 1006, the QNN may send a notification to the QNM, which may contain the changed quantum capabilities (e.g. newly changed quantum capabilities). At 1007, the QNM may send a response to the QNN as an acknowledge to the notification received at 1006.

Figure 11:
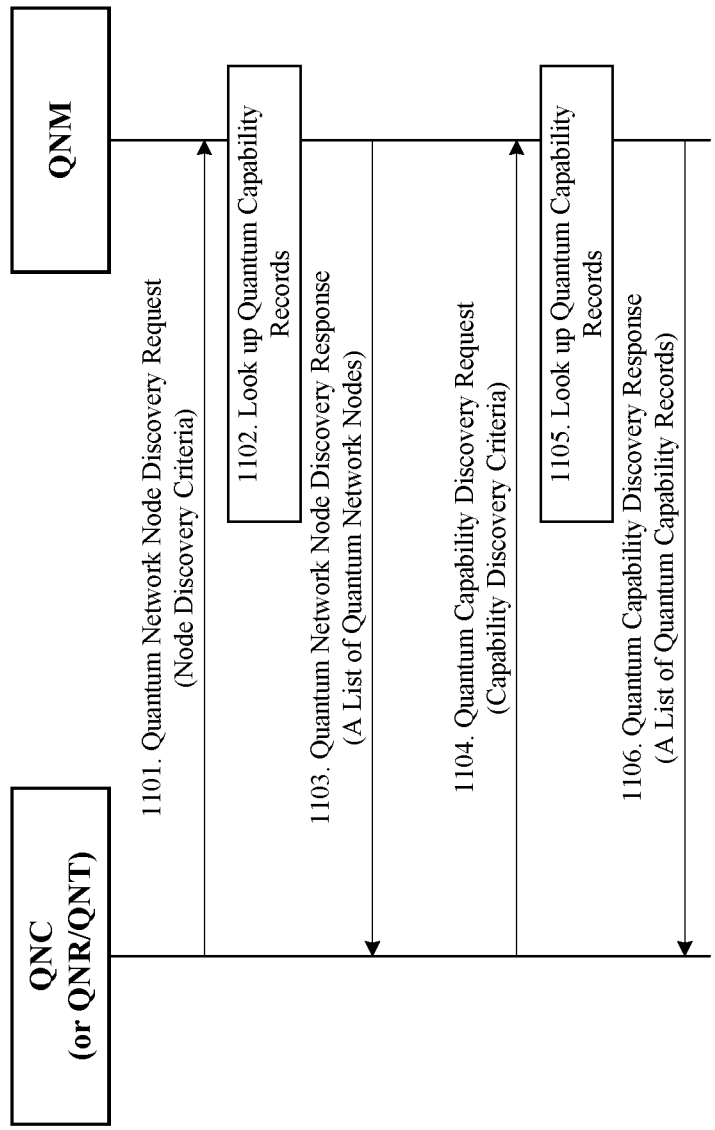
FIG. 11 shows an example flow chart for a discovery of quantum network nodes and their capability.

FIG. 11 shows an example flow chart for a discovery of quantum network nodes and their capability. For example, FIG. 11 shows a procedure for a QNC (or a QNN) to discover other QNNs and their quantum capabilities from the QNM. At 1101, a QNC may send a quantum network node discovery request to the QNM, which may include one or more node discovery criteria in order to discover one or more QNNs. At 1102, the QNM may take the discovery criteria at 1101 as inputs to look up its maintained quantum capability records to find a quantum network node whose quantum capability may match the criteria. At 1103, the QNM may send a response to the QNC, which may contain a list of quantum network nodes whose quantum capability may match the criteria. At 1104, the QNC may send a quantum capability discovery request to QNM, which may contain capability discovery criteria (e.g. one or more quantum network node identifiers) in order to discover their capability. At 1105, the QNM may search its maintained quantum capability records against the criteria from 4. At 1106, the QNM may send a response to the QNC, which may include the list of quantum capability records of those quantum network nodes as designated at 1104.

In FIG. 11, the QNC may discover one or more (e.g. both) quantum network nodes and their capability at or near the same time. For example, the QNC may perform 1101 and 1104 at approximately same time. The QNC may decide to execute 1101-1103 without proceeding further to discover one or more QNNs with quantum capability that match a criterion. The QNC may decide to execute 1104-1106 without 1101-1103 to discover quantum capability of one or more QNNs.

Centralized quantum connection management may be provided. Quantum Network Nodes (QNNs) in a quantum network may comprise Quantum Network Terminals (QNT) and Quantum Network Routers (QNTs). A QNR may support entanglement operations (e.g. advanced entanglement operations) such as entanglement swapping and entanglement distillation. A QNT may not have such capability. A quantum connection may be established between two QNTs, which if spanning multiple hops may use one or more QNRs along a quantum path to perform entanglement swapping to create an end-to-end quantum connection. A quantum connection between two QNNs (e.g. QNN-1 and QNN-2) may be a pair of entangled qubits (e.g. Qubit-A and Qubit-B) may have been created and distributed to these two QNNs. For example, QNN-1 may hold Qubit-A while may QNN-2 hold Qubit-B. Quantum connection may be impacted (e.g. heavily impacted) and limited by entanglement generation, entanglement swapping, and/or other factors.

Current quantum physics and devices may lead to a low entanglement generate rate and a short entanglement coherence time. For example, it may take time to create a quantum connection and one or more (e.g. each) created quantum connection(s) may elapse quickly.

As described herein, these constrains may be addressed using a centralized quantum connection management, where a Quantum Connection Manager (QCM) may be proposed as a logic function or service. The QCM may be responsible for generating entangled bits at one QNN or two neighboring QNNs, receiving quantum connection requests from a Quantum Network Client (QNC) and establishing a quantum connection between a source QNT and a destination QNT, jointly establishing a quantum connection and a classic transport connection, and/or the like.

Based on some policies, a QCM may send a request to a QNN to create entangled qubits at the QNN. The QNN may also distribute the entangled qubits to its neighboring QNNs.

A QCM may receive one or more quantum connection reservation requests from a QNC for establishing a quantum connection between a source QNT and a destination QNT. The QCM may buffer requests locally or at a QNN. A buffered reservation request may be triggered at a later time, and the QCM or the QNN may trigger entanglement swapping at one or more (e.g. each) QNR(s) on the way from the source QNT to the destination QNT.

A QNC may send a request to QCM to create a connection, such as a quantum connection and a classic connection, jointly between a source QNT and a destination QNT. For example, the QCM may instruct the creation of a quantum connection and then command the source QNT to establish a classic connection with the destination QNT.

A QCM may proactively establish quantum connections among different QNTs and may provide them as a service to QNCs. For example, a QNC may request existing quantum connections from the QCM. The QCM may allocate a quantum connection to the QNC. The allocated quantum connection may be used and consumed to support quantum applications such as QKD. The QNC or a QNT of the allocated quantum connection (e.g. source QNT and/or destination QNT) may send a notification to the QCM.

Although embodiments described herein may describe an entanglement that contains two qubits, the embodiments are applicable to and may be extended to scenarios or cases where an entanglement contains more than two qubits as well.

Figure 12:
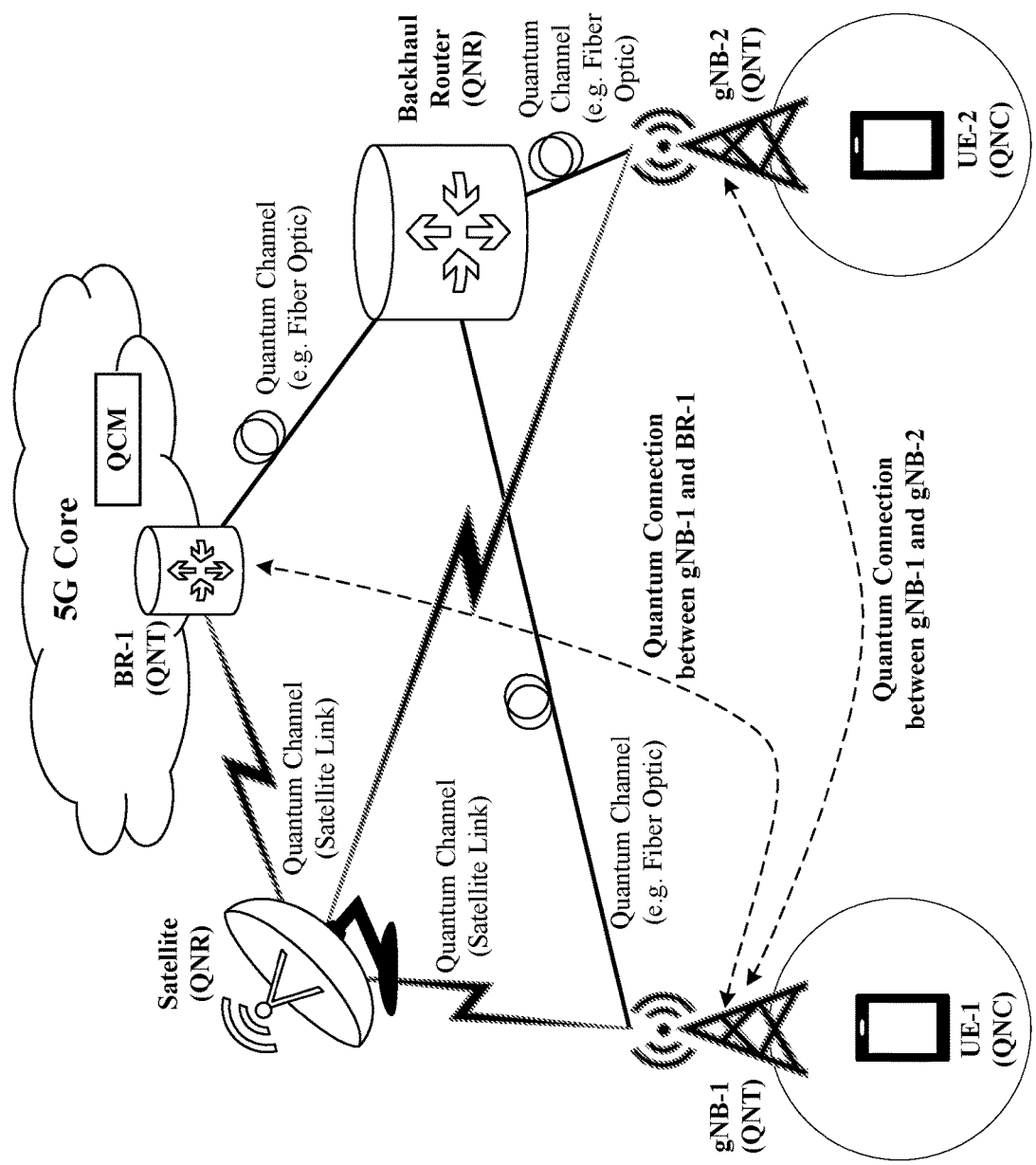
FIG. 12 shows an example embodiment of quantum connection management in a fifth-generation (5G) mobile cellular communications system.

FIG. 12 shows an example embodiment of quantum connection management in a 5G system. As shown in FIG. 12, the embodiments described herein may be implemented in 5G wireless networks. In such a system, there may not be a quantum channel between a User Equipment (UE) and next-generation base station (gNB). There may be a quantum channel such as free space optics between two neighboring gNBs. There may be one or more aggregation nodes or Backhaul Routers (BRs) connecting gNB to 5G core network based on fiber optics, free space optics, satellite links, and/or the like, which may be used as a quantum channel between gNB and BRs and between BRs and 5G core network. BRs may be satellites, which may provide satellite links as a quantum channel to gNB and to 5G core network.

QCM may be implemented as a network function (e.g. new network function) to be deployed in 5G core network and/or its edge networks. QNC may be a software module in a UE. A UE may host one or more QNCs. QNT may be implemented as a part of a gNB. A gNB may host one or more QNTs. A QNT may serve multiple QNCs, like that a gNB may support many UEs in its coverage. A source QNT may be gNB-1 and a destination QNT may be gNB-2. A QNR may be implemented as a part of backhaul routers, which may have optical fiber (or even free space optics) to gNBs, other backhaul routers, and 5G core network.

UE-1 may request to have more secure communications with UE-2. UE-1 may be covered by gNB-1 and UE-2 may be covered by gNB-2. UE-1 (as a QNC) or gNB-1 may send a request to the network function (e.g. new network function) QCM to request a quantum connection be established between gNB-1 (e.g. a source QNT) and gNB-2 (e.g. a destination QNT). QCM may contact gNB-1, gNB-2 and/or other en-route backhaul routers to finish creating a quantum connection between gNB-1 and gNB-2. gNB-1 and gNB-2 may employ a QKP protocol (which may be designated by QCM or requested by UE-1/gNB-1) to establish a secure key, which may only be known by gNB-1 and gNB-2. This secure key may be used to encrypt the communication segment between gNB-1 and gNB-2 for a packet (e.g. any packet) between UE-1 and UE-2, which may request some changes to the existing 5G data plane.

gNB1 may dispatch this security key to UE-1 if there may be a secure approach. gNB-2 may do the similar thing for UE-2. UE-1 and UE-2 may directly use this security key to encrypt any content to be exchanged between UE-1 and UE-2.

UE-1 may request to have more secure communications with 5G core network. UE-1 may be covered by gNB-1. UE-1 (which may be a QNC) or gNB-1 may send a request to the network function (e.g. new network function) QCM to request a quantum connection be established between gNB-1 (e.g. a source QNT) and a backhaul router BR-1 in 5G core network (e.g. a destination QNT). The QCM may contact gNB-1, BR-1, and/or other en-route backhaul routers to finish creating a quantum connection between gNB-1 and BR-1. gNB-1 and BR-1 may employ a QKP protocol (which may be designated by QCM or requested by UE-1/gNB-1) to establish a secure key, which may only be known by gNB-1 and BR-1.

This security key may be used to encrypt the communication segment between gNB-1 and BR-1 for a packet (e.g. any packet) between UE-1 and 5G core network, which may request some changes to existing 5G data plane.

Figure 13:
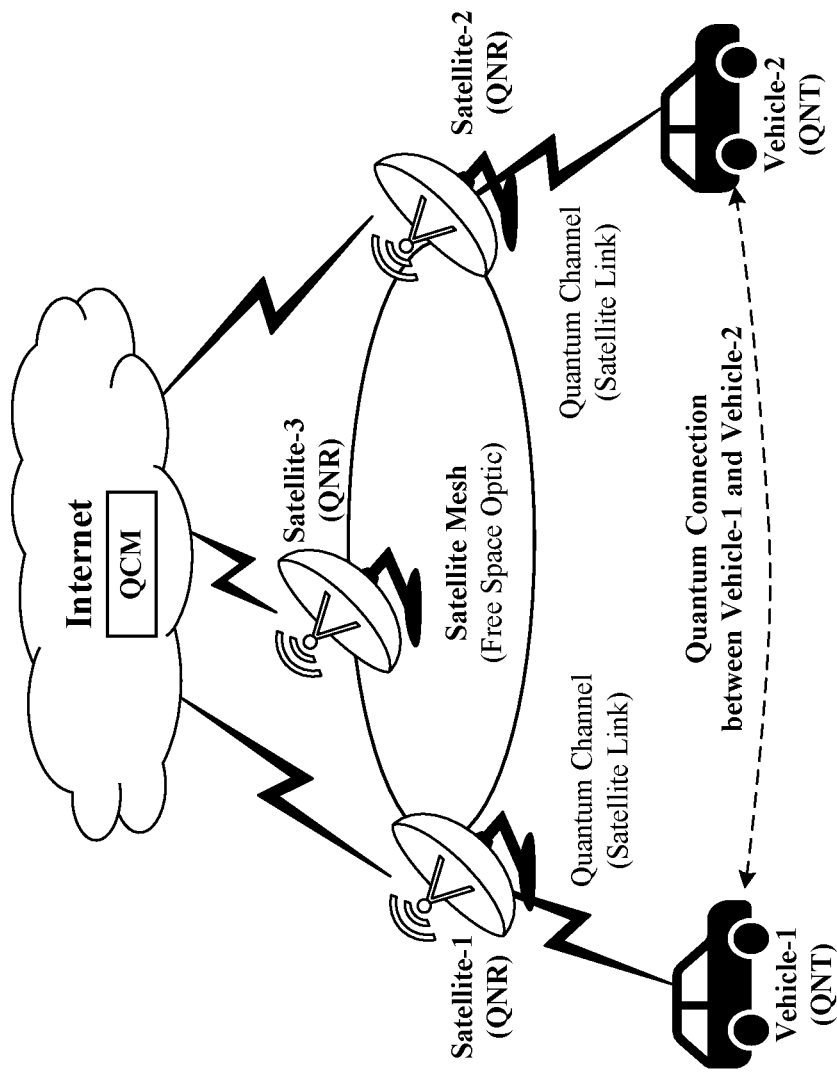
FIG. 13 shows an example embodiment of quantum connection management in a satellite-assisted vehicular network.

FIG. 13 shows an example embodiment of quantum connection management in a satellite-assisted vehicular network. For example, FIG. 13 may show how the embodiments described herein may be implemented in a satellite-assisted vehicular networks. A vehicle (e.g. each vehicle) may have a satellite link as a quantum channel, and it may act as a QNT (or even QNR if the vehicle may have a quantum channel such as visible light communications or free space optics to other vehicles). A vehicle (e.g. each vehicle) may connect to other vehicles and the Internet (e.g. the traditional Internet) via one or more channels (e.g. classic channels) such as short-range (e.g. IEEE 802.11) and/or long-range (e.g. 4G/5G cellular) wireless technologies. Satellites may be connected to a mesh network via a quantum channel, such as free space optics, and a satellite (e.g. each satellite) may be a QNR. In an embodiment, vehicles may be satellites themselves, drones, airplanes, trains, other types of Unmanned Aerial Vehicles (UAV), and/or even any type of device once they have a satellite link as quantum channel and a wired/wireless communications channel (e.g. a classic channel) to the Internet.

A QCM may be implemented as a service (e.g. a new service) that may be deployed in the Internet, as a part of a telecom operator network, as a part of a satellite system, as a part of a vehicular network such as a roadside unit, as a part of a cloud service, and/or the like. A QNC may be a software module that may be inside the vehicle or a UE, such as a phone insider the vehicle.

A QNT may be implemented as a part of a vehicle. A vehicle may host one or more QNTs. A QNT may serve one or more (e.g. multiple) QNCs. A source QNT may be Vehicle-1 and a destination QNT may be Vehicle-2. A QNR may be implemented as a part of a satellite, as a part of a vehicle if the vehicle has a quantum channel to one or more other vehicles, and/or the like.

Vehicle-1 may request to have more secure communications with Vehicle-2. Vehicle-1 and Vehicle-2 may be covered by the same or different satellites. Vehicle-1 (which may be a QNT) or a QNC connecting to Vehicle-1 may send a request to the service (e.g. new service) QCM to request a quantum connection be established between Vehicle-1 (e.g. a source QNT) and Vehicle-2 (e.g. a destination QNT). QCM may contact Vehicle-1, Vehicle-2, and/or other en-route vehicles/satellites (such as QNR) to finish creating a quantum connection between Vehicle-1 and Vehicle-2. Vehicle-1 and Vehicle-2 may employ a QKP protocol, which may be designated by QCM or requested by Vehicle-1, to establish a secure key, which may only be known by Vehicle-1 and Vehicle-2. This secure key may be used to encrypt content (e.g. any content) to be exchanged between Vehicle-1 and Vehicle-2.

Figure 14:
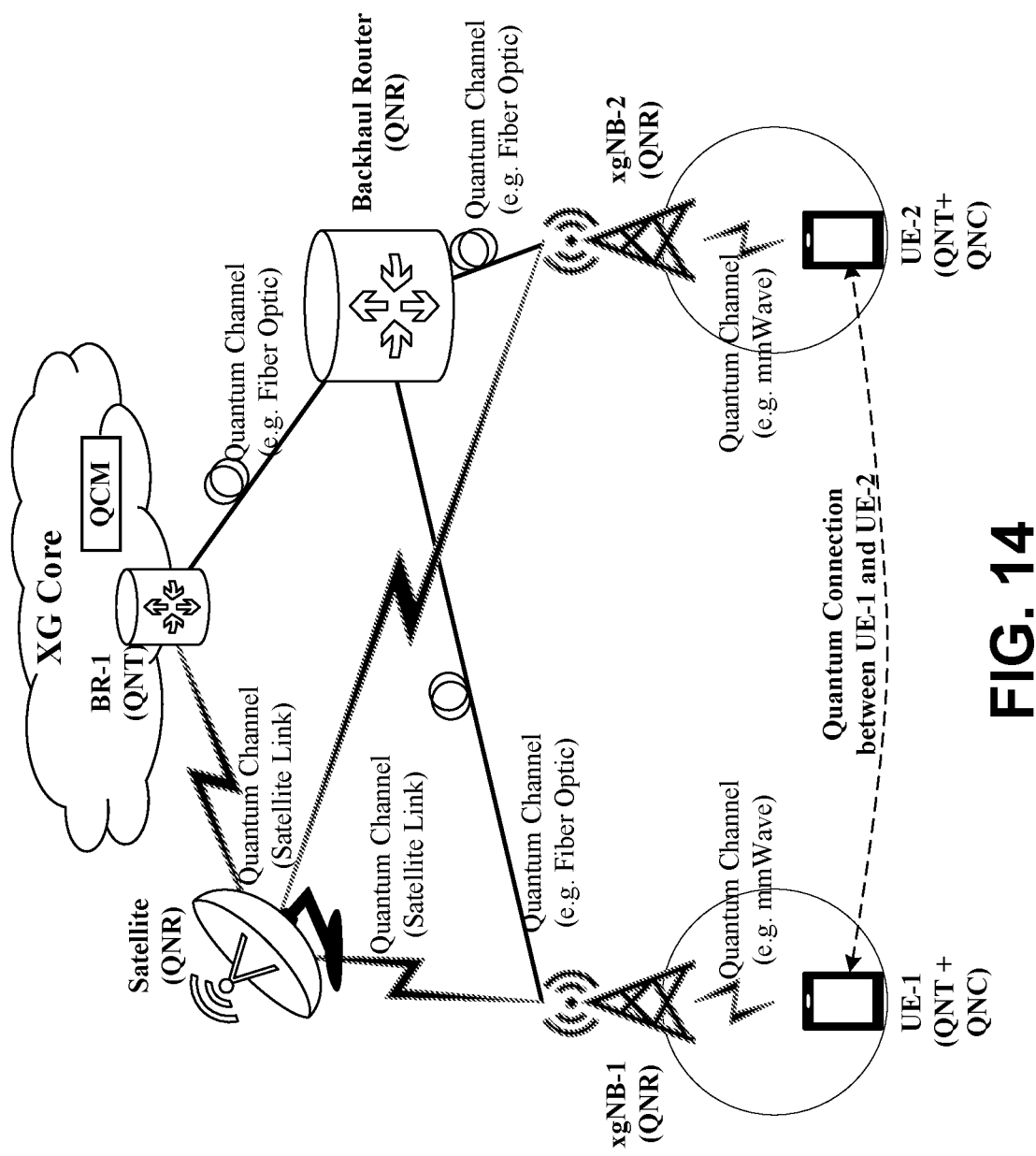
FIG. 14 shows an embodiment of quantum connection management in a future mobile cellular communications network.

FIG. 14 shows an embodiment of quantum connection management in a future cellular network. For example, FIG. 14 shows that the embodiments described herein may be implemented in a future mobile cellular network (referred to as XG). A UE (e.g. each UE) may have a quantum channel, such as Millimeter Wave (mmWave) radio, to the XG base station (xgNB). For example, mmWave may be used to transmit qubits between a UE and an xgNB. There may be a quantum channel such as free space optics between two neighboring xgNBs. There may be one or more aggregation nodes or Backhaul Routers (BRs) connecting xgNB to XG core network based on optical fibers, free space optics, satellite links, and/or the like, which may be used as a quantum channel between xgNB and BRs and between BRs and XG core network. BRs may be satellites, which may provide satellite links as a quantum channel to xgNB and to XG core network.

A QCM may be implemented as a network function (e.g. new network function) to be deployed in XG core network and/or its edge networks. A QNC may be a software module inside a UE. A UE may host one or more QNCs. A QNT may be implemented as a part of a UE. A QNR may be implemented as a part of an xgNB. A QNR may also be implemented as a part of a BR that may have a quantum channel (e.g. fiber optics, free space optics, satellite links, and/or the like) to xgNBs, other BRs, and XG core network.

UE-1 may request to have more secure communications with UE-2. UE-1 may be covered by xgNB-1 and UE-2 may be covered by xgNB-2. UE-1 (which may be a QNC and/or a QNT) may send a request to the network function (e.g. new network function) QCM to request a quantum connection be established between UE-1 (e.g. a source QNT) and UE-2 (e.g. a destination QNT). The QCM may contact UE-1, UE-2, and/or other en-route QNRs (e.g. xgNB-1, one or more BRs, and xgNB-2) to finish creating a quantum connection between UE-1 and UE-2. UE-1 and UE-2 may employ a QKP protocol, which may be designated by QCM or requested by UE-1, to establish a secure key, which may only be known by UE-1 and UE-2. This secure key may be used to encrypt content (e.g. any content) to be exchanged between UE-1 and UE-2.

Figure 15:
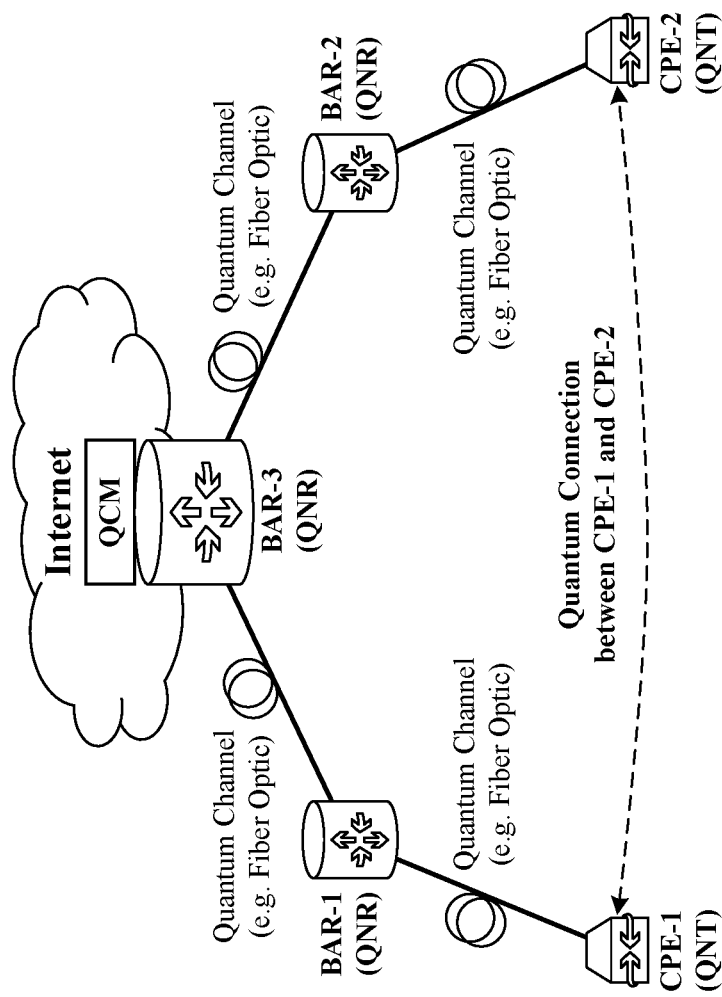
FIG. 15 shows an embodiment of quantum connection management in fiber-to-the-home (FTTH) systems.

FIG. 15 shows an embodiment of quantum connection management in Fiber-To-The-Home (FTTH) systems. For example, FIG. 15 shows how embodiments described herein may be implemented in Fiber-To-The-Home (FTTH) broadband access systems assuming. A (e.g. each) Customer Premises Equipment (CPE) may be connected to a Broadband Access Router (BAR) via fiber optic as a quantum channel. One or more BARs may connect with each other via fiber optic as a quantum channel.

A QCM may be implemented as a service (e.g. a new service) to be deployed in the Internet or as a part of FTTH broadband access system. A QNC may be implemented as a part of a home device (e.g. any home devices). A QNT may be implemented as a part of a CPE. A CPE may host one or more QNTs. A QNT may serve one or more QNC(s). A source QNT may be CPE-1 and a destination QNT may be CPE-2. A QNR may be implemented as a part of a BAR.

A CPE-1 may request to have more secure communications with CPE-2 to achieve more secure communications between a device connecting to CPE-1 and another device connecting to CPE-2. CPE-1 and CPE-2 may be covered by the same or different BAR(s). CPE-1 (which may be a QNT) or a device as QNC connecting to CPE-1 may send a request to the service (e.g. new service) QCM to request a quantum connection be established between CPE-1 (e.g. a source QNT) and CPE-2 (e.g. a destination QNT). The QCM may contact CPE-1, CPE-2, and/or other en-route BAR(s) (which may be a QNR) to finish creating a quantum connection between CPE-1 and CPE-2. CPE-1 and CPE-2 may employ a QKP protocol, which may be designated by QCM or requested by CPE-1, to establish a secure key, which may only be known by CPE-1 and CPE-2. This secure key may be used to encrypt content (e.g. any content) to be exchanged between CPE-1 and CPE-2. CPE-1 and/or CPE-2 may dispatch this security to its home devices. A device connecting to CPE-1 and another device connecting to CPE-2 may use this security key for direct secure communications between them.

Figure 16:
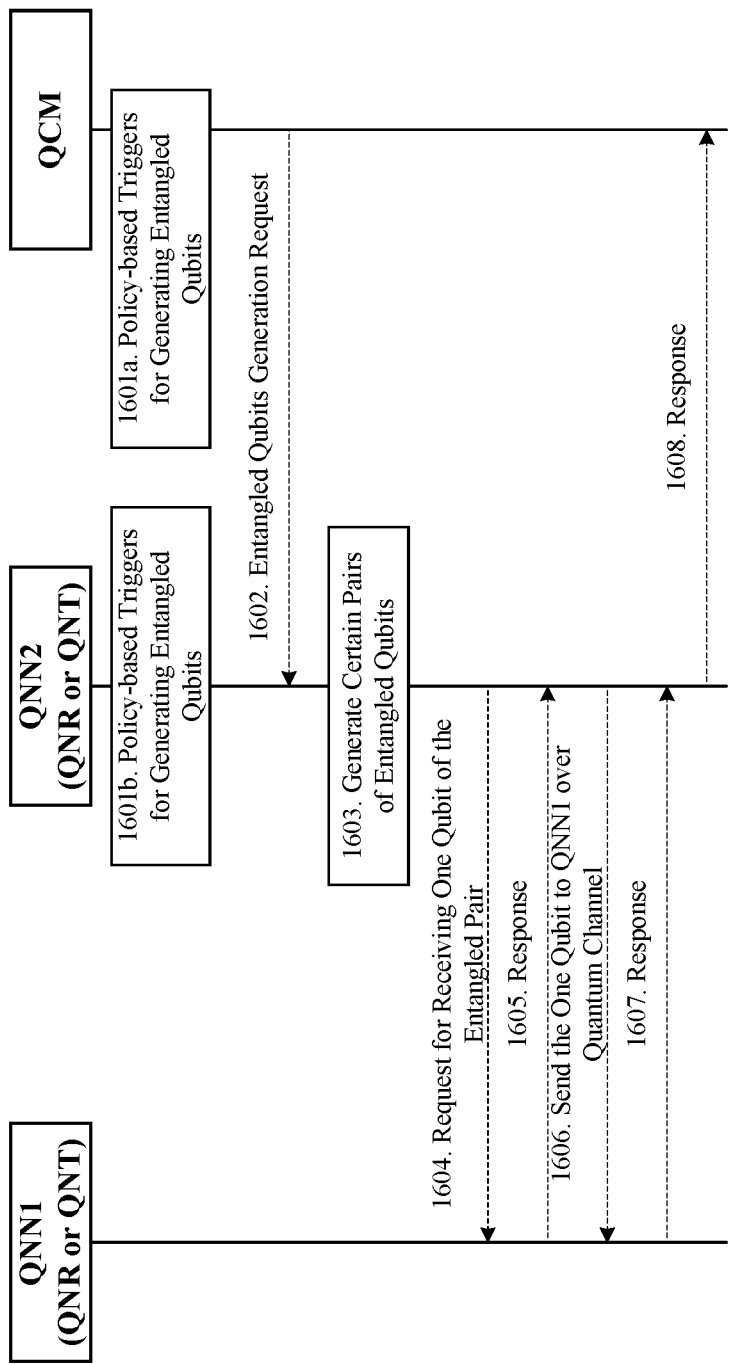
FIG. 16 shows an example embodiment of QCM-controlled entangled qubits generation.

QCM-controlled entangled qubits generation may be provided. FIG. 16 shows an example embodiment of QCM-controlled entangled qubits generation. For example, FIG. 16 shows a procedure for QCM-controlled quantum qubit management. A pair of entangled qubits may be generated at QNN2, based on one or more pre-configured policies and/or under the control of QCM. QNN2 may optionally send one entangled qubit to QNN1 if there may be a quantum channel between QNN1 and QNN2.

At 1601a-1601b in FIG. 16, policies for generating entangled qubits may have been configured at QNN2 and/or QCM. At 1602, as triggered by quantum policies in 1a, QCM may send a request to QNN2 to generate entangled qubits. In this request, QCM may instruct QNN2 to generate entangled qubits and to distribute entangled qubits to other QNNs. This request may include the address of QNN1. At 1603, QNN2 may generate pairs of entangled qubits (e.g. a pair of Qubit A and Qubit B), as triggered by 1601b or requested by 1602. At 1604, QNN2 may send a request to QNN1 to inform it that a qubit of an entangled pair may be sent to QNN1 at a later time, such as at 1606. At 1605, QNN1 may send a response to QNN2. In this response, QNN1 may propose a time to QNN2 for it to perform 1606. QNN1 may make a quantum channel ready to receive the qubit transmitted at 1606. At 1606, QNN2 may send one qubit of an entangled pair (e.g. Qubit A) to QNN1 over a quantum channel. QNN2 may maintain another qubit (e.g. Qubit B) of the entangled pair. At 1607. QNN1 may send a response to QNN2 to indicate if it successfully received the qubit. If QNN1 does not receive the qubit successfully, QNN2 may destroy the other qubit (e.g. Qubit B). At 1608, QNN2 may send a response to QCM to indicate whether a pair of entangled qubits may have been successfully created by QNN2 and whether one qubit of the entangled pair may have been successfully transmitted to QNN1. QCM may analyze one or more (e.g. all) received responses from QNNs to obtain the statistics of entangled qubits generation.

In FIG. 16, QNN2 may transmit Qubit A to QNN1 and Qubit B to QNN3. If QCM has the capability to generate entangled qubits, it may just generate a pair of entangled qubits (e.g. Qubit A and Qubit B) and it may transmit Qubit A to QNN2 and Qubit B to QNN1.

Figure 17:
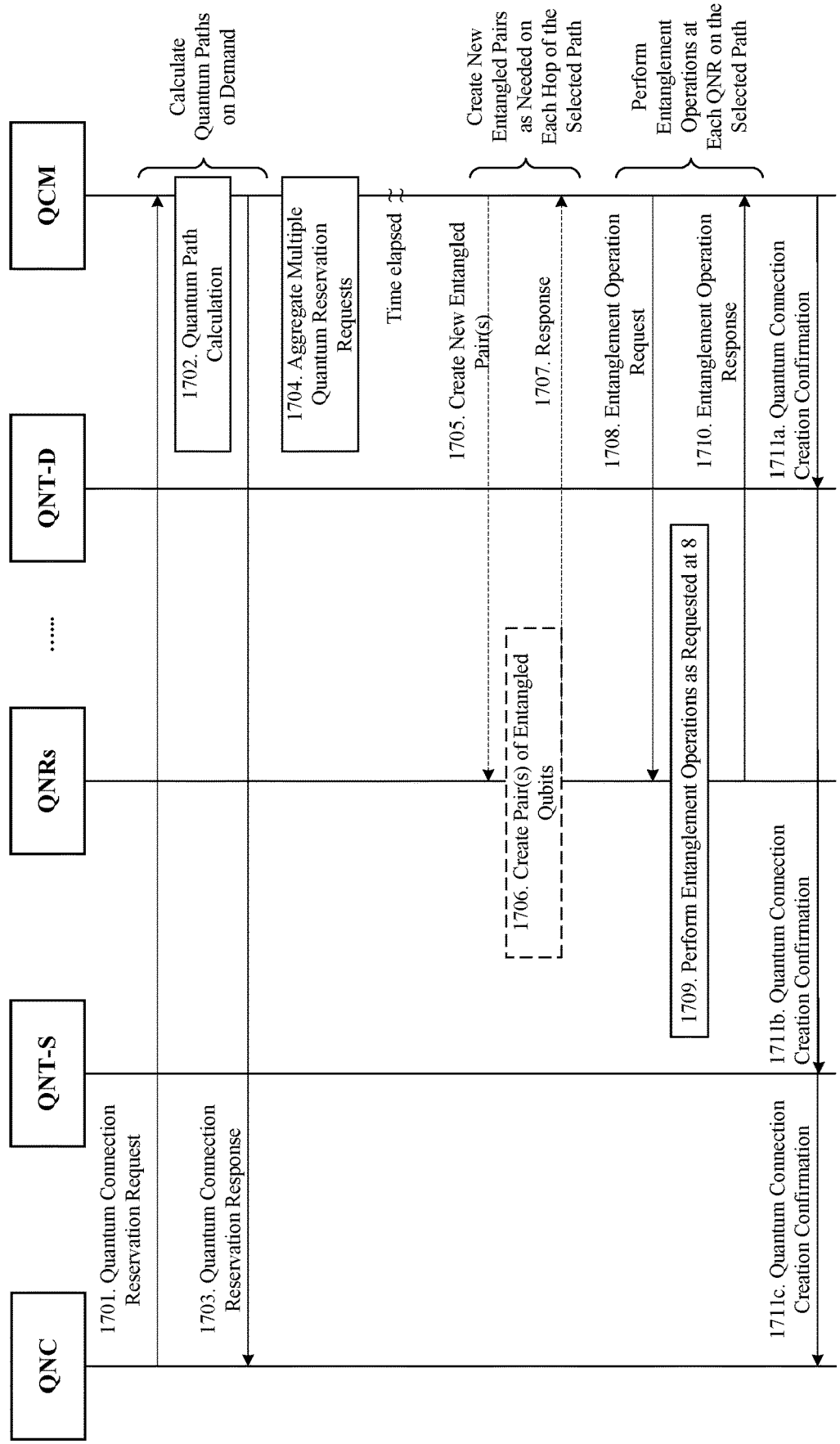
FIG. 17 shows a QCM-controlled quantum connection establishment that may buffer quantum connection reservations at QCM.
Figure 18:
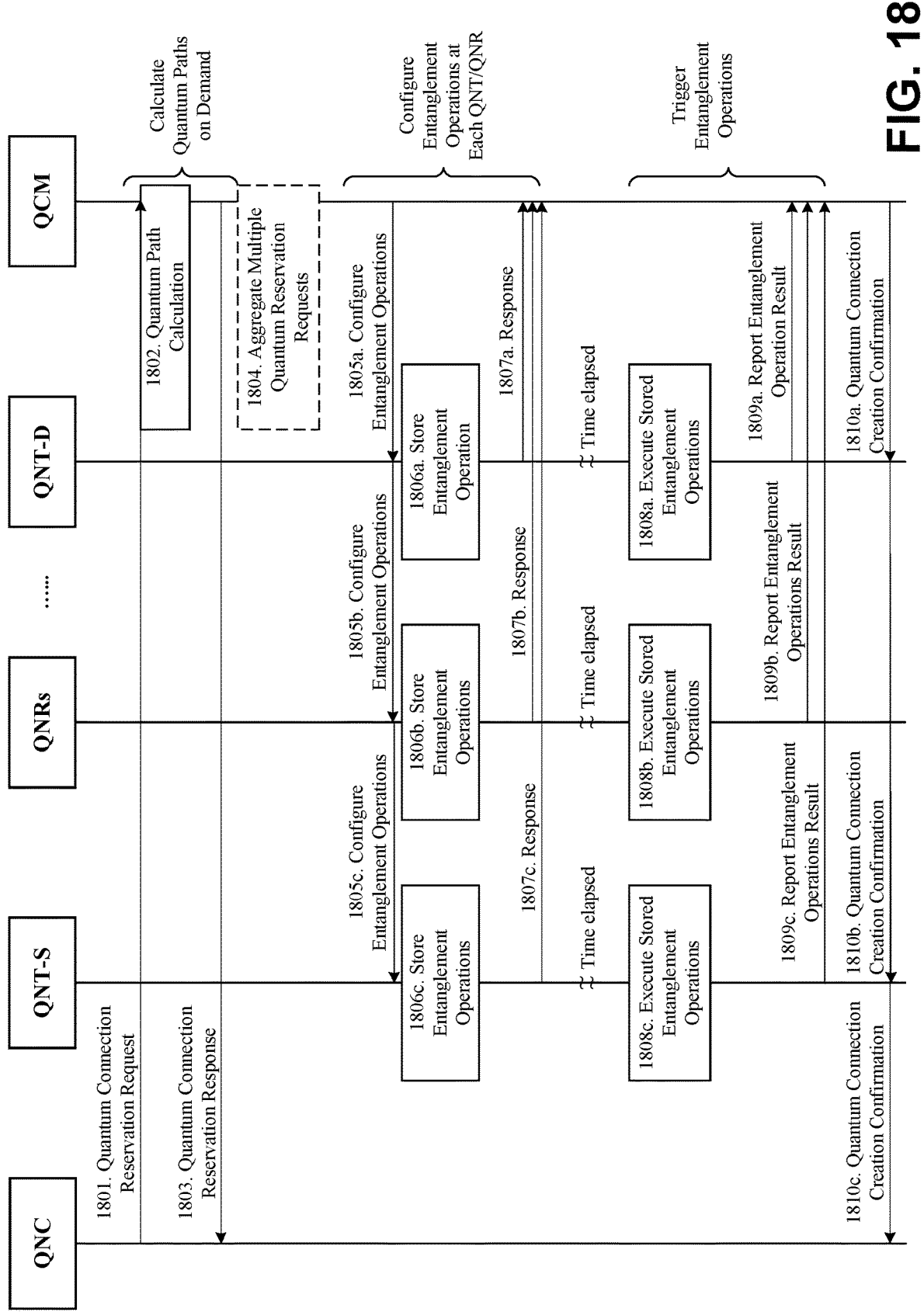
FIG. 18 shows a QCM-controlled centralized quantum connection establishment that may buffer quantum connection reservations at QNTs and/or QNRs.

QCM-controlled quantum connection creation may be provided. FIG. 17 shows a QCM-controlled quantum connection establishment that may buffer quantum connection reservations at QCM. FIG. 18 shows a QCM-controlled centralized quantum connection establishment that may buffer quantum connection reservations at QNTs and/or QNRs. A QNC may request QCM to establish a quantum connection between a source QNT (e.g. QNT-S) and a destination QNT (e.g. QNT-D). One or more QNRs may reside on the path from QNT-S and QNT-D. To establish a quantum connection between QNT-S and QNT-D, a pair of entangled qubits may be established between them (e.g. one entangled qubit at QNT-S and the other entangled qubit at QNT-D). This may be achieved by creating a pair of entangled qubits on one or more hops (e.g. each hop) of this path (e.g. using the embodiments in FIG. 16) and performing entanglement swapping at one or more QNRs (e.g. each QNR). Since entangled pairs may not be maintained for long time without the loss of required fidelity, the QNC may reserve the creation of quantum connection beforehand (e.g. before a quantum connection may be used). The quantum connection may be created at a later time, which may be referred to as qConnCreationTime. There may two modes for QCM to establish or create quantum connections.

Quantum Connection Creation Mode-A (Buffer Reservations at QCM) may be provided. A QCM may keep receiving quantum connection reservation requests from the same or different QNCs. The QCM may wait and may trigger entanglement creation and swapping on a hop (e.g. each hop) of the path from QNT-S to QNT-D at the indicated qConnCreationTime from QNC. For example, the QNC may send one or more reservation requests to QCM in advance. The QCM may receive and buffer those reservation requests. The QCM may processes those reservation requests, such as in a batch, at qConnCreationTime.

Quantum Connection Creation Mode-B (Buffer Reservations at QNR/QNT) may be provided: After receiving a reservation request (e.g. each reservation request), the QCM may identify a path (e.g. the best path) and one or more QNRs (e.g. the best QNRs) between QNT-S and QNT-D. QCM may split the quantum connection creation task to some sub-tasks at QNT-S (e.g. entanglement creation), QNT-D (e.g. entanglement creation), and QNRs (e.g. entanglement creation and entanglement swapping). It may dispatch those sub-tasks to QNT-S, QNT-D, and QNR and may instructs them to execute those tasks at qConnCreationTime.

A number of procedures may be performed in FIG. 17. At 1701 in FIG. 17, QNC may send a quantum connection reservation request to QCM. This request may indicate one or more of the following information:

qntSourceAddr: The address of the source QNT.
qntDestinationAddr: The address of the destination QNT.
qPathInfo: QNC may optionally designate the quantum path from QNT-S to QNT-D (e.g. to indicate addresses of one or more (e.g. all) QNRs between QNT-S and QNT-D).
qConnCreationTime: Indicate when the quantum connection may be created. It may be an absolute time or a relative time. If it is a relative time, this parameter may indicate the delay between when QCM receives this reservation request and when QCM starts to create the requested quantum connection.
qConnCreationMode: Indicate the mode for QCM to create the requested quantum connection. The quantum connection creation mode may be: Mode-A: buffer reservation requests at QCM (in FIG. 17), or Mode-B: buffer reservation requests at QNRs/QNTs (in FIG. 18).
minFidelity: A fidelity (the minimum fidelity) of the entanglement pair to be created between QNT-S and QNT-D.
entanglementSwappingModel: Indicate how entanglement swapping may be performed at one or more (e.g. all) hops, which may be sequentially hop-by-hop from QNT-S to QNT-D (or from QNT-D to QNT-S) or parallelly among different hops.
entanglementSwappingProtocol: Indicate the protocol for an (e.g. each) entanglement swapping operation.
maxNumOfQuantumHops: Indicate a number (e.g. a maximum number) of QNRs on the path from QNT-S to QNT-D.
targetAppID: Indicate the target application which may use the created quantum connection between QNT-S and QNT-D.
qConnLifetime: Indicate the lifetime for the created quantum connection to be effective and valid after it may be created.

At 1702 in FIG. 17, the QCM may receive the reservation request message. It may calculate and select an appropriate quantum path for the given QNT-S and QNT-D if qPathInfo may not be included at 1701. The selected quantum path may have less hops than the maxNumOfQuantumHops as indicated in 1701. During 1702, the QCM may also estimate and determine if a (e.g. each) QNR on the selected quantum path has enough quantum resources/capabilities around qConnCreationTime. If there may not be enough quantum resources, the reservation request in 1701 may be failed.

At 1703 in FIG. 17, the QCM may send a response to QNC to indicate if the reservation may be successful or not. If the reservation may be successful, QCM may create a reservation sequence number (e.g. qReservationID) and may include it in the response message. QCM may also include the information (e.g. an address of QNT-S, address of QNT-D, and address of each QNR on the path) about the selected path at 1702 in the response. The QCM may buffer this reservation request and may start a creation timer set to qConnCreationTime.

At 1704 in FIG. 17, the creation timer associated with a (e.g. each) buffered reservation request may become expired. There may be one or more reservation requests with their timers to be expired at an approximate time. The QCM may aggregate those reservation requests into a single reservation request, and may expire them at approximately the same time.

At 1705-1707 in FIG. 17, the reservation request may become expired. The QCM may use 1705-1707 to contact one or more (e.g. all) QNRs, QNT-S, and QNT-D to create entangled pairs on one or more (e.g. each) hop of the selected quantum path between QNT-S and QNT-D. This may be optional for one or more hops if there may be entangled pairs that may have already been created. 1705-1707 may be similar to the procedure shown with respect to FIG. 16.

At 1708-1710 in FIG. 17, the QCM may instructs one or more (e.g. each) QNRs to perform appropriate entanglement swapping as designated by entanglementSwappingMode and entanglementSwappingProtocol as indicated at 1701.

This may be done, for example, to create an entanglement pair between QNT-S and QNT-D (e.g. a quantum connection). At 1708, the QCM may send an entanglement operation request to a QNR. This message may contain the identifiers of two uncorrelated qubits, over which entanglement swapping may be performed. This message may also indicate some parameters as received at 1701 such as an entanglementSwappingProtocol. At 1709, the QNR may perform the entanglement operation as requested at 1708 (e.g. entanglement swapping and optionally entanglement distillation) over designated qubits. At 1710, the QNR may send an entanglement operation response to QCM to indicate if the entanglement operation at 1709 may or may not be successful.

At 1711, if 1708-1710 may have been successfully executed on one or more (e.g. all) QNRs, a quantum connection may have been successfully established between QNT-S and QNT-D. The QCM may generate a quantum connection identifier (e.g. qConnID) for this connection. The QCM may send a quantum connection creation confirmation to QNT-D, QNT-S, and QNC. In this confirmation message, the QCM may include qConnID and other parameters received at 1701, such as targetAppID and connLifetime. After 7011, whenever the quantum connection may become unavailable (e.g. due to the mitigated entanglement fidelity) and/or consumed, QNT-S (or QNT-D) may send a notification to QCM. The QCM may mark the status of the consumed quantum connection as "consumed" and/or "unavailable." The QCM may remove this unavailable or consumed quantum connection from its database.

At 1701, QNT-S or QNT-D may also send a quantum connection reservation request to QCM which may be triggered by some pre-configured policies at QNT-S or QNT-D. For example, an example policy may be set as when a current quantum connection may be consumed or becomes unavailable (e.g. due to low fidelity), a quantum connection (e.g. a new quantum connection) may be created. This may cause actions at 1711*c* to be skipped.

Prior to execution at 1705, QNC (or QNT-S/QNT-D if the quantum connection reservation may be requested by QNT-S/QNT-D) may send a quantum connection reservation cancellation request to QCM by indicating one or more gReservationID. The QCM may remove the corresponding pending reservation requests and 1705-1711 may not be performed.

Prior to execution at 1705, the QCM itself may cancel one or more quantum connection reservations and may send a quantum connection reservation cancellation notification to QNC. The QCM may remove corresponding pending reservation requests and 1705-1711 may not be performed.

Prior to execution at 1705, the QCM itself may send a quantum connection reservation cancellation request to QNC to cancel one or more quantum connection reservations. After receiving the approval from QNC, QCM may remove corresponding pending reservation requests and 1705-1711 may not be performed.

A number of procedures may be performed in FIG. 18. At 1801-1803 in FIG. 18, actions may be performed that are similar to 1801-1803 as described herein for FIG. 17. Referring again to FIG. 18, at 1804 if there may be multiple reservation requests received from different QNCs, which may be received simultaneously, the QCM may optionally aggregate those quantum connection reservations together as a single reservation, but QCM may not buffer these requests locally.

At 1805-1807 in FIG. 18, since QCM may not buffer a (e.g. any) reservation request, it may configure one or more entanglement operations (e.g. entanglement creation and entanglement swapping) at QNT-S, QNT-D and QNRs, to meet the reservation request received at 1801 or an aggregated request at 1804. At 1805, the QCM may send a request to configure one or more entanglement operations at QNT-S, QNT-D, and one or more (e.g. each) QNR. This request may contain a list of entanglement operations and one or more parameters received at 1801 such as qConnCreationTime, entanglementSwappingMode, entanglementSwappingProtocol, targetAppID, and/or the like.

At 1806 in FIG. 18, QNT-S, QNT-D, and QNRs may store the list of entanglement operations as received at 1805. A (e.g. each) listed entanglement operation may be executed sequentially and started after qConnCreationTime. For example, entanglement swapping may be performed after entanglement creation. At 1807, QNT-S, QNT-D, and QNRs may send a response to QCM to indicate if entanglement operation configuration at 1806 may or may not have been successful. At 1808, after a time (e.g. qConnCreationTime), QNT-S, QNT-D, and QNRs may performs one or more configured entanglement operations at 1806. During 1808, there may be one or more message exchanges among QNT-S, QNT-D, and QNRs. There may be one or more message exchanges one or more QNRs as a result of performing the configured entanglement operations. For example, after QNR-X may finished performing an entanglement swapping, it may send a notification indicating the completion of the entanglement swapping to another QNR, such as QNR-Y, to trigger QNR-Y to perform another entanglement swapping, entanglement distillation, and/or other entanglement operations.

At 1809 in FIG. 18, QNT-S, QNT-D, and QCM may respectively report execution results of one or more (e.g. each) entanglement operation to the QCM. If one or more (e.g. all) of them execute these operations successfully, one or more entanglement connections may be established between QNT-S and QNT-D now. At 1810 in FIG. 18, actions similar to those described with respect to 1811 in FIG. 17 may occur. After 1810, whenever the quantum connection becomes unavailable (e.g. due to the mitigated entanglement fidelity) and/or consumed, QNT-S (or QNT-D) may send a notification to QCM. The QCM may mark the status of the consumed quantum connection as "consumed" and/or "unavailable." The QCM may remove this unavailable or consumed quantum connection from its database.

At 1801 in in FIG. 18, QNT-S or QNT-D may also send a quantum connection reservation request to QCM, which may be triggered by some pre-configured policies at QNT-S or QNT-D. For example, an example policy may be set as when current quantum connection may be consumed or may become unavailable due to low fidelity, a quantum connection may be created and actions at 1810*c* may not be performed.

Prior to execution at 1808, QNC may send a quantum connection reservation cancellation request to QCM by indicating one or multiple qReservationID. QCM may contact QNT-S/QNT-D and QNRs to remove one or more (e.g. all) configured yet pending entanglement operations. 1808-1810 may not be performed.

Prior to execution at 1808, QNC may send a quantum connection reservation cancellation request directly to QNT-S/QNT-D and QNRs to remove one or more (e.g. all) configured yet pending entanglement operations. 1808-1810 may not be performed.

Prior to execution at 1808, QNT-S (or QNT-D or a QNR) may send an entanglement operation cancellation request to QCM to cancel some pending entanglement operations. The QCM may contact QNT-D (or QNT-S and other QNRs) to remove one or more (e.g. all) configured yet pending entanglement operations. QCM may notify the QNC of this cancellation of one or multiple quantum connection reservations 1808-1810 may not be performed.

Prior to execution at 1808, the QCM may send an entanglement operation cancellation request to QNT-S, QNT-D, and one or more (e.g. all) QNRs to cancel one or more (e.g. all) configured yet pending entanglement operations corresponding to one or multiple quantum connection reservations. It may notify the QNC of this cancellation of one or multiple quantum connection reservations.

Figure 19:
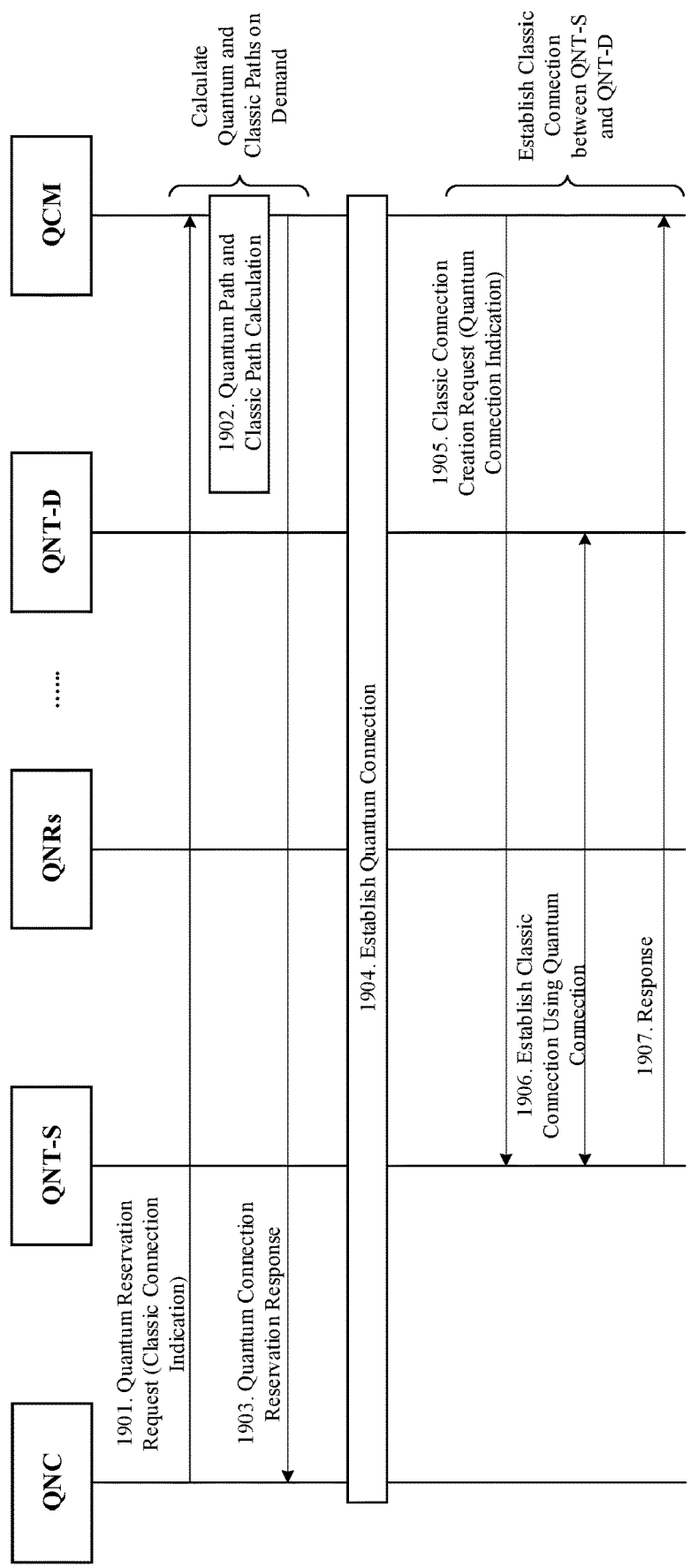
FIG. 19 shows an example flow chart for joint quantum connection creation and classic connection.

Joint quantum connection creation and classic connection creation may be provided. FIG. 19 shows an example flow chart for joint quantum connection creation and classic connection. There may be scenarios where QNT-S and QNT-D may establish a quantum connection (e.g. a pair of entangled qubits), and may establish a classic transport-level or application-level connection (such as a TCP or a HTTP connection). For performance improvement, the quantum connection and the classic connection may be jointed requested and established. QNC may use quantum reservation request to indicate a request for a classic connection and may indicate that the establishment of the classic connection may leverage the quantum connection to make the classic connection more secure. In addition, to establish a classic connection between QNT-S and QNT-D may use one or more classic resources (e.g. classic bandwidth, etc.) on classic nodes between QNT-S and QNT-D. If QCM knows these classic nodes may not have enough resources (e.g. classic resources) to establish a classic connection, then QCM may not establish a quantum connection between QNT-S and QNT-D.

FIG. 19 shows a procedure for joint quantum and classic connection establishment. 1901-1903 of FIG. 19 may be similar to 1901-1903 with respect to FIG. 17. There may be a few differences. At 1901, QNC may contain an additional parameter classicConnReq to indicate a request for creating a classic connection between the QNT-S and QNT-D as well, which may occur right after the quantum connection may be established. At 1902, QCM may also calculate classic paths between QNT-S and QNT-D. It may also check if there may be enough resources (e.g. classic resources) on the calculated classic paths. If QCM may not find a classic path with sufficient classic resources for the requested classic connection and the quantum connection may have been used to create the classic connection, QCM may not create any classic connection nor a quantum connection and may report a failure at 1903. And 1904-1907 may not be performed. If QCM may find a classic path with enough classic resources but may not find an appropriate quantum path, QCM may not create any classic connection nor a quantum connection and may report a failure at 1903. And 1904-1907 may not be performed. If QCM may find a classic path with enough classic resources and a quantum path with enough quantum capability, QCM may perform 1904-1907.

At 1904 in FIG. 19, actions similar to 1704-1711 with respect to FIG. 17 may be performed or actions similar to 1804-1810 with respect to FIG. 18 may be performed to establish a quantum connection between QNT-S and QNT-D.

At 1905 in FIG. 19, the QCM may send a classic connection creation request to QNT-S. This request may contain the established quantum connection information (e.g. quantum connection identifier), which may instruct QNT-S to use this quantum connection to establish a secure classic connection with QNT-D.

At 1906 in FIG. 19, the QNT-S may establish a classic connection with QNT-D using a quantum connection. For example, the quantum connection may be consumed to enable quantum teleportation or quantum superdense coding, which may be leveraged to establish the classic connection. In another example, QNT-S and QNT-D may use this quantum connection to perform QKD to establish security keys between QNT-S and QNT-D. QNT-D and QNT-D may use the security keys to establish a secure classic connection between them such as a QKD-based TLS/DTSL session. At 1907 in FIG. 19, QNT-S (or QNT-D) may send a response to QCM to indicate that the quantum connection may have been consumed and a classic connection may have been successfully established or not.

Figure 20:
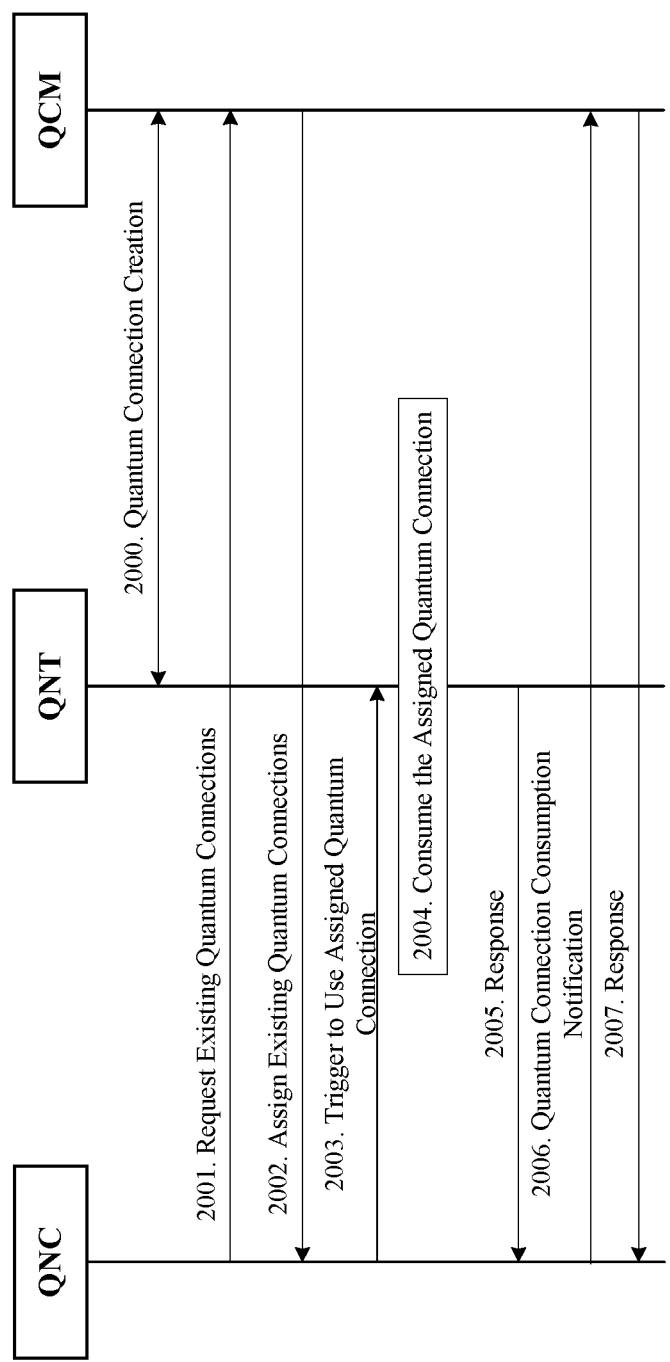
FIG. 20 shows an example embodiment for providing quantum connection as a service.

Quantum connection as a service may be provided. FIG. 20 shows an example embodiment for providing quantum connection as a service. An established quantum connection (e.g. an entanglement between a source QNT and a destination QNT) may not stay long with a minimum fidelity, but entanglement coherence time may be greatly improved. As such, a quantum connection may be provided as a service. For example, QCM may proactively establish quantum connections among different QNTs and may provide them as a service to QNCs. For example, a QNC may not request QCM to create a quantum connection (e.g. a new quantum connection), but may request existing quantum connections from QCM. Then, QCM may search its established quantum connections and may allocate one or more established quantum connections to the QNC by informing the QNC of identifiers of allocated quantum connections, DNT-S of an allocated quantum connection (e.g. each allocated quantum connection), and QNT-D of each allocated quantum connection. The allocated quantum connections may be used and consumed to support quantum applications such as QKD. For example, the QNC may contact QNT-S (or QNT-D) to use the allocated quantum connections (e.g. entanglements) to support quantum applications such as QKD. The QNC or the source (or destination) QNT of the allocated quantum connection may send a notification to QCM to report the consumption of the allocated quantum connections.

FIG. 20 shows the procedure for providing quantum connection as a service. At 2000, QCM may have established one or more quantum connections among various pairs of QNTs using the procedures in FIG. 17 and FIG. 18. At 2001, QNC may request a number of existing quantum connections from QCM. This request message may contain one or more of the following parameters:
- numOfQConn: Indicates the number of quantum connections which QNC may request from QCM.
- qntAddr: Indicates the addresses of the source QNT and the destination QNT, over which the requested quantum connections may have been established.
- appInfo: Indicates the type and/or name of the applications which may use/consume the requested quantum connections.

At 2002, QCM may search one or more (e.g. all) existing and still available quantum connections as established at 2000. QCM may select and assign one or more quantum connections to QNC as it has requested at 2001. This message may contain the following parameter:
- qConnIDs: May indicates the identifiers of one or more (e.g. all) quantum connection being assigned or allocated to QNC.
- qntAddr: May indicate the addresses of the source QNT and the destination QNT of an assigned quantum connection (e.g. each assigned quantum connection).

At 2003, QNC may send a request to QNT (which may be the source QNT or the destination QNT as included at 2001 or received at 2002) to trigger to consume one or more assigned quantum connections. The identifier of corresponding quantum connections (e.g. qConnIDs has received at 2002) may be contained in this message, appInfo may also be contained in this message. At 2004, QNT may use/consume the designated quantum connection to support the application as denoted by appInfo at 2003.

At 2005, QNT may send a response to QNC. This response may indicate if the designated quantum connection may be successfully leveraged and consumed. Application-dependent information may also be contained in this response.

At 2006, QNC may notify QCM of the consumption of the designated quantum connection. The identifier of the consumed quantum connection may be contained in this message. At 2007, QCM may receive the notification from QNC. It may mark the status of the consumed quantum connection as "consumed" and/or "unavailable". It may send a response to QNC as an acknowledgement.

With regard to FIG. 20, QNT may be a source QNT or a destination QNT which may be involved in a quantum connection. At 2003, the request may be sent from QCM to QNT. At 2004, QNT may contact another QNT (e.g. the destination QNT) to consume the designated quantum connection to support the quantum application. The notification sent at 2006 may be from QNT to QCM. For example, QNT may also send a quantum connection consumption notification to QCM.

Figure 21:
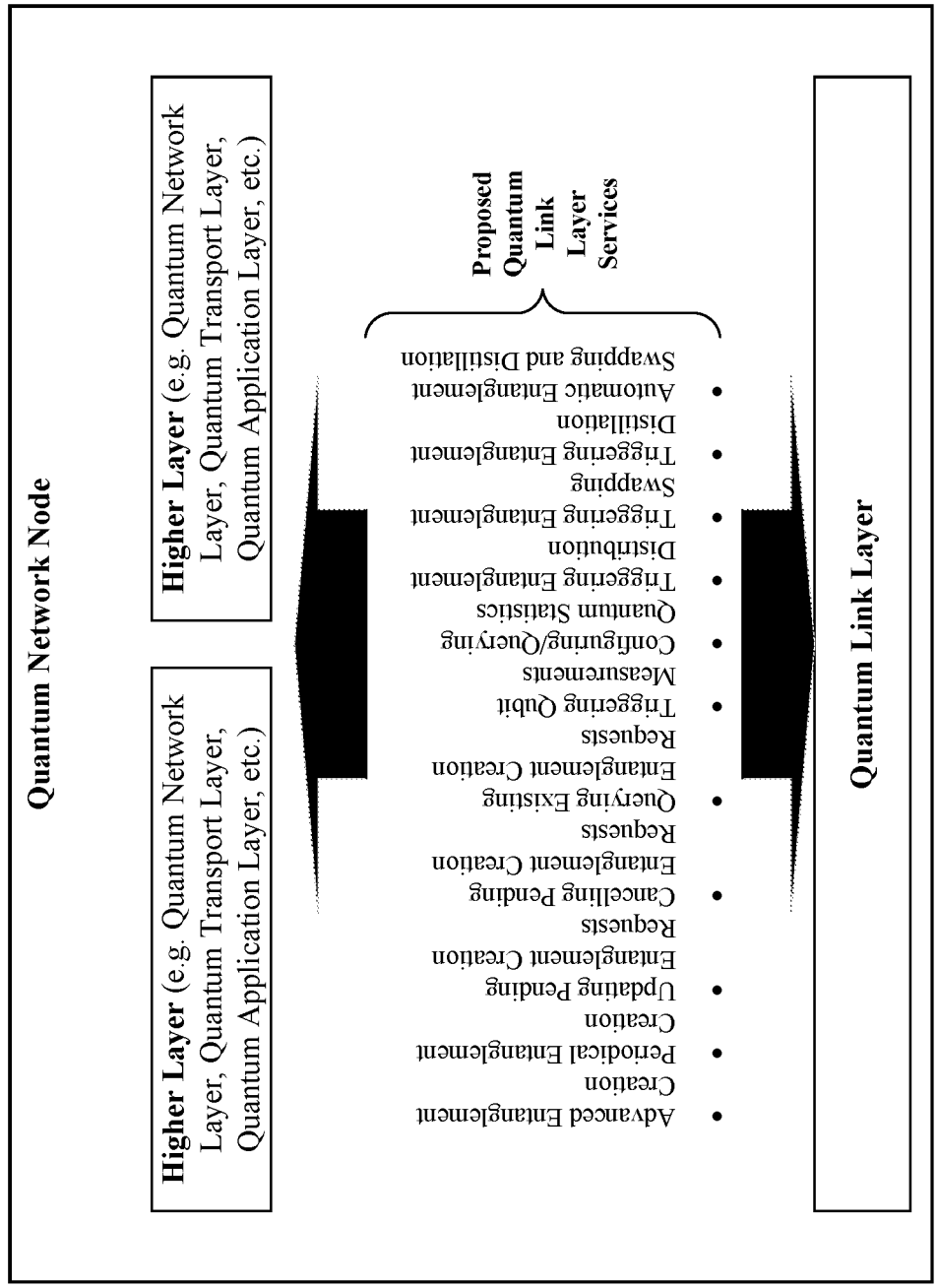
FIG. 21 shows an example embodiment of quantum link layer services.

Advance quantum link layer services may be provided. FIG. 21 shows an example quantum link layer service. In a quantum network, the protocol stack for a Quantum Network Node (QNN) may consist of quantum physical layer, quantum link layer, quantum network layer, quantum transport layer, quantum application layer, and/or the like. Among these layers, quantum network layer, quantum transport layer, and quantum application layer may be classified as a higher layer, which may not generate or hold a quantum property (e.g. any quantum properties), such as qubits, but may interact with quantum link layer to access, leverage and manage qubits as well as entangled qubits. A QNN may be a Quantum Network Terminal (QNT) or a more functional Quantum Network Routers (QNR). QNRs may support advanced entanglement operations such as entanglement swapping and entanglement distillation.

In an embodiment, a QNR may be a base station in cellular network, a satellite, a vehicle that has a quantum channel (e.g. satellite link or free space optic) to other network nodes, a backhaul router in cellular networks, a broadband access router, and/or the like. In an embodiment, a QNT may be a vehicle that may have a quantum channel (e.g. satellite link or free space optic) to other network nodes, a Customer Premises Equipment (CPE) that has a fiber optic as quantum channel, a satellite, a satellite ground station, a User Equipment (UE) in a cellular network that may have quantum channel to other UEs or to its base station, a base station in cellular networks, and/or the like.

As such, quantum link layer services (e.g. the basic link layer service for creating entangled qubits) may be between quantum link layer and a higher layer (e.g. a quantum network layer, a quantum transport layer, and/or a quantum application layer) within either a QNT or a QNR so that the higher layer may efficiently access quantum link layer to create and manipulate qubits including entangled qubits. As shown in FIG. 21, the quantum link layer services may include a number of services.

FIG. 21 shows an example embodiment of quantum link layer services. The quantum link layer services may provide advanced entanglement creation. A higher layer may request the quantum link layer to create entangled qubits with one or more requirements such as the lifetime of entangled qubits, the need for distributing one entangled qubit to another quantum network node, and/or the like.

The quantum link layer services may provide periodical entanglement creation. A higher layer may request the quantum link layer to create entangled qubits periodically. Such periodical entanglement creation may enable periodical Quantum Key Distribution (QKD) and periodical change of security keys.

The quantum link layer services may provide updating pending entanglement creation requests. A higher layer may request the quantum link layer to update one or more parameters related to a pending entanglement creation request. As a result, the quantum link layer may use value (e.g. new values) of these parameters to process the pending request to create entangled qubits (e.g. new entangled qubits).

The quantum link layer services may provide cancelling pending entanglement creation requests. A higher layer may request the quantum link layer to remove a pending entanglement creation request.

The quantum link layer services may provide querying existing entanglement creation requests. A higher layer may query the status and related parameters of an existing entanglement creation request which may have been received at the quantum link layer.

The quantum link layer services may provide triggering qubit measurements. A higher layer may request the quantum link layer to measure some qubits. The quantum link layer may store the measured results or return it to the higher layer.

The quantum link layer services may provide configuring/querying quantum statistics. A higher layer may configure the quantum link layer to calculate and collect one or more quantum statistics, which may in turn be retrieved/queried by the higher layer.

The quantum link layer services may provide entanglement distribution. A higher layer may trigger the quantum link layer to distribute one or more entangled qubits to other quantum network node(s).

The quantum link layer services may provide triggering entanglement swapping. A higher layer may trigger the quantum link layer to perform entanglement swapping over one or more (e.g. two or more) sets of entangled qubits to generate a set (e.g. a new set) of entangled qubits.

The quantum link layer services may provide triggering entanglement distillation. A higher layer may trigger the quantum link layer to perform entanglement distillation over one or more (e.g. two or more) sets of entangled qubits to improve the fidelity of one set of entangled qubits.

The quantum link layer services may provide automatic entanglement swapping and distillation. A higher layer may configure one or more entanglement swapping/distillation policies to the quantum link layer so that the quantum link layer may automatically trigger and perform entanglement swapping and distillation based on the configured policies.

Among these services, triggering entanglement swapping, triggering entanglement distillation, and automatic entanglement swapping and distillation may be applicable for quantum link layer at quantum network routers (or quantum repeaters), and may not be applicable for regular quantum network nodes that act as simpler quantum network terminal.

Figure 22:
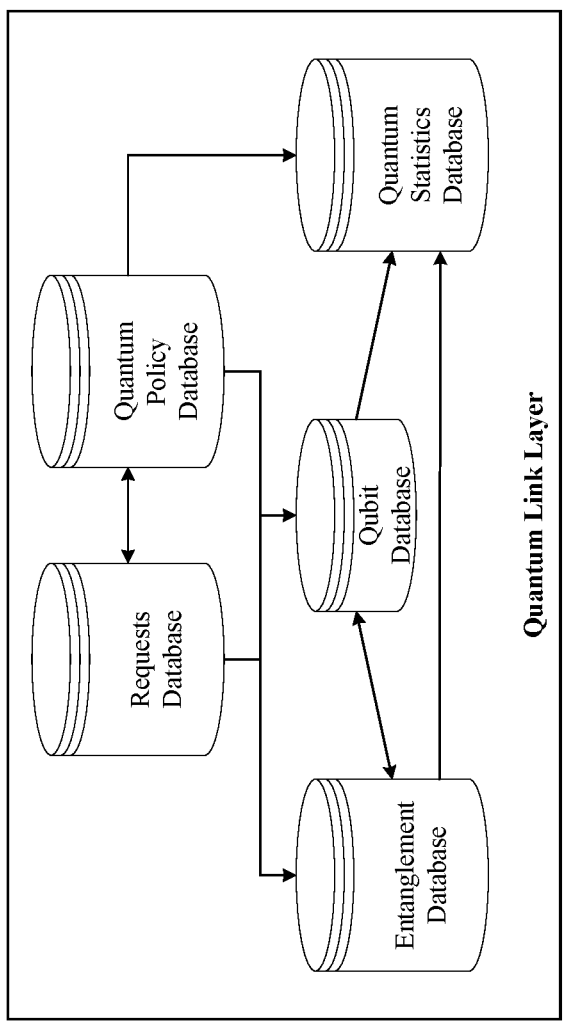
FIG. 22 show example embodiment for information maintained at a quantum link layer.

FIG. 22 show example embodiment for information maintained at a quantum link layer. To support these quantum Link Layer Services, a quantum link layer may maintain one or more databases (as shown in FIG. 22), which may be accessed by a higher layer.

A request database may be provided. This database may store one or more (e.g. all) requests received from a higher layer such as entanglement creation requests and their status. In case of entanglement creation requests, their status may be pending, successful creation of entanglements, failed creation of entanglements, and/or the like. A higher layer may search and query a request (e.g. any request) including its status from this database. A higher layer may also request quantum link layer to cancel and remove an existing request. A quantum link layer may remove the corresponding request from this database.

A quantum policy database may be provided. A higher layer may configure and send some quantum policies (e.g., when and how to perform entanglement swapping over which entangled pairs) to quantum link layer. Quantum link layer may store these policies in this database and may use them to guard its actions and behaviors (e.g. policy-based automatic entanglement swapping and/or distillation). A higher layer may also update and remove a configured policy from this database.

An entanglement database may be provided. A quantum link layer may use this database to store the identifiers of one or more (e.g. all) entanglements (e.g. previously created entanglements, consumed entanglements, swapped entanglements, distilled entanglements, and/or the like.), their status (e.g. the fidelity of an entanglement) and identifiers of involved entangled qubits. A higher layer may send a request to this database to query the status of an existing entanglement or to trigger to swap two existing entanglements.

A qubit database may be provided. This database may store the logical identifier of one or more (e.g. each) existing qubit, its state basis, its state, and the logical identifier of other related and entangled qubits, and/or the like. A higher layer may send a request to this database to trigger to measure a qubit.

A quantum statistic database may be provided. A quantum link layer may calculate and collect one or more quantum statistic parameters such as successful entanglement generation rate, successful entanglement swapping rate, number of generated entanglements per second, and/or the like. A higher layer may search and query quantum statistic parameters from this database. A higher layer may also add quantum statistic parameters to this database.

Although the description of quantum link layer service as described herein may be described in terms where an entanglement contains only two qubits, the quantum link layer services embodiment may be applicable for and extended to scenarios where an entanglement contains more than two qubits as well.

Figure 23:
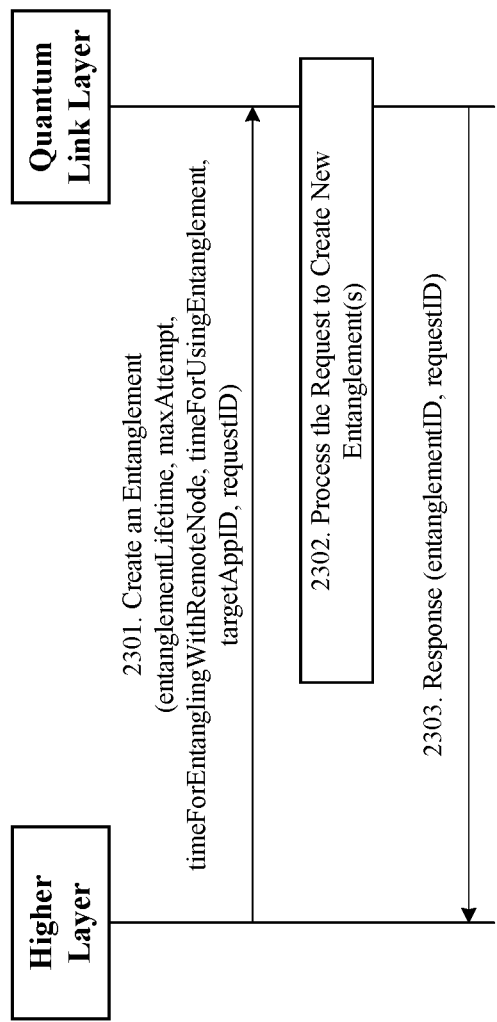
FIG. 23 shows an example embodiment for an enhanced quantum link layer service for entanglement creation.

Advanced quantum link layer service for entanglement creation may be provided. FIG. 23 shows an example embodiment for an enhanced link layer service for entanglement creation. For example, FIG. 23 illustrates the enhanced link layer service for entanglement creation, where a higher layer may indicate additional parameters (e.g. new parameters) to quantum link layer to support advanced features for generating entangled qubits such as: entanglement with certain lifetime, entanglement creation with a certain number of attempts, entanglement distribution indication or reservation, entanglement usage reservation, and/or the like. In this case, to create an entanglement may mean to create a pair of entangled qubits (or a set of more than two entangled qubits).

At 2301 in FIG. 23, a higher layer may send an entanglement creation request to link layer. The request primitive may contain one or more following parameters to support advanced entanglement creation:

entanglementLifetime: It may indicate how long that entangled qubits need to be maintained after they may be generated. After this time duration, the entangled qubits may be destroyed.

maxAttempt: It may indicate a number of attempts (e.g. the maximum attempts) that quantum link layer may try to successfully generate the requested entanglement.

timeForEntanglingWithRemoteNode: It may indicate what time one qubit of the generated entangled pair may be distributed to another Quantum Network Node (QNN). This parameter may tell quantum link layer to be ready for distributing an entangled qubit to a remote node at a future time.

timeForUsingEntanglement: It may indicate what time the generated entangled pair (e.g. Qubit A and Qubit B) may be used by an application. For example, after one qubit (e.g. Qubit A) of the entangled pair may be distributed to another QNN, this parameter may indicate when another qubit (e.g. Qubit B) may be used by a quantum application and/or may be used for performing entanglement swapping. This parameter may tell quantum link layer to be ready for using the generated entanglement at a future time.

targetAppID: a It may indicate the identifier of the target quantum application that may use the created entanglement.

requestID: It may indicate an identifier of his request, which the higher layer may set it for quantum link layer.

At 2302 in FIG. 23, a quantum link layer may process the request and may prepare to create an entanglement as requested at 2301. For example, if maxAttempt is indicated at 2301, quantum link layer may try multiple time (=maxAttempt) with quantum physical equipment until the requested entanglement may be successfully created. If the requested entanglement may be successfully created, quantum link layer may assign an identifier for it, referred to as entanglementID.

At 2303 in FIG. 23, a quantum link layer may send a response to higher layer to indicate if the entanglement creation at 2302 may have been successful or not by containing entanglementID. This response may also include requestID if it may have been set or changed by quantum link layer. The response sent at 2303 could be a response after receiving 2302 (e.g. an immediate response), but before any requested entanglement may be created.

Figure 24:
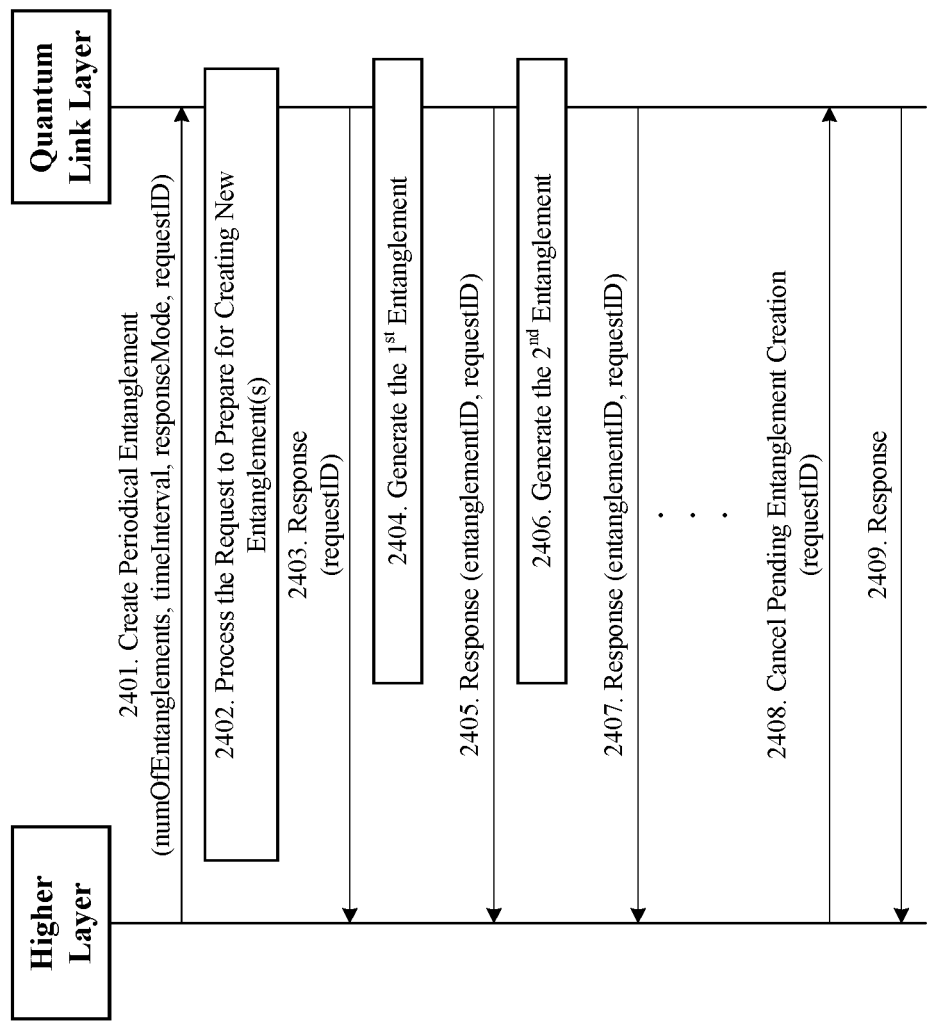
FIG. 24 shows an example embodiment for a quantum link layer service for periodical entanglement creation.

Quantum link layer service for periodical entanglement creation may be provided. FIG. 24 shows an example embodiment for a link layer service for periodical entanglement creation. FIG. 24, shows an example procedure for periodical entanglement creation. In this scenario, the higher layer may send one request to quantum link layer for asking it to generate multiple entanglements (e.g. multiple pairs or multiple sets of entangled qubits).

At 2401 in FIG. 24, a higher layer may send a periodical entanglement creation request to quantum link layer. The request may indicate the number of entanglements to be generated (e.g. numOfEntanglements), the time interval between two entanglements (e.g. timeInterval), and how quantum link layer may send responses to higher layer for the generated entanglements (e.g. responseMode). This request may also contain those parameters included in 2301 with respect to FIG. 23.

At 2402 in FIG. 24, a quantum link layer may process the received request to prepare for creating entanglement (e.g. new entanglements). At 2403, the quantum link layer may send a response to higher layer. This response may include an identifier of the request (e.g. requestID) sent at 2401. requestID may be assigned by link layer or it may be set and sent at 2401 by the higher layer.

At 2404-2407 in FIG. 24, a quantum link layer may generate two entanglements sequentially. For a (e.g. each) generated entanglement, the quantum link layer may assign an entanglementID as its identifier. Quantum link layer may include entanglementID in a response and may send it to higher layer. Dependent on responseMode at 2401, quantum link layer may send one response after two (or more if requested) entanglements may be generated, for instance if responseMode=Aggregated. If numOfEntanglements at 2401 is more than at 2402, quantum link layer may continue to generate more entanglements.

At 2408, at some moment and possibly before one or more (e.g. all) requested entanglements may be generated, higher layer may decide to cancel one or more (e.g. all) pending entanglements to be generated which may be associated with a periodical entanglement request (e.g. requestID). The higher layer may send a cancellation of pending entanglement creation request to quantum link layer. As a result, a pending entanglement (e.g. any pending entanglements) associated with a periodical entanglement request and those that may soon be generated may be cancelled. At 2409, the quantum link layer may send a response to higher layer. This response may indicate a number of successfully generated entanglements.

Figure 25:
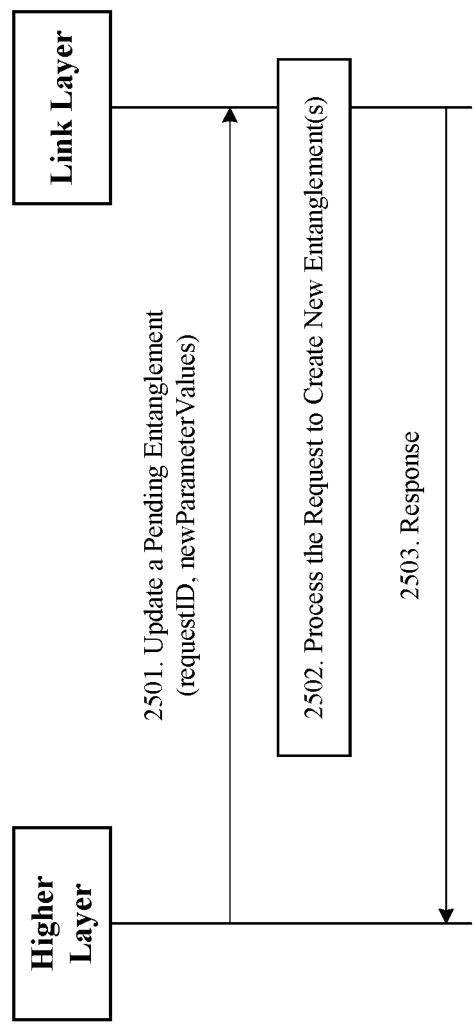
FIG. 25 shows an example flow chart for a quantum link layer service for updating pending entanglement creation requests.

Quantum link layer service for updating pending entanglement creation requests may be provided. FIG. 25 shows an example flow chart for a link layer service for updating pending entanglement creation requests. For example, FIG. 25 illustrates a link layer service (e.g. a new link layer service) for updating a pending entanglement creation request. In this example, the higher layer may have sent a previous entanglement creation request to quantum link layer, but the requested entanglement may not have been generated. This request may be referred to as a pending entanglement creation request. The higher layer may decide to update this pending entanglement creation request to instruct a quantum link layer to generate the rest entanglements in a different manner. At 2501, the higher layer may send a request to quantum link layer. This request may contain the identifier of the pending entanglement creation request (e.g. requestID) and values (e.g. new values) for one or more parameters (such as those indicated at 2301 in FIGS. 23 and 2401 in FIG. 24).

At 2502, the quantum link layer may receive the request and may adjust the way for creating future entanglements for the pending entanglement creation request (e.g. requestID) based on a parameter value (e.g. new parameter values) contained at 1. At 2503, the quantum link layer may send a response to the higher layer and may indicate if it may accept the parameter value (e.g. new parameter values) as proposed at 2501. The quantum link layer may accept one or more parameters values and may reject others, which may be notified to the higher layer in this response.

Figure 26:
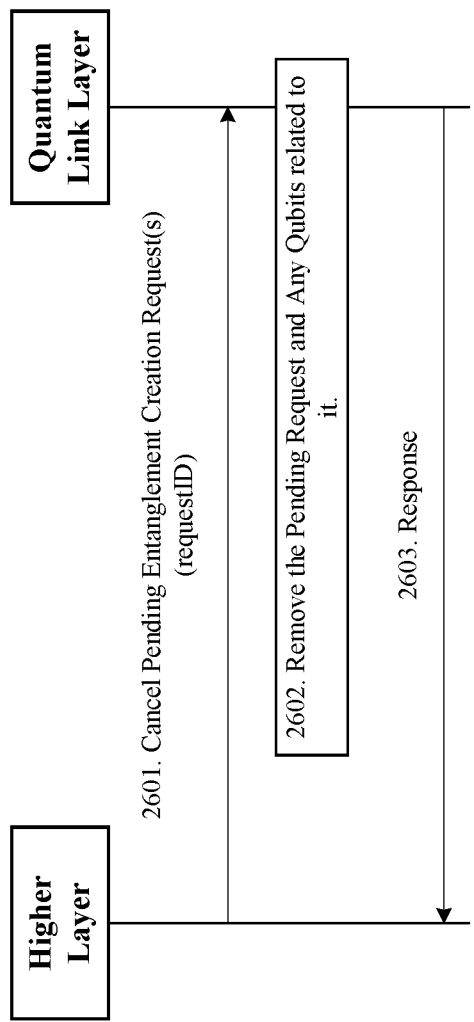
FIG. 26 shows an example flow chart for a quantum link layer service for canceling pending entanglement creation requests.

Quantum link layer service for cancelling pending entanglement creation requests may be provided. FIG. 26 shows an example flow chart for a link layer service for canceling pending entanglement creation requests. The higher layer may have sent to quantum link layer one or more entanglement creation requests, but it may still be too early to generate the one or more requested entanglements and thus those requests may still be pending. The higher layer may request cancelation of those pending requests. At 2601, the higher layer may send a request to cancel pending entanglement creation requests. This request may include a requestID, which may indicate one and more pending entanglement creation requests to be cancelled. At 2602, a quantum link layer may look up and may remove one or more (e.g. all) pending request as denoted by requestID. At 2603, the quantum link layer may send a response to the higher layer to indicate if one or more (e.g. each) pending requests has been successfully removed. If some pending requests may not have been successfully removed, this response may include a list of pending requests which may or may not have been removed.

Figure 27:
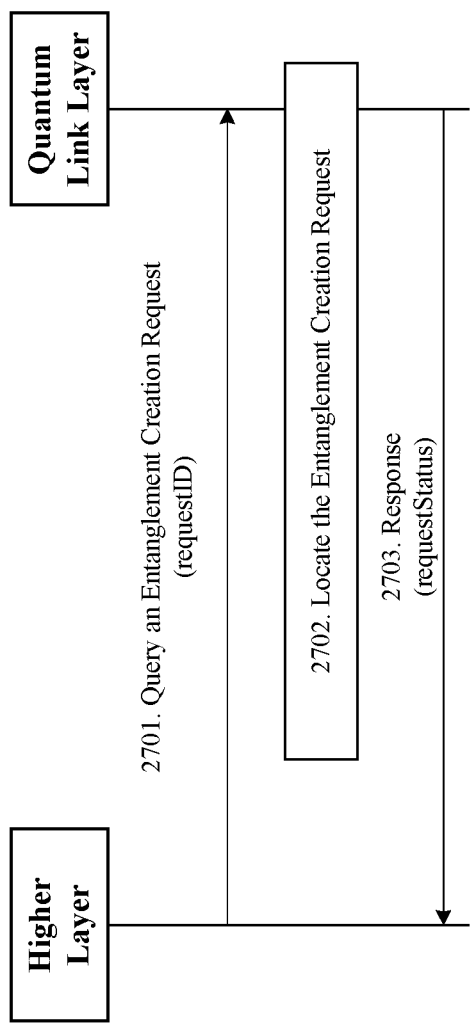
FIG. 27 shows an example flow chart for a quantum link layer service for querying an existing entanglement creation request.

Quantum link layer service for querying existing entanglement creation requests may be provided. FIG. 27 shows an example flow chart for a link layer service for querying an existing entanglement creation request. FIG. 27 illustrates a link layer service (e.g. a new link layer service) for querying an existing entanglement creation request. In this scenario, the quantum link layer may have received some previous entanglement creation requests, which may be completely performed or may still be pending but they may be considered as existing entanglement creation requests and may be maintained at the quantum link layer. At 2701, the higher layer may send a request to quantum link layer to query one or more existing entanglement creation requests. The identifiers of those existing entanglement creation requests may be contained in requestID. At 2702, the quantum link layer may locate those existing entanglement creation requests and may retrieve their status (e.g. if it may have been executed, if the requested entanglement has been generated, how long does link layer need to wait until generating requested entanglements, and/or the like). At 2703, the quantum link layer may send a response to the higher layer. This response may contain the status of those existing entanglement creation requests (e.g. requestStatus) as retrieved at 2701.

Figure 28:
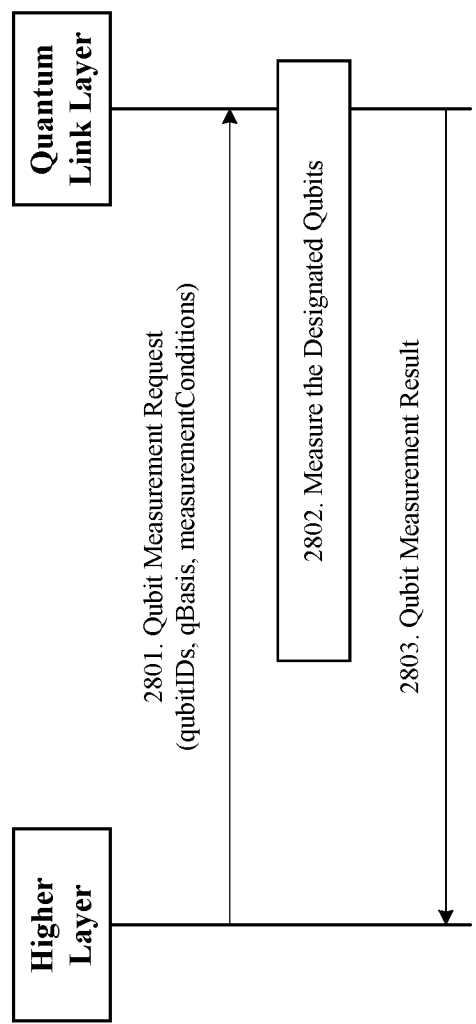
FIG. 28 shows an example flow chart for a quantum link layer service for triggering qubit measurements.

Quantum link layer service for triggering qubit measurements may be provided. FIG. 28 shows an example flow chart for a link layer service for triggering qubit measurements. For example, FIG. 28 may illustrate a quantum link layer service for triggering qubit measurements at quantum link layer. At 2801, a higher layer may send a qubit measurement request to a quantum link layer. This request may indicate the logic identifiers of qubits (e.g. qubitIDs) to be measured or an identifier of an existing entanglement, and quantum state basis (qBasis) that the measurement may be performed on. The higher layer may also indicate additional measurement conditions (e.g. measurementConditions). At 2802, the quantum link layer may receive the request, may locate the designated qubits which may be a qubit of an existing entanglement, and may wait for measuring them until the indicated measurement conditions have been satisfied. At 2803, the quantum link layer may send qubit measurement result to higher layer.

Figure 29:
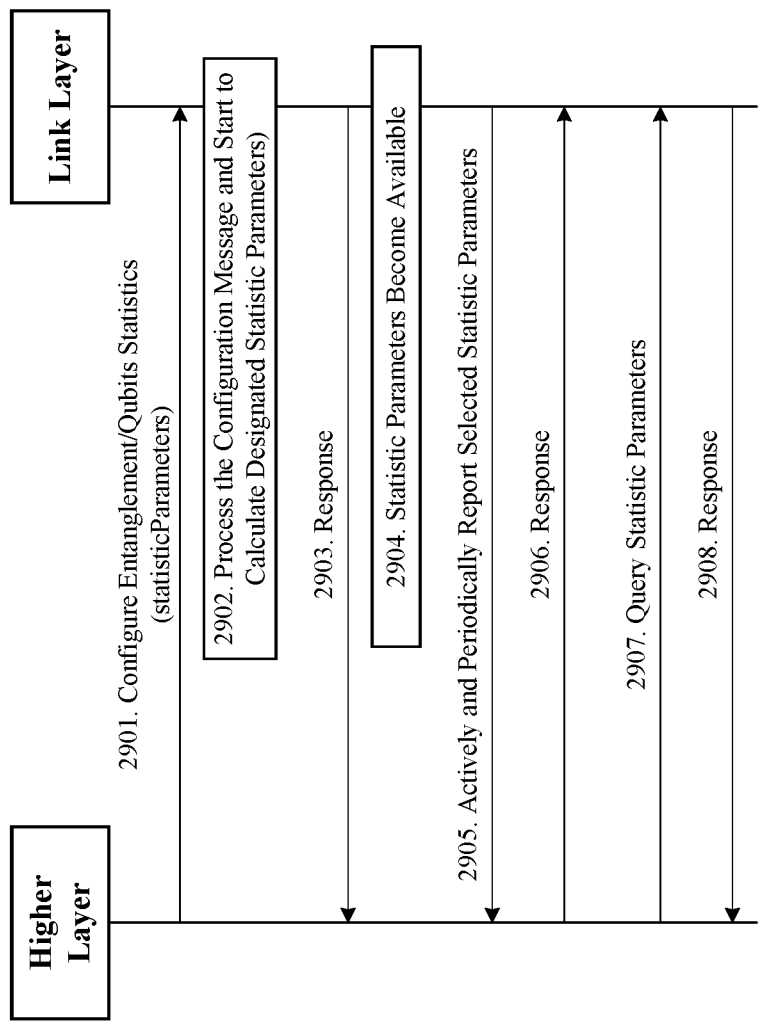
FIG. 29 shows and example flow chart or a quantum link layer service for configurating/querying quantum statistics.

Quantum link layer service for configuring/querying quantum statistics may be provided. FIG. 29 shows and example flow chart for a link layer service for configurating/querying quantum statistics. For example, FIG. 29 illustrates a quantum link layer service for configuring and querying quantum statistics at quantum link layer. At 2901, a higher layer may send a request to configure actions or policies for collecting quantum statistics (e.g. qubits and entanglements)

at quantum link layer. For example, qStatisticParameters may include a list of quantum statistic parameters which quantum link layer may calculate and collect. At 2902, the Quantum link layer may process the request primitive at 2901 and may start to calculate designated quantum statistic parameters. At 2903, the quantum link layer may send a response to higher layer. This response may contain the identifier for one or more (e.g. each) quantum statistic parameter so that higher layer may use the identifier (e.g. at 2907) to query and retrieve its value. At 2904, after a time period, the value of quantum statistic parameters may become available.

At 2905, the quantum link layer may actively and periodically report selected quantum statistic parameters to the higher layer. This behavior may be requested and specified by the higher layer at 2901. For example, the higher layer may indicate at 2901 a list of quantum statistic parameters to be reported and the reporting frequency. At 2906, the higher layer may send a response to quantum link layer. At 2907, the higher layer may send a request to query certain quantum statistic parameters. The higher layer may know the identifier of one or more (e.g. each) statistic parameter being created and stored at quantum link layer from 2903. At 2908, the quantum link layer may send a response to higher layer.

Quantum link layer service for entanglement distribution may be provided. After an entanglement may be created at a QNN, a higher layer of this QNN may trigger its quantum link layer to distribute qubit(s) of the entanglement to other QNNs. This may occur in a number of ways. The following are three example scenarios, although they may be others:

Scenario 1—Quantum link layer may distribute one qubit of an entangled pair to another QNN. The other qubit of the entangled pair may not be distributed to any other QNN, but may be stored locally.

Scenario 2—Quantum link layer may distribute both qubits of an entangled pair to the same QNN.

Scenario 3—Quantum link layer may distribute one or more (e.g. each) qubit of an entangled pair to a different QNN.

Figure 30:
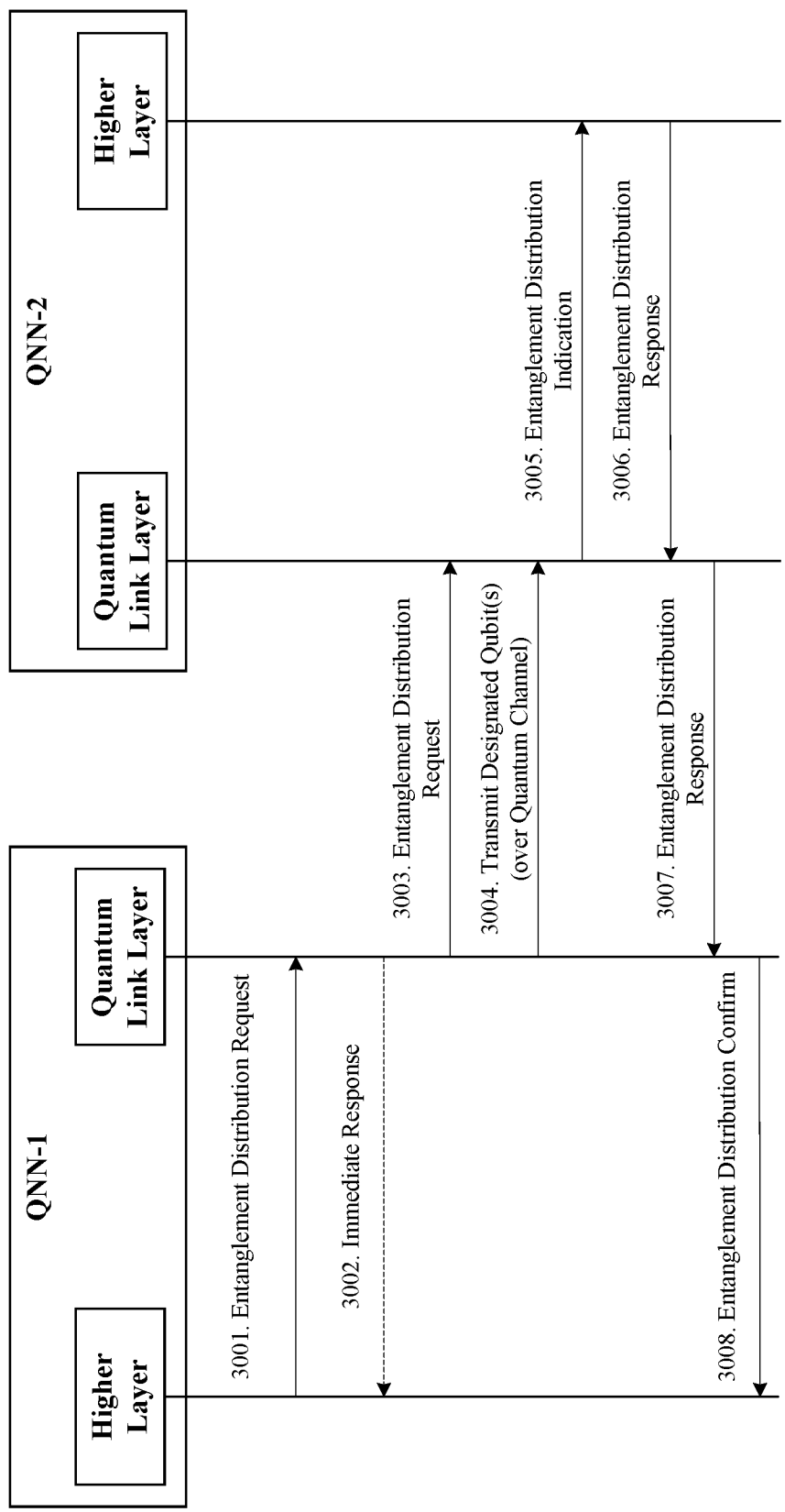
FIG. 30 shows an example flow chart for a quantum link layer service for triggering entanglement distribution.

FIG. 30 shows an example flow chart for a link layer service for triggering entanglement distribution. For example, FIG. 30 illustrates a link layer service (e.g. a new Link Layer Service) for entanglement distribution for scenario 1 and scenario 2 discussed above. In this scenario, one or more entangled qubits may have been created by the quantum link layer of QNN-1. The higher layer of QNN-1 may request quantum link layer to distribute one or more entangled qubit to another QNN (e.g. QNN-2). At 3001, the higher layer of QNN-1 may send an entanglement distribution request to quantum link layer. This request may include one or more of the following parameters:

entanglementDistMode: May indicate how quantum link layer may perform entanglement distribution, for example:

entanglementDistMode=1, quantum link layer may distribute one qubit of an entangled pair to another QNN. The other qubit of the entangled pair may not be distributed to any other QNN, but may be stored locally.

entanglementDistMode=2, quantum link layer may distribute both qubits of an entangled pair to the same QNN.

entanglementDistMode=3, quantum link layer may distribute each qubit of an entangled pair to a different QNNs. This may not be not shown in FIG. 30.

entanglementDistTime: May indicate when quantum link layer may perform entanglement distribution, For example, a higher layer may send its request at 3001 in advance so that quantum link layer may have time to prepare entanglement distribution.

entangledQubitInfo: May indicate information about entangled qubits to be distributed and identifiers of QNNs that the entangled qubits may be distributed to. This parameter may contain a list of elements and one or more (e.g. each) element(s) may be for a different entanglement to be distributed. An (e.g. each) element may be represented as: (entanglementID, qubitIDToBeDistributed, qnnID), where entanglementID may be the identifier of an existing entanglement, qubitIDToBeDistributed may be the identifier of one or more qubits which may be distributed and may be associated with the existing entanglement as denoted by entanglementID, and qnnID may be the identifier of one or more QNNs, qubitIDToBeDistributed may be optional.

If entanglementDistMode=1, qnnID contains one QNN's identifier.

If entanglementDistMode=2, qnnID contains one QNN's identifier.

If entanglementDistMode=3, qnnID contains identifiers of two QNNs. This may not be not shown in FIG. 30.

targetAppID: the target quantum application which may use the distributed entangled qubits.

At 3002 in FIG. 30, which may be optional, if entanglementDistTime may be contained at 3001, quantum link layer of QNN-1 may wait for some time as denoted by entanglementDistTime before it may distribute an entangled qubit to other QNNs, but it may send an immediate response to higher layer of QNN-1 to acknowledge that the request received at 3001 has been received and the requested entanglement distribution may be performed later, such as at 3003.

At 3003, which may be optional, after some time as denoted by entanglementDistTime, a quantum link layer of QNN-1 may perform the requested entanglement distribution. Quantum link layer of QNN-1 may send an Entanglement Distribution Request to quantum link layer of QNN-2 to inform QNN-2 that QNN-1 may transmit some entangled qubits to QNN-2 at 3004. This request message may contain one or more of the parameters as contained at 3001 and may include one or more of the following parameters:

The identifier of QNN-1.

The identifier of quantum link layer of QNN-1.

The identifier of quantum channel which may be used to transmit qubits at 3004.

The time duration which at 3004 may continue on the quantum channel.

At 3004, quantum link layer of QNN-1 may transmit one or more designated qubits to quantum link layer of QNN-2 over a quantum channel. This may occur after 3003 or after some time as denoted by entanglementDistTime. Further, one or more of the following actions may be performed:

If entanglementDistMode=1, quantum link layer of QNN-1 may instruct quantum physical layer to transmit one designated qubit in each entanglement to another QNN (i.e. QNN-2).

If entanglementDistMode=2, quantum link layer may instruct quantum physical layer to transmit two qubits of each entanglement to the same QNN (i.e. QNN-2).

If entanglementDistMode=3, quantum link layer may instruct quantum physical layer to transmit two qubits of each entanglement to a different QNN, which may occur one after the other. This may not be shown in FIG. 30.

At 3005, a quantum link layer of QNN-2 receives the transmitted qubits that may be sent at 3004. It may send an Entanglement Distribution Indication primitive to higher layer of QNN-2. This indication primitive may contain one or more of the parameters as received at 3003.

At 3006, a higher layer of QNN-2 may send an Entanglement Distribution Response to quantum link layer of QNN-2 as a confirmation. The higher layer of QNN-2 may also send a primitive to the target quantum application which may reside on QNN-2 and may use the distributed qubits. The identifier of the target quantum application may be contained at 3001 and may be re-transmitted at 3003 and/or 3005.

At 3007, a quantum link layer of QNN-2 may send an Entanglement Distribution Response message to quantum link layer of QNN-1. This message may contain the identifier of qubits which have been successfully received at 3004. At 3008, quantum link layer of QNN-1 may send an Entanglement Distribution Confirmation message to higher layer of QNN-1 to notify which entanglements has been successfully distributed and which ones are not.

In FIG. 30, 3004-3007 may be used to distributed one or two qubits of the same entanglement pair. If 1 contains multiple entanglements (e.g. N entanglements) to be distributed, 3004-3007 may be repeated for N times. In addition, 3003-3004 may be combined in one or more actions over a quantum channel, but the information contained at 3003 may be transmitted in front of qubits contained at 3004.

Figure 31:
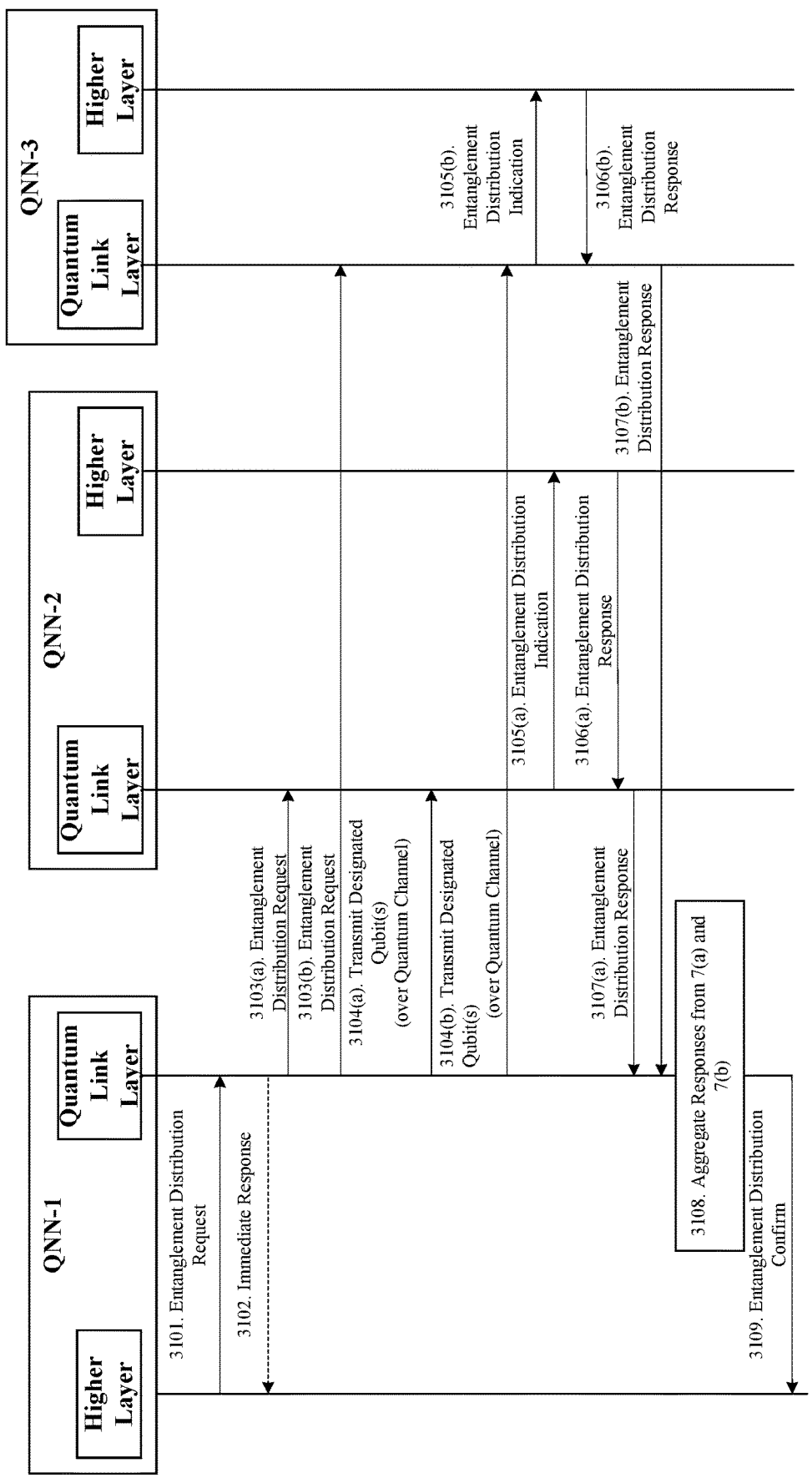
FIG. 31 shows an example flow chart or a quantum link layer service for entanglement distribution.

FIG. 31 shows an example flow chart for a link layer service for entanglement distribution. Quantum link layer may distribute one or more (e.g. each) qubit of an entangled pair to a different QNN. For example, FIG. 31 illustrates a link layer service (e.g. a new Link Layer Service) for entanglement distribution where the quantum link layer may distribute one or more (e.g. each) qubit of an entangled pair to a different QNN. In this scenario, one or more entangled qubits may have been created by the quantum link layer of QNN-1. The higher layer of QNN-1 may request quantum link layer to distribute one qubit of the entanglement to QNN-2 and the remaining qubit of the same entanglement to QNN-3. The following actions may also be performed:

- 3101-3102: may be similar to 3001-3002 with regard to FIG. 30.
- 3103(a)/3(b): may be similar to 3003 with regard to FIG. 30.
- 3104(a)/4(b): may be similar to 3004 with regard to FIG. 30.
- 3105(a)/5(b): may be similar to 3005 with regard to FIG. 30.
- 3106(a)/6(b): may be similar to 3006 with regard to FIG. 30.
- 3107(a)/7(b): may be similar to 3007 with regard to FIG. 30.
- 3108: Quantum link layer of QNN-1 may aggregate responses received from 3107(a) and 3107(b)
- 3109: may be similar to 3008 with regard to FIG. 30.

Figure 32:
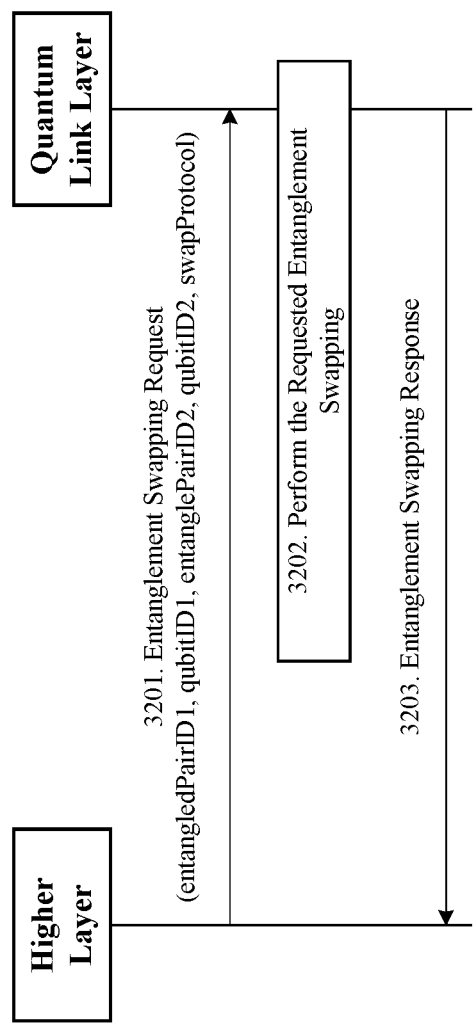
FIG. 32 shows an example flow chart for a quantum link layer service for triggering entanglement swapping.

Quantum link layer service for triggering entanglement swapping may be provided. FIG. 32 shows and example flow chart for a link layer service for triggering entanglement swapping. For example, FIG. 32 illustrates a link layer service (e.g. a new Link Layer Service) for triggering entanglement swapping. In this scenario, physical equipment may holds two or more uncorrelated qubits, Qubit B and Qubit C, respectively, from two or more different entangled sets (e.g. Qubit B from an entangled pair #1 which includes Qubit A and Qubit B, and Qubit C from another entangled pair #2 which includes Qubit C and Qubit D). The higher layer may trigger quantum link layer to perform entanglement swapping between entangled pairs #1 and #2. A result of this entanglement swapping may be to entangle Qubit A and Qubit D by enforcing one or more operations on Qubit B and Qubit C.

At 3201, the higher layer may send an entanglement swapping request to quantum link layer. This request may include the identifiers of both entangled pairs (e.g. entangledPairID1 and entangledPairID2) and the identifiers of two uncorrelated qubits (e.g. qubitID1 and qubitID2). This request also indicates the method or protocol that the quantum link layer shall use for performing entanglement swapping (e.g. swapProtocol). At 3202, the quantum link layer may perform the entanglement swapping over those two uncorrelated qubits (e.g. as denoted by qubitID1 and qubitID2) using the protocol as indicated by swapProtocol at 3201. At 3203, the quantum link layer may generate an entanglement identifier (e.g. a new entanglement identifier) and send it in a response to the higher layer. Alternatively, or in addition to, the higher layer may generate an entanglement identifier (e.g. a new entanglement identifier), for example, based on entangledPairID1 and entanglePairID2, since original entanglements as denoted by these two identifiers may not exist any longer.

Figure 33:
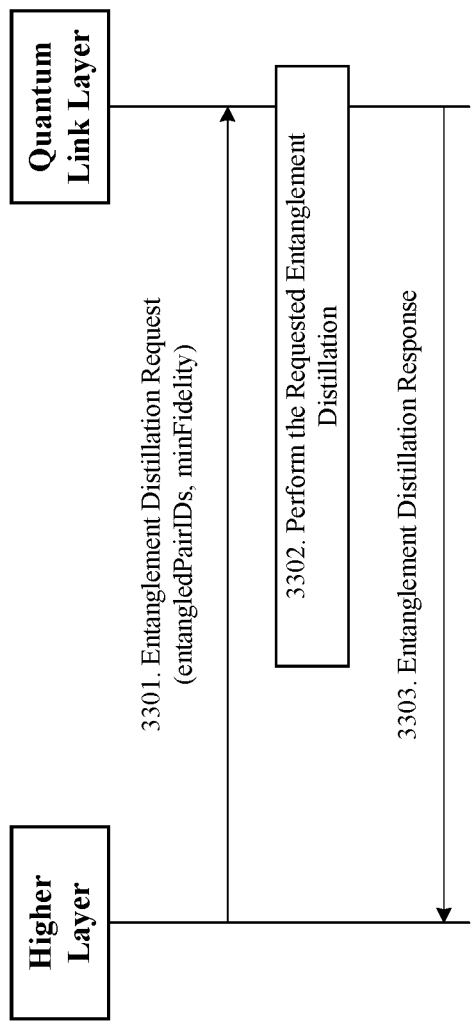
FIG. 33 shows an example flow chart for a quantum link layer service for triggering entanglement distillation.

Quantum link layer service for triggering entanglement distillation may be provided. FIG. 33 shows an example flow chart for a link layer service for triggering entanglement distillation. In this scenario, multiple entangled pairs may have been successfully created by and may be accessible to quantum link layer. Their fidelities may become below a threshold and may not be leveraged by quantum applications. Entanglement distillation may be employed to improve the fidelity of one or more entangled pairs by consuming and/or sacrificing other entangled pairs via entanglement distillation. At 3201, the higher layer may send an entanglement distillation request to quantum link layer. This request may contain a list of existing entangled pairs (e.g. entangledPairIDs) and may also indicate a minimum fidelity (e.g. minFidelity), which the entanglement distillation may be requested to achieve. At 3202, the quantum link layer may receive the request and may perform entanglement distillation over those existing entangled pairs. The quantum link layer may just use one or more entangled pair to improve the fidelity of another entangled pairs to be above minFidelity. It may not operate on and/or consume one or more of the entangled pairs (e.g. all the entangled pairs) as denoted by entangledPairIDs to have one pair with fidelity greater than minFidelity. At 3203, the quantum link layer may send a response to a higher layer to indicate if the requested entanglement distillation may be successful and also indicate the identifiers of one or more consumed entanglements (e.g. all consumed entanglements). Optionally, the quantum link layer, if it may have an ability to estimate it, may indicate in this response the achieved fidelity at 3202.

Figure 34:
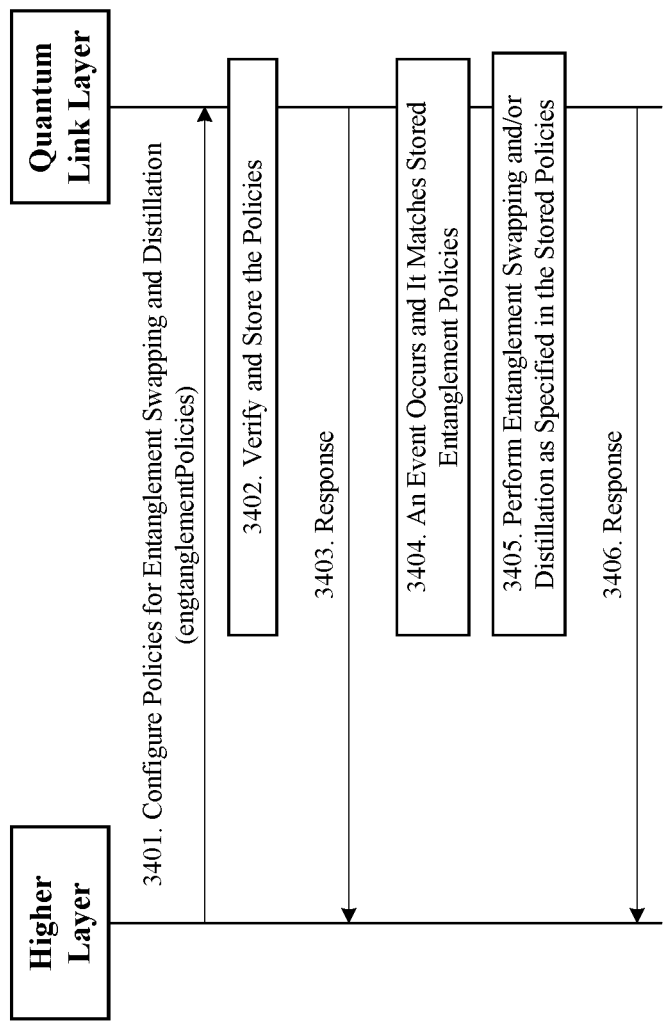
FIG. 34 shows an example flow chart for a quantum link layer service for policy-based automatic entanglement swapping/distillation.

Quantum link layer service for policy-based automatic entanglement swapping and distillation may be provided. FIG. 34 shows an example flow chart for a link layer service for policy-based automatic entanglement swapping/distillation. For example, FIG. 34 illustrates a link layer service (e.g. a new link layer service) for policy-based automatic entanglement swapping and distillation to be performed at quantum link layer. At 3401, the higher layer may send a request to quantum link layer to configure some policies for entanglement swapping and distillation (e.g. entanglementPolicies). At 3402, the quantum link layer may verify and store these entanglement policies locally. At 3403, the quantum link layer may send a response to the higher layer. At 3404, an event may occur at the quantum link layer, which may match one or more stored entanglement policies. At 3405, the quantum link layer may perform entanglement swapping and/or distillation as specified in the matched entanglement policies. At 3406, the quantum link layer may send the result of performed entanglement swapping and distillation to the higher layer.

The embodiments described herein may use a number of different networks. The networks may include a quantum internet that may utilized wired systems (e.g. fiber optic systems), and/or wireless systems (e.g. laser based communication systems). For example, the embodiments may use a quantum internet that uses quantum satellites, which may send and/or receive entangled photons.

What is claimed:

1. A device for managing one or more quantum nodes within a quantum network, the device comprising:
   a processor configured to:
      receive a first message, wherein the first message indicates (i) a first request to create a quantum connection between a source quantum network terminal (QNT) and a destination QNT, and (ii) a time to initiate creation of the quantum connection;
      determine a quantum path for the quantum connection, wherein a first quantum network router (QNR) and a second QNR are associated with the quantum path, wherein the quantum path is determined based on (i) the first QNR having, at the indicated time, one or more first quantum capabilities satisfying at least one of one or more capability criteria (ii) and the second QNR having, at the indicated time, one or more second quantum capabilities satisfying at least one of the one or more capability criteria;
      send a second message to one of the first and second QNRs, wherein the second message indicates a second request for the one of the first and second QNRs to create a first entangled qubit pair for a first hop of a quantum path and a second entanglement qubit pair for a second hop of the quantum path;
      send a third message to the other one of the first and second QNRs, wherein the third message indicates a third request for the other one of the first and second QNRs to provide the quantum path by performing entanglement swapping using the first entangled qubit pair and the second entangled qubit pair; and
      receive a confirmation message from the one of the first and second QNRs, wherein the confirmation message indicates that quantum connection has been created.

2. The device of claim 1, wherein the device is a quantum network manager.

3. The device of claim 1, wherein the processor is configured to receive a response message from the one of the first and second QNRs, and wherein the response message indicates that the entanglement swapping has been performed.

4. The device of claim 1, wherein the processor is configured to send a fourth message to one or more of the source QNT, the destination QNT, and a quantum network client (QNC), wherein the fourth message indicates a quantum connection identifier and wherein the quantum connection identifier is associated with the quantum path and the quantum connection.

5. The device of claim 1, wherein the processor is configured to send a fourth message to one or more one of the source QNT, the destination QNT, and a quantum network client (QNC), and wherein the fourth message indicates that the quantum path has been established.

6. The device of claim 1, wherein the first message indicates a policy that specifies the time.

7. A device for managing one or more quantum nodes within a quantum network, the device comprising:
   a processor configured to:
      receive a first message, wherein the first message indicates (i) a request to create a quantum connection between a source quantum network terminal (QNT) and a destination QNT, and (ii) a time to initiate creation of the quantum connection;
      determine a quantum path for the quantum connection, wherein a first quantum network router (QNR) and a second QNR are associated with the quantum path, wherein the quantum path is determined based on (i) the first QNR having, at the indicated time, one or more first quantum capabilities satisfying at least one of one or more capability criteria (ii) and the second QNR having, at the indicated time, one or more second quantum capabilities satisfying at least one of the one or more capability criteria;
      send a second message to the source QNT, wherein the second message indicates that the source QNT is to perform a first entanglement operation in accordance with an entanglement sequence;
      send a third message to one of the first and second QNRs wherein the third message indicates that the one of the first and second QNRs is to perform a second entanglement operation in accordance with the entanglement sequence; and
      receive a confirmation message from one of the first and second QNRs indicating that quantum connection has been created.

8. The device of claim 7, wherein the device is a quantum network manager.

9. The device of claim 7, wherein the entanglement sequence indicates that an entanglement swapping operation is to be performed after an entanglement creation operation.

10. The device of claim 7, wherein the processor is configured to send a fourth message to the destination QNT, and wherein the fourth message indicates that the QNT is to perform a third entanglement operation in accordance with the entanglement sequence.

11. The device of claim 10, wherein the at least one of the first entanglement operation, the second entanglement operation, and the third entanglement operation indicates an operation for creating an entanglement qubit pair or an operation for entanglement swapping.

12. The device of claim 7, wherein the quantum connection comprises a first hop and a second hop, wherein the first entanglement operation is associated with the first hop, and wherein the second entanglement operation is associated with the second hop.

13. A device for creating a quantum connection, the device comprising:
   a processor configured to:
      send a first message to a quantum network manager (QNM), the first message indicating (i) a request to create a quantum connection and indicating a parameter for the quantum connection, and (ii) a time to initiate creation of the quantum connection;
      receive a second message from the QNM, the second message indicating that the QNM has calculated a quantum path between a source quantum network terminal (QNT) and a destination QNT for the for the quantum connection, wherein in the calculated quantum path a first quantum network router (QNR) and a second QNR are associated with the quantum path, and the quantum path is calculated based on (i) the first QNR having, at the indicated time, one or more first quantum capabilities satisfying at least one of one or more capability criteria (ii) and the second QNR having, at the indicated time, one or more second quantum capabilities satisfying at least one of the one or more capability criteria; and receive a third message from the QNM, the third message indicating a connection identification for the quantum connection and indicating that the quantum connection has been created.

14. The device of claim 13, wherein the device is a quantum network client.

15. The device of claim 13, wherein the parameter is at least one of a source QNT address, a destination QNT address, path information for the quantum path, a quantum connection creation mode, a minimum fidelity for an engagement pair, an indication of how an entanglement swapping should be performed, an indication of a protocol that should be used for entanglement swapping, a maximum number of hops that can be used for the quantum path, an indication of an application that will use the quantum connection, or an indication of a lifetime for the quantum connection.

16. The device of claim 13, wherein the second message further indicates that the QNM has buffered the request for the quantum connection.

17. The device of claim 1, wherein the one or more capability criteria are associated with any of: (1) an availability of one or more quantum resources, (2) a capability for performing entanglement swapping, (3) a capability for performing entanglement distillation, and (4) a capability for supporting quantum applications.

18. The device of claim 7, wherein the one or more capability criteria are associated with any of: (1) an availability of one or more quantum resources, (2) a capability for performing entanglement swapping, (3) a capability for performing entanglement distillation, and (4) a capability for supporting quantum applications.

19. The device of claim 13, wherein the one or more capability criteria are associated with any of: (1) an availability of one or more quantum resources, (2) a capability for performing entanglement swapping, (3) a capability for performing entanglement distillation, and (4) a capability for supporting quantum applications.

* * * * *